(12) United States Patent
Bertrand et al.

(10) Patent No.: US 11,530,358 B2
(45) Date of Patent: Dec. 20, 2022

(54) PROCESS FOR PRODUCING LIQUID FUEL FROM WASTE HYDROCARBON AND/OR ORGANIC MATERIAL, REACTOR, APPARATUS, USES AND MANAGING SYSTEM THEREOF

(71) Applicant: ENVIROLLEA INC., Calgary (CA)

(72) Inventors: Louis Bertrand, Outremont (CA); Lucie B. Wheeler, Calgary (CA)

(73) Assignee: ENVIROLLEA INC., Calgary (CA)

( * ) Notice: Subject to any disclaimer, the term of this patent is extended or adjusted under 35 U.S.C. 154(b) by 92 days.

(21) Appl. No.: 16/630,803

(22) PCT Filed: Jul. 4, 2018

(86) PCT No.: PCT/CA2018/050816
§ 371 (c)(1),
(2) Date: Jan. 13, 2020

(87) PCT Pub. No.: WO2019/100145
PCT Pub. Date: May 31, 2019

(65) Prior Publication Data
US 2020/0165526 A1    May 28, 2020

(30) Foreign Application Priority Data
Jul. 13, 2017   (CA) ................................ CA 2973210

(51) Int. Cl.
*C10G 1/00* (2006.01)
*C10G 3/00* (2006.01)
(Continued)

(52) U.S. Cl.
CPC ............... *C10G 1/002* (2013.01); *C10G 1/02* (2013.01); *C10G 3/40* (2013.01); *F23G 5/006* (2013.01);
(Continued)

(58) Field of Classification Search
CPC .................................................... Y02P 40/125
(Continued)

(56) References Cited

U.S. PATENT DOCUMENTS 1,518,938 A    12/1924 Nielsen
1,877,987 A     9/1932 Schonberg
(Continued)

FOREIGN PATENT DOCUMENTS

CA    456448    5/1949
CA    456599    5/1949
(Continued)

OTHER PUBLICATIONS

English Translation—Machine Translation of CN101343543A, "Comprehensive Utilization Method for Agricultural Wastes and Plastic Garbage", published on Jan. 14, 2009.
(Continued)

*Primary Examiner* — Nina Bhat
(74) *Attorney, Agent, or Firm* — Bereskin & Parr LLP/S.E.N.C.R.L., s.r.l.

(57) ABSTRACT

Processes for producing liquid fuels from a mainly organic starting material with a reduced content in water and/or with a reduced content in solids are disclosed. The mainly organic starting material can be at least partially liquified and optionally further dewatered. The obtained at least partially liquid fraction can be thereafter used as feeding stream that is submitted to a pyrolysis treatment resulting in a solid gas fraction allowing the recovering of a liquid fuels after a controlled liquid solid separation treatment. There are also provided various other processes for producing liquid fuel from waste hydrocarbon and/or organic material as well as reactors, apparatuses, uses and managing systems thereof.

19 Claims, 66 Drawing Sheets

(51) Int. Cl.

| | |
|---|---|
| *F23G 5/00* | (2006.01) |
| *F27B 7/08* | (2006.01) |
| *C10G 1/02* | (2006.01) |
| *F23G 5/027* | (2006.01) |
| *F23G 5/033* | (2006.01) |
| *F23G 5/20* | (2006.01) |
| *F23G 7/05* | (2006.01) |
| *F27B 7/14* | (2006.01) |
| *F27B 7/28* | (2006.01) |
| *F23G 7/00* | (2006.01) |

(52) U.S. Cl.
CPC ............ *F23G 5/0273* (2013.01); *F23G 5/033* (2013.01); *F23G 5/20* (2013.01); *F23G 7/05* (2013.01); *F27B 7/08* (2013.01); *F27B 7/14* (2013.01); *F27B 7/28* (2013.01); *C10G 2300/1003* (2013.01); *C10G 2300/202* (2013.01); *C10G 2300/205* (2013.01); *C10G 2300/208* (2013.01); *C10G 2300/302* (2013.01); *C10G 2300/308* (2013.01); *F23G 7/008* (2013.01); *F23G 2209/102* (2013.01)

(58) Field of Classification Search
USPC .......... 201/21, 30, 32; 585/242; 202/86, 179
See application file for complete search history.

(56) References Cited

U.S. PATENT DOCUMENTS

| | | | |
|---|---|---|---|
| 2,023,942 A | 12/1935 | Wescott | |
| 2,785,115 A | 3/1957 | Borch | |
| 2,994,660 A | 8/1961 | Reddie et al. | |
| 3,807,936 A | 4/1974 | Vering | |
| 4,014,643 A * | 3/1977 | Musha | F26B 11/0459 432/118 |
| 4,039,130 A | 8/1977 | Hogan | |
| 4,131,418 A | 12/1978 | Kramm et al. | |
| 4,180,455 A | 12/1979 | Taciuk | |
| 4,280,879 A | 7/1981 | Taciuk | |
| 4,285,773 A | 8/1981 | Taciuk | |
| 4,381,992 A | 5/1983 | Wood et al. | |
| 4,405,448 A | 9/1983 | Googin et al. | |
| 4,411,074 A | 10/1983 | Daly | |
| 4,427,637 A | 1/1984 | Iwashita et al. | |
| 4,439,209 A | 3/1984 | Wilwerding et al. | |
| 4,473,464 A | 9/1984 | Boyer et al. | |
| 4,475,886 A | 10/1984 | Tyler | |
| 4,512,873 A | 4/1985 | Escher et al. | |
| 4,591,362 A | 5/1986 | Yudovich et al. | |
| 4,711,713 A | 12/1987 | Zarrineghbal et al. | |
| 4,746,420 A | 5/1988 | Darian et al. | |
| 4,846,677 A | 7/1989 | Crivelli et al. | |
| 4,872,954 A | 10/1989 | Hogan | |
| 4,931,171 A | 6/1990 | Piotter | |
| 4,961,391 A | 10/1990 | Mak et al. | |
| 5,057,189 A * | 10/1991 | Apffel | C09C 1/482 202/113 |
| 5,059,303 A | 10/1991 | Taylor et al. | |
| 5,154,817 A | 10/1992 | Reid | |
| 5,194,069 A | 3/1993 | Soméus | |
| 5,316,743 A | 5/1994 | LeBlanc et al. | |
| 5,366,595 A | 11/1994 | Padgett et al. | |
| 5,423,891 A | 6/1995 | Taylor | |
| 5,494,572 A | 2/1996 | Horii et al. | |
| 5,753,102 A | 5/1998 | Funakoshi et al. | |
| 5,821,396 A | 10/1998 | Bouziane | |
| 5,904,838 A | 5/1999 | Kalnes et al. | |
| 6,203,765 B1 | 3/2001 | Taciuk et al. | |
| 6,274,785 B1 | 8/2001 | Gore | |
| 6,320,090 B1 | 11/2001 | Sherman et al. | |
| 6,589,417 B2 | 7/2003 | Taciuk et al. | |
| 6,929,737 B2 | 8/2005 | Sherman et al. | |
| 7,344,622 B2 * | 3/2008 | Grispin | B01J 6/008 110/245 |
| 7,354,462 B2 | 4/2008 | O'Rear | |
| 7,550,063 B2 | 6/2009 | Gawad | |
| 7,943,014 B2 | 5/2011 | Berruti et al. | |
| 8,298,406 B2 | 10/2012 | Coates et al. | |
| 8,394,240 B2 | 3/2013 | Rinker | |
| 8,999,147 B2 | 4/2015 | Wheeler | |
| 9,089,803 B2 | 7/2015 | Stroeder et al. | |
| 9,200,162 B2 | 12/2015 | Taylor | |
| 9,458,391 B2 | 10/2016 | Wheeler | |
| 9,555,342 B2 | 1/2017 | Wheeler | |
| 9,828,553 B2 | 11/2017 | Wheeler | |
| 10,315,183 B2 | 6/2019 | Wheeler | |
| 2002/0029996 A1 * | 3/2002 | Taciuk | B01J 6/008 208/126 |
| 2002/0055657 A1 | 5/2002 | Ina et al. | |
| 2003/0009068 A1 | 1/2003 | Platz et al. | |
| 2004/0231237 A1 | 11/2004 | Boer et al. | |
| 2005/0167337 A1 | 8/2005 | Bunger et al. | |
| 2006/0280669 A1 * | 12/2006 | Jones | C10G 3/00 423/445 R |
| 2008/0173531 A1 | 7/2008 | Kesler | |
| 2008/0197012 A1 | 8/2008 | Berruti et al. | |
| 2009/0114567 A1 * | 5/2009 | Maxwell | C10G 1/002 208/126 |
| 2009/0250331 A1 | 10/2009 | Hopkins et al. | |
| 2010/0077711 A1 | 4/2010 | Weigelt | |
| 2010/0293853 A1 * | 11/2010 | Feerer | C10K 1/103 48/76 |
| 2010/0294700 A1 | 11/2010 | Coates et al. | |
| 2011/0011719 A1 | 1/2011 | Rinker | |
| 2011/0035998 A1 * | 2/2011 | Badger | C10C 5/00 44/639 |
| 2011/0259795 A1 * | 10/2011 | Yin | C10G 7/003 208/184 |
| 2012/0006669 A1 | 1/2012 | Bronshtein et al. | |
| 2012/0017498 A1 * | 1/2012 | Rugg | C10L 5/04 44/589 |
| 2012/0055775 A1 * | 3/2012 | Manderson | C10B 47/30 201/35 |
| 2012/0285080 A1 | 11/2012 | Despen et al. | |
| 2012/0318716 A1 | 12/2012 | Wheeler et al. | |
| 2013/0068587 A1 * | 3/2013 | Wheeler | C10B 47/30 196/98 |
| 2015/0203760 A1 * | 7/2015 | Weaver | B01D 53/1412 585/242 |
| 2015/0368564 A1 * | 12/2015 | Wheeler | C10B 55/04 202/83 |
| 2015/0368567 A1 * | 12/2015 | Wheeler | C10G 1/02 201/2.5 |
| 2016/0046880 A1 | 2/2016 | Combs | |
| 2016/0053184 A1 * | 2/2016 | Wheeler | B01D 3/346 585/241 |

FOREIGN PATENT DOCUMENTS

| | | | |
|---|---|---|---|
| CA | 1099507 | 4/1981 | |
| CA | 1120418 | 3/1982 | |
| CA | 1129195 | 8/1982 | |
| CA | 1221047 | 4/1987 | |
| CA | 1287007 | 7/1991 | |
| CA | 1316344 | 4/1993 | |
| CA | 1334129 | 1/1995 | |
| CA | 2151792 | 12/1995 | |
| CA | 2200525 | 10/1997 | |
| CA | 2245025 | 2/1999 | |
| CA | 2315774 | 9/1999 | |
| CA | 2694821 | 9/2011 | |
| CA | 2694850 | 9/2011 | |
| CA | 2694853 | 9/2011 | |
| CA | 2799751 | 11/2011 | |
| CA | 2750129 | 2/2013 | |
| CA | 2783608 | 1/2014 | |
| CA | 2783608 A1 * | 1/2014 | ............ C10B 55/00 |
| CN | 101343543 | 1/2009 | |
| EP | 1106672 | 6/2001 | |
| EP | 1577366 | 9/2005 | |
| GB | 1534302 | 11/1978 | |
| GB | 2150271 | 6/1985 | |

(56) References Cited

FOREIGN PATENT DOCUMENTS

| JP | 5729510 | 2/1982 |
|---|---|---|
| WO | 9746843 | 12/1997 |
| WO | 2005087897 | 9/2005 |
| WO | 2011106891 | 9/2011 |
| WO | 2011143770 | 11/2011 |
| WO | 2012069501 | 5/2012 |
| WO | 2013123377 | 8/2013 |

OTHER PUBLICATIONS

Fortuna et al., "Pilot-scale experimental pyrolysis plant: mechanical and operational aspects", Journal of Analytical and Applied Pyrolysis 40-41 (1997) 403-417. (The year of publication is sufficiently earlier than the effective U.S. filing date so that the particular month of publication is not an issue).
English Abstract of JP2007040615, "Rotary Kiln", published on Feb. 15, 2004.
English Abstract of JP2008122043, "Rotary Kiln Furnace", published on May 29, 2005.
Publication from Foster-Wheeler: "SYDEC delayed coking", 2007.
Publication from Dorf Ketl: "Fuel Additives as Stabilizers for Unstable Cracked Streams", 2005.
Marcus, Y. (2004), "Principles of Solubility and Solutions" in Solvent Extraction Principles and Practice, Revises and Expanded, edited by J. Rydberg et al., CRC Press, 480 pgs.
Lloyd, P.J.D. (2004), "Principles of Industrial Solvent Extraction" in solvent Extraction Principles and Practice, Revises and Expanded, edited by J. Rydberg et al., CRC Press, 480 pgs.
Cox M. et al., (2004), "Introduction to Solvent Extraction" in solvent Extraction Principles and Practice, Revises and Expanded, edited by J. Rydberg et al., CRC Press, 480 pgs.
English Abstract of SU889089(A1), "Apparatus for obtaining magnesium compound", published on Dec. 15, 1981.
English Translation—Machine Generated of JPS5729510(A), "Method for Producing Iron by Reducing Semi-Reduced Molten Iron Oxide", published on Feb. 17, 1982.
Cabinet Nuss, European Patent Application No. 13822153.6, Response to Rules 70(2) and 70a(2) EPC filed on Jan. 13, 2017.
European Patent Application No. 13822153.6, "Office Communication and Extended Search Report", dated Feb. 25, 2016.

* cited by examiner

|  | Composition (wet weight %) | |
|---|---|---|
| Food, yard and wood waste | 34.3 | 38 |
| Rubber, leather, textiles and tires | 8.7 | 11.2 |
| Plastics | 12.7 | 17.6 |
| Paper | 27.4 | 14.8 |
| Metals, glass, non-combustibles | 13.5 | 14.1 |
| Other waste | 3.4 | 4.3 |
| Total mass (millions of tons) | 251 | 164 |
| Note | before recycling and composting | after recycling and composting |

FIG. 31

PROCESS FOR PRODUCING LIQUID FUEL FROM WASTE HYDROCARBON AND/OR ORGANIC MATERIAL, REACTOR, APPARATUS, USES AND MANAGING SYSTEM THEREOF

CROSS-REFERENCE TO RELATED APPLICATIONS

The present application is a 35 USC 371 national stage entry of PCT/CA2018/050816 filed on Jul. 4, 2018 and which claims priority to Canadian patent application No 2,973,210, filed on Jul. 13, 2017. These documents are hereby incorporated herein by reference in their entirety.

FIELD OF THE INVENTION

The invention relates to a process for producing fuel from a variety of organic material, such as municipal solid waste and/or waste hydrocarbons or a mixture of the two treated simultaneously. The invention also concerns new rotating reactors and apparatus for performing the process, corresponding managing system allowing a continuous optimisation of the process. The inventions also relates to the uses of liquid fuel thereby produced.

BACKGROUND OF THE INVENTION

Municipal solid waste (MSW), commonly known as trash or garbage in the United States and as refuse or rubbish in Britain, is a waste type consisting of everyday items that are discarded by the public. "Garbage" can also refer specifically to food waste, as in a garbage disposal; the two are sometimes collected separately. The composition of municipal solid waste varies greatly from municipality to municipality and changes significantly with time. In municipalities which have a well-developed waste recycling system, the waste stream consists mainly of intractable wastes such as plastic film, and non-recyclable packaging materials. At the start of the 20th century, the majority of domestic waste (53% wt.) in the UK consisted of coal ash from open fires. In developed areas without significant recycling activity it predominantly includes food wastes, market wastes, yard wastes, plastic containers and product packaging materials, and other miscellaneous solid wastes from residential, commercial, institutional, and industrial sources. Most definitions of municipal solid waste do not include industrial wastes, agricultural wastes, medical waste, radioactive waste or sewage sludge. The term residual waste relates to waste left from household sources containing materials that have not been separated out or sent for reprocessing.

Living in a growing society that consumes a lot of resources, more and more waste is being generated every day. This waste comes in many forms, such as waste hydrocarbons, MSW, etc., but needs to go somewhere once used. Although there are current solutions, such as composting and recycling, which reduce the amount of waste that must be disposed of, they do not have enough of an impact in order to decrease the production of waste to a point where it is not a problem. There is a limited capacity in landfills, and other methods of disposal, for example incineration, pyrolysis and transformation of MSW to refuse-derived fuel, all have their problems.

PRIOR ART

1. MSW Management

Solid wastes are any discarded materials. They can be solid, liquid, semi-solid or containerized gaseous material. In the light of a survey conducted by World Watch Institute, the total volume of municipal solid waste (MSW) is about 1.3 billion tons per year in the world (MSW is measured before disposal, so data on it include material that is later diverted for recycling).

The disposal of MSW is a matter of increasing concern for governments all around the world. Following are a few ways to deal with MSW.

1.1 Pelletizing of Municipal Solid Waste into Refuse-Derived Fuel

Trash is processed to remove recyclables, such as metals and glass, and unwanted residue and hazardous materials, with the remaining (preferably mostly combustible) positively selected fraction shredded and sent to fiberizing and pelletization or briquetting equipment. The solid pellet or briquette produced from these techniques can be used as fuel to produce heat and is known as Refused-Derived Fuel (RDF). RDFs have many usages, such as being used for heating plant boilers, for the generation of electricity. Due to the special composition of them, they can also be an excellent substitute for fossil fuels.

1.2 Pyrolysis of Municipal Solid Waste

Pyrolysis is a process consisting of the chemical decomposition of organic materials by heat in the absence of oxygen, which produces various hydrocarbon gases and/or other organic vapours. During pyrolysis, the molecules of the object are subjected to very high temperatures leading to very strong vibrations. Therefore every molecule in the object are stretched and shaken to an extent that molecules start to break down. The rate of pyrolysis increases with temperature. Fast pyrolysis of organic material mainly produces liquid fuel known as bio-oil. Slow pyrolysis of organic material mainly produces gases and solid charcoal. Pyrolysis is extensively used in the petrochemical industry and can be applied to municipal waste treatment where organic waste is transformed into combustible gas, liquid fuel and residues.

1.3 Gasification of Municipal Solid Waste

Gasification, similar to pyrolysis, is a process of chemically decomposition of organic materials by heat in the absence of oxygen which produces mainly gasses, such as carbon monoxide, hydrogen and carbon dioxide and char. The temperatures for gasification are higher than those for pyrolysis and therefore the molecules break down into even smaller molecules. The product syngas can be used to either produce heat, which is used to create steam and drive a turbine, thus generating electricity, be used as a fuel in a dedicated gas engine, or be used as a feedstock to form other products, such as ethanol. During gasification, tars, halogens, heavy metals and alkaline compounds can be released, which is bad for the environment. Also, the efficiencies of the electricity production are relatively low.

1.4 Incineration of Municipal Solid Waste

Incineration technology is the controlled combustion of waste with the recovery of heat to produce steam that, in turn, produces power through steam turbines. The incineration process produces two types of ash. Bottom ash comes from the furnace and is mixed with slag, while fly ash comes from the stack and contains components that are more hazardous. Such systems rely on minimum guaranteed waste flows. It indirectly promotes continued waste generation while hindering waste prevention, reuse, composting, recycling, and recycling-based community economic development. It costs cities and municipalities more, provides fewer jobs than comprehensive recycling and composting, and also hinders the development of local recycling-based businesses.

1.5 Dumping of Municipal Solid Waste into Landfills

Landfills may cause numbers of problems. Pollution of the local environment may occur as well, such as contamination of groundwater or aquifers by leakage or sinkholes or soil contamination. Damage can include infrastructure disruption, such as damage to access roads by heavy vehicles. As existing landfills become filled to capacity and it is increasingly costly to site new landfills, the development of alternative disposal methods is becoming essential. In addition, the wastes being buried contains considerable quantities of energy that can replace conventional fossil fuels.

2. Technologies for Municipal Solid Waste Pyrolysis 2.1 Fluidized Bed Reactor

A fluidized bed reactor for pyrolysis utilises heated granular solid material, usually sand or solid products from pyrolysis, in which the feed material to be pyrolyzed is fed into. A heated sweep gas is used to fluidize the heated granular solid material on which pyrolysis reactions occur and to collect the vapours and gasses. A problem with this type of reactor is bed agglomeration, which is the formation of large agglomerates. The formation of these agglomerates decreases mixing and heat transfer within the reactor and may result in defluidization of the bed. The fluid-like behaviour of the solid particles also cause wear on the reactor walls and pipes, which increases maintenance cost. Also, the vapours produced from the pyrolysis must pass through solids above it, and thus possibly picking up contaminants while exiting the reactor.

2.2 Auger Reactor

An auger reactor for pyrolysis comprises of one or more screws which continuously mix the feed material to be pyrolyzed and a heat carrier, which is usually sand or steel shot, while also conveying them from the entrance to the exit of the reactor. The heat carrier is heated independently before being introduced into the reactor, near where the feed material is introduced. As the heat carrier and the feel material mix, pyrolysis reactions occur. A sweep gas is used to carry the produced vapours out of the reactor, while the solids and residue are lead out of the reactor from a separate exit. A problem with this type of reactor is that, depending on the feed material, the auger is prone to mechanical clogging due to the accumulation of residue on the screw(s). Also, the vapours produced must pass through solids above it, and thus pick up contaminants while exiting the reactor.

2.3 Plasma Reactor

First, the material to be gasified is possibly pre-treated to reduce water content and/or remove recyclable material. Then the feed material is fed into the a sealed, air-controlled reactor which heats its contents to extreme temperatures via the use of plasma torches, which produces syngas and slag. The liquid slag is poured off and cooled, while the syngas is scrubbed of impurities and passed through heat exchangers in order to recover some energy. The syngas is then used to produce energy or fuel via chemical reactions or by combustion. Although plasma reactors have potential to produce clean vapours and even destroy hazardous waste, the high energy cost causes little net energy production and both the capital and maintenance costs are very high.

There was therefore a need for a process allowing the processing of waste hydrocarbon material and/or of organic material or a mixture of the two and resulting in valuable liquid fuel, said process being but free of at least one, and preferably all, of the drawbacks of prior art known processes.

There was therefore a need for a process allowing the processing of waste hydrocarbon material and/or of organic material or a mixture of the two, with a high CCR and/or with a high viscosity and resulting in valuable liquid fuel, said process being but free of at least one, and preferably all, of the drawbacks of prior art known processes.

There was therefore a need for a process allowing the processing of waste hydrocarbon material and/or of organic material or a mixture of the two, at least partially in the form of granules and resulting in valuable liquid fuel, said process being but free of at least one, and preferably all, of the drawbacks of prior art known processes.

There was additionally a need for a process allowing the processing of waste hydrocarbon material and/or of organic material or a mixture of the two, in the form of granules, produced on the site or external to the site wherein the process of the invention is performed, and resulting in valuable liquid fuel, said process being but free of at least one, and preferably all, of the drawbacks of prior art known processes.

Therefore further a need for a process allowing the processing of waste hydrocarbon material and/or of organic material or a mixture of the two and resulting in valuable liquid fuel, said process being but free of at least one, and preferably all, of the drawbacks of prior art known processes, said process minimizing transporting costs of the feed material on which the process is performed, and further reducing risks associated with transportation of waste material on along distance.

There was therefore a need for a managing system resolving at east one of preceeding problem and able to be efficient even if content of the feed material varies during their processing, particularly in the case wherein granules are prepared on the site from waste management material or in the case wherein granules are prepared on a location remote from the place wherein There was also a need for an equipment allowing efficient continuous or batch treatment process allowing the efficient processing of waste hydrocarbon material and/or of organic material or a mixture of the two and resulting in valuable liquid fuel, said equipment being but free of at least one, and preferably all, of the drawbacks of prior art known processes.

There was further a need for a process allowing the processing of waste hydrocarbon material and/or of organic material or a mixture of the two and resulting in valuable liquid fuel useable in traditional fields but also useful in new technical fields, said process being but free of at least one, and preferably all, of the drawbacks of prior art known processes.

There was further a need for a process allowing the processing of waste hydrocarbon material and/or of organic material or a mixture of the two and resulting in valuable liquid fuel, said process presenting at least one of the following advantages:
  no mechanical clogging;
  less contaminants picked up by the vapours after pyrolysis reactions;
  less damage to the reactor walls and pipes;
  treat all types of organic waste including organic MSW and waste hydrocarbons;
  less energy consumption; and
  better control of products obtained.

There was a further need for a managing system allowing efficient and continuous optimization of processes for processing of waste hydrocarbon material and/or of organic material or a mixture of the two and resulting in valuable liquid fuel, said system addressing at least one of the problems of the prior art processes, and preferably all of them.

There was further a need for a managing system/process allowing the processing of waste hydrocarbon material and/or of organic material or a mixture of the two and resulting in valuable liquid fuel, said managing systems presenting at least one of the following advantages:

the pressure is controlled by opening or blocking the vents and/or valves in the kiln and/or downstream from the kiln based on the amount of feed material entering the kiln and/or the current pressure within the kiln The temperature is controlled by controlling the amount of heat produced by burners of non-condensable gasses and/or by controlling the flow rate of the sweep gas and/or by controlling the temperature of the sweep gas and/or by controlling the flow rate of the liquid feed entering the kiln and/or by controlling the temperature of the liquid feed entering the kiln

SUMMARY

A Process for producing liquid fuels from starting material, that is waste hydrocarbon material and/or organic material, with elevated CCR values, preferably in a form of agglomerates such as pellets, and/or powders and/or in the form of a liquid with high viscosity, said starting material, preferably with a reduced content in water, metal, glass and rocks, or a mixture of the two, being advantageously thermally turned to a liquid form and further dewatered; the thereby obtained liquid fraction being thereafter submitted to a pyrolysis treatment, performed in a rotating kiln, and resulting in a solid-gas fraction exiting the rotating kiln, said solid-gas fraction allowing for the recovery of liquid fuels after a controlled liquid-solid separation treatment. New rotating kilns and apparatus for efficient performing of the processes. Managing system allowing the continuous optimisation of the process from starting material, that are waste hydrocarbons and/or organic material or a mixture of the two. Uses of liquid fuels thereby obtained. The agglomerates being produced on the site or in a remote location.

BRIEF DESCRIPTION OF THE FIGURES

FIG. 31 is a Table summarizing an example of the average content of MSW before and after sorting for composting and recycling material according to traditional methods.

GENERAL DEFINITION OF THE INVENTION

Figure 1:
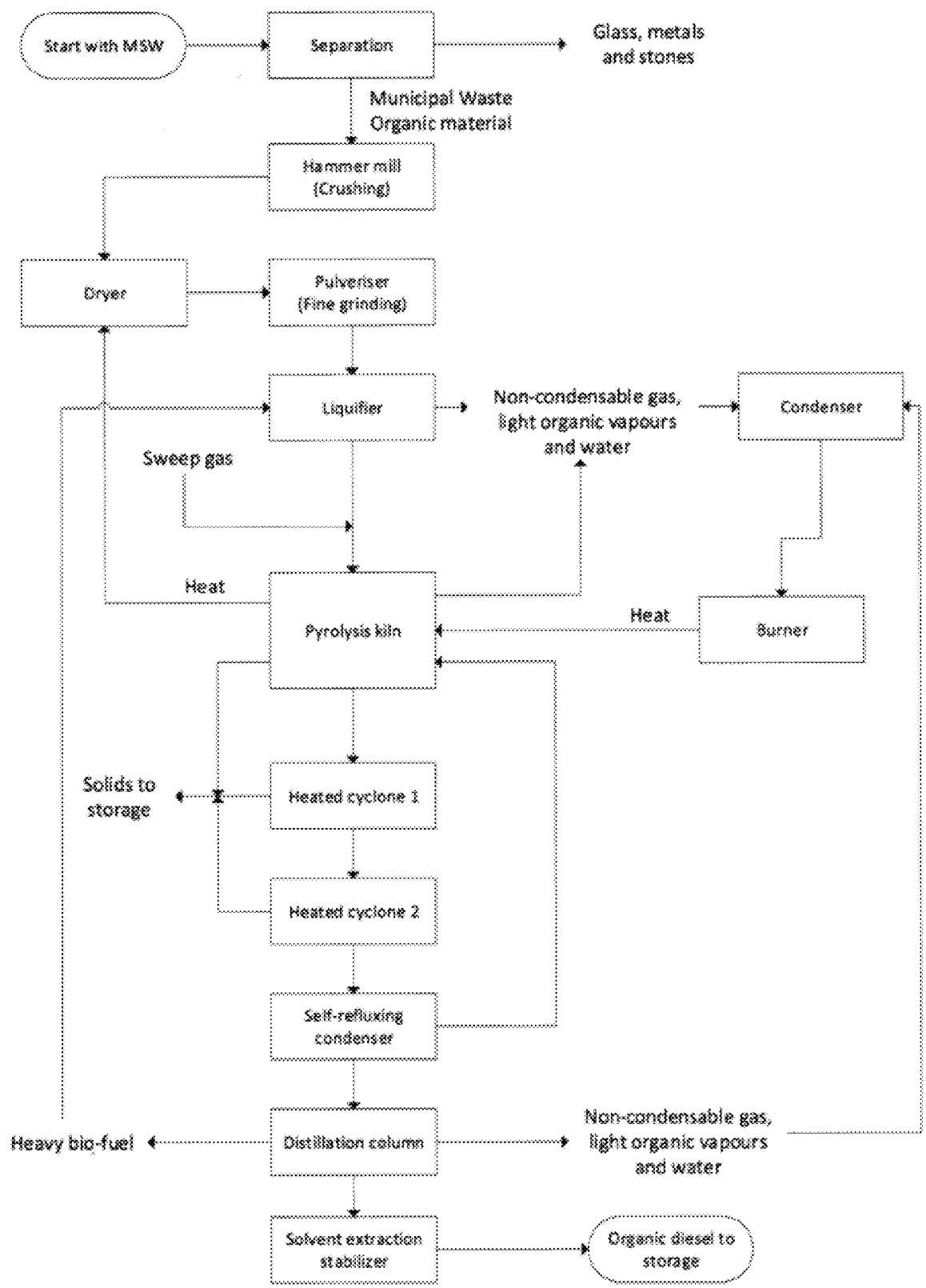
FIG. 1 is a simplified flow diagram illustrating a first embodiment of the process according to the present invention when starting from MSW and wherein pyrolysis is performed on the liquid feed material.

Preliminary Definitions:

Municipal solid waste (MSW), commonly known as trash or garbage in the United States and as refuse or rubbish in Britain, is a waste type consisting of everyday items that are discarded by the public. Waste can be classified in several ways but the following list represents a typical classification:
- biodegradable waste: food and kitchen waste, green waste, paper (most can be recycled although some difficult to compost plant material may be excluded);
- recyclable materials: paper, cardboard, glass, bottles, jars, tin cans, aluminum cans, aluminum foil, metals, certain plastics, fabrics, clothes, tires, batteries, etc.;
- inert waste: construction and demolition waste, dirt, rocks, debris;
- electrical and electronic waste (WEEE)—electrical appliances, light bulbs, washing machines, TVs, computers, screens, mobile phones, alarm clocks, watches, etc.;
- composite wastes: waste clothing, Tetra Packs, waste plastics such as toys;
- hazardous waste including most paints, chemicals, tires, batteries, light bulbs, electrical appliances, fluorescent lamps, aerosol spray cans, and fertilizers; and
- toxic waste including pesticides, herbicides, and fungicides.

Organic material: means organic matter, organic material, or natural organic matter (NOM) refers to the large pool of carbon-based compounds found within natural and engineered, terrestrial and aquatic environments. It is matter composed of organic compounds that has come from the remains of organisms such as plants and animals and their waste products in the environment. Organic molecules can also be made by chemical reactions that don't involve life. Basic structures are created from cellulose, tannin, cutin, and lignin, along with other various proteins, lipids, and carbohydrates. Organic matter is very important in the movement of nutrients in the environment and plays a role in water retention on the surface of the planet. Organic material may also include hydrocarbons and/or MSW or a mixture of the two, including plastics.

Contaminants: In MSW, the contaminants are non-combustible material and/or non-organic material, for example metals, stones and glass.

Liquid fuel: are combustible or energy-generating molecules that can be harnessed to create mechanical energy, usually producing kinetic energy; they also must take the shape of their container. It is the fumes of liquid fuels that are flammable instead of the fluid. Most liquid fuels in widespread use are derived from fossil fuels; however, there are several types, such as hydrogen fuel (for automotive uses), ethanol, and biodiesel, which are also categorized as a liquid fuel. Many liquid fuels play a primary role in transportation and the economy. Liquid fuels are contrasted with solid fuels and gaseous fuels.

Agglomerate: are coarse accumulations of solid particles and/or blocks. In the meaning of the present invention they are accumulations of particles obtained from the solids present in MSW and that have been previously transformed into smaller particles, for example by mechanical means. Agglomerates are typically poorly sorted, may be monolithologic or heterolithic, and may contain some blocks of various rocks.

Pellets: means a small rounded compressed mass of substance, that may, for example, be in the general form of cylinders.

Used Lubricating Oil (ULO): are oils or greases that were used as lubricants, usually in engines, and were discarded. Examples would include car engine oils, compressor oils, and diesel engine oils among others. Lubricating oils generally contain additives, which are carefully engineered molecules added to base oils to improve one or more characteristic of the lubricating oil for a particular use. Used lubricating oil is classified as a hazardous product in many jurisdictions because of its additives and contaminants.

Organic vapour: is the vapour produced from the pyrolysis of the feed material entering the rotating kiln. The components of the organic vapour may include hydrocarbons and may also comprise of only hydrocarbons.

Bio-oil: is the product from the condensation of the organic vapour. Bio-oil also includes specific chemicals obtained from the condensed organic vapour, which may be separated individually from the other components of the condensed organic vapour.

Liquification: means to increase the liquid fraction of a material which has at least a solid fraction. The resulting material after liquefaction is then considered a liquid and may or may not have entrained solids and/or gasses.

Substantially non-reactive gas: is a gas such as nitrogen, recycled reaction gas, carbon dioxide or water steam that does not affect or enter into the thermal processing or that does not substantially combine with either the feed or reaction products in the reactor operating range, for example in a temperature range ranging from 350 to 850 degrees Celsius, in a temperature range up to 700 degrees Celsius, preferably up to 525 degrees Celsius.

Waste oils: are oils or greases that are discarded. They include used lubricating oils (ULO) as well as a wide range of other oils such as marpol, refinery tank bottoms, form oils, metal working oils, synthetic oils and PCB-free transmission oils, to name a few.

Consistent shapes: means shapes so they can stay on the narrow shelves and/or each other, while protecting the reactor wall from direct contact with the relatively cold feed. In the meaning of the invention, the expression consistent shapes also means:
- a multiplicity of physical elements having substantially the same form;
- a multiplicity of physical elements having substantially the same form and substantially the same size;
- a multiplicity of physical elements having substantially the same size, provided those forms are compatible in such an extent that are globally symmetrical and stay substantially constant during rotation inside the rotating kiln; and
- a multiplicity of physical elements having shapes that permit that plates sit upon each other, preferably in such a way that there is no space or substantially no space between them.

Dynamical wall: the multiplicity of plates of consistent shapes results, because of the rotation, in a continuously reconstructing wall.

Thermal processing/thermally treating: is preferably any change in phase and/or composition, and/or reactions initiated or facilitated by the application, or withdrawal, of heat and/or temperature. Examples of thermal processing include evaporating, cracking, condensing, solidifying, drying, pyrolyzing and thermocleaning. In the meaning of the invention the expressions Thermal processing/thermally treating preferably exclude combustion and more specifically apply in the context of indirectly fired rotating kiln.

The height of a shelve: is the distance between the attachment point of the shelve on the reactor wall and the end of the shelve directed to the center of the reactor.

The width of a shelve: is the measurement of the distance between the two sides of the shelve on a direction perpendicular to the height of the shelve.

Sweep gas: is any non-reactive or substantially non-reactive gas. Preferably it is an inert gas such nitrogen, recycled reactor non-condensable gas or water steam. It was surprisingly found that such gas not only have as sweeping effect in the reaction zone of rotating operating reactor, but may help control the pressure in the reactor, may increase the safety in plant operations, may help control the reactions in the reactor and globally may improve the efficiency of the process. For example, the sweep gas is a gas stream that may additionally serve in various the following functions such as:

- when injected into the reactor feed line, the sweep gas changes the density of the total feed stream; it changes the flow regimes within the feed line and/or nozzles, which results in lower incidence of fouling and plugging of the piping and spray nozzles, and in improved spray patterns; further, the sweep gas favours atomization of the organic liquid feed stream before the organic liquid reaches the reaction sites on the hot plates, and/or
- if introduced into the liquid feed at temperatures above that of the organic liquid feed stream, it will increase the feed stream temperature and reduce the energy, or heat, provided by the kiln, and/or
- it reduces the organic vapour's and/or organic liquid's residence time in the reactor, by sweeping the organic vapours out of the reactor soon after they are formed, thereby reducing the incidence of secondary reactions, or over-cracking, resulting in higher liquid yields and more stable liquid product bio-oils, and/or
- the sweep gas present in the reactor reduces the organic vapour's partial pressure, and favours the vaporization of the lighter organic fractions, for example gasoil and naphtha, in the feed and products; this also reduces over cracking in the lighter fraction and increases the stability of the bio-oil liquid products, and/or
- the sweep gas helps to stabilize the pressure in the reactor, and/or
- when steam or nitrogen are used, the sweep gas reduces the risk of fires in the event of a leak in the reactor or in the downstream equipment; it will disperse the combustible vapours escaping and, hopefully, keep the combustible vapours from igniting, even if they are above their auto-ignition point, and/or
- it can also be part of the stripping gas stream in the product distillation unit.

In order to facilitate reading of the present description and of corresponding Figures, following table of correspondence is thereafter provided.

Shelves: are physical objects comprised of one or multiple pieces which extrude from the reactor wall and which serve the functionality of stopping the downwards sliding of reaction supports as the reactor rotates, thus pushing the reaction supports up the reactor wall as the reactor rotates. A series of shelf pieces (for example shelf 1s, shelf 2s, shelf 3s) linearly aligned act as a shelf. A shelf may comprise of one or many stoppers and/or one or many guides. A shelf may be comprised of one or many objects which serve both as guides and as stoppers.

Stoppers: are the parts of the shelves on which reaction supports rest as they ascent the reactor wall during the reactor's rotation. For example, stoppers may be in the form of cylinders, rectangles, parallelograms, or any deformed variations of the previously mentioned shapes. Stoppers may also push solid material which cannot slide and/or roll past the stoppers during the rotation of the reactor.

Guides: are the parts of the shelves which serve as a device for steadying or directing the motion of something, particularly to direct the movement the solid material which is fed into the reactor and/or which is removed from reaction supports. They have at least one side which is angled downwards from the horizontal axis, towards the side of the reactor in which shovels are located. As the reactor turns, solid material slides and/or rolls on the reactor wall and comes in contact with the guides. Upon contact with the guides, the solid material slides and/or rolls on the guides, which changes their momentum and directs the solid material towards the shovels. The guide closest to the shovels in each section of the reactor also has the functionality of directing the movement of the solid material from one section to another. The guide(s) which is(are) in contact with the shovel(s) direct the movement of solid material into the shovel(s).

Separator pieces: are physical pieces located within the reactor and attached to the reactor wall. When placed in a series, along the circumference of the reactor wall, separator pieces act as a separator, which has the function of preventing the movement of reaction supports between sections of the reactor. Separator pieces provide a surface on which reaction supports can rest on and/or bounce off of during the rotation of the reactor. Due to the rotation of the reactor and the pushing action provided by stoppers, reaction supports fall from the reactor wall and may be directed towards separator pieces. In this case, the movement of reaction supports are blocked by the presence of separator pieces. Due to the presence of a series of separator pieces, which make up an entire separator, the reactor is split into sections, in which reaction supports cannot leave during the normal operation of the reactor. (A VERIFIER PAR LOUIS)

Reaction supports: are physical objects in the reactor which serve as reaction sites for pyrolysis reactions. They move around in the reactor and slide over each other during the rotation of the reactor. Solid material gets deposited on the reaction supports due to pyrolysis reactions. As reaction supports slide over each other, they scrap each other and remove at least part of the solid material deposited on their surfaces and/or on other surfaces in the reactor. Reaction supports may, for example, have the shape of rectangular plates or triangular plates. Within the text, mentions of plates refers to reaction supports and they can be used interchangeably.

Figure 33A:
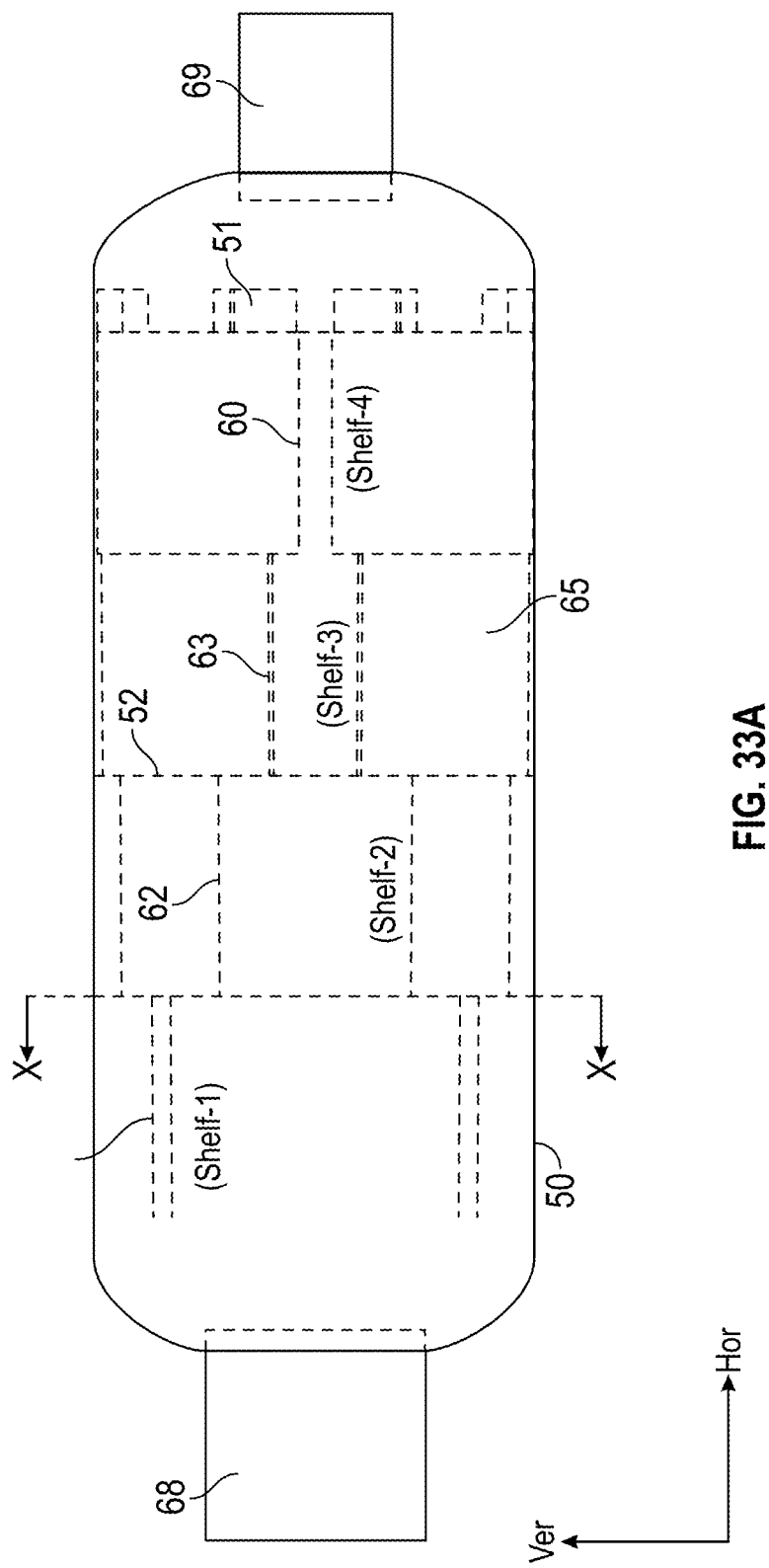
FIG. 33A is a front cross-sectional view according to a plan parallel to the vertical axis of one embodiment of the reactor which shows the presence of four types of shelves (60, 61, 62, 63) and illustrates the various sections which are formed using pieced separators, represented in FIG. 33B.
Figure 33B:
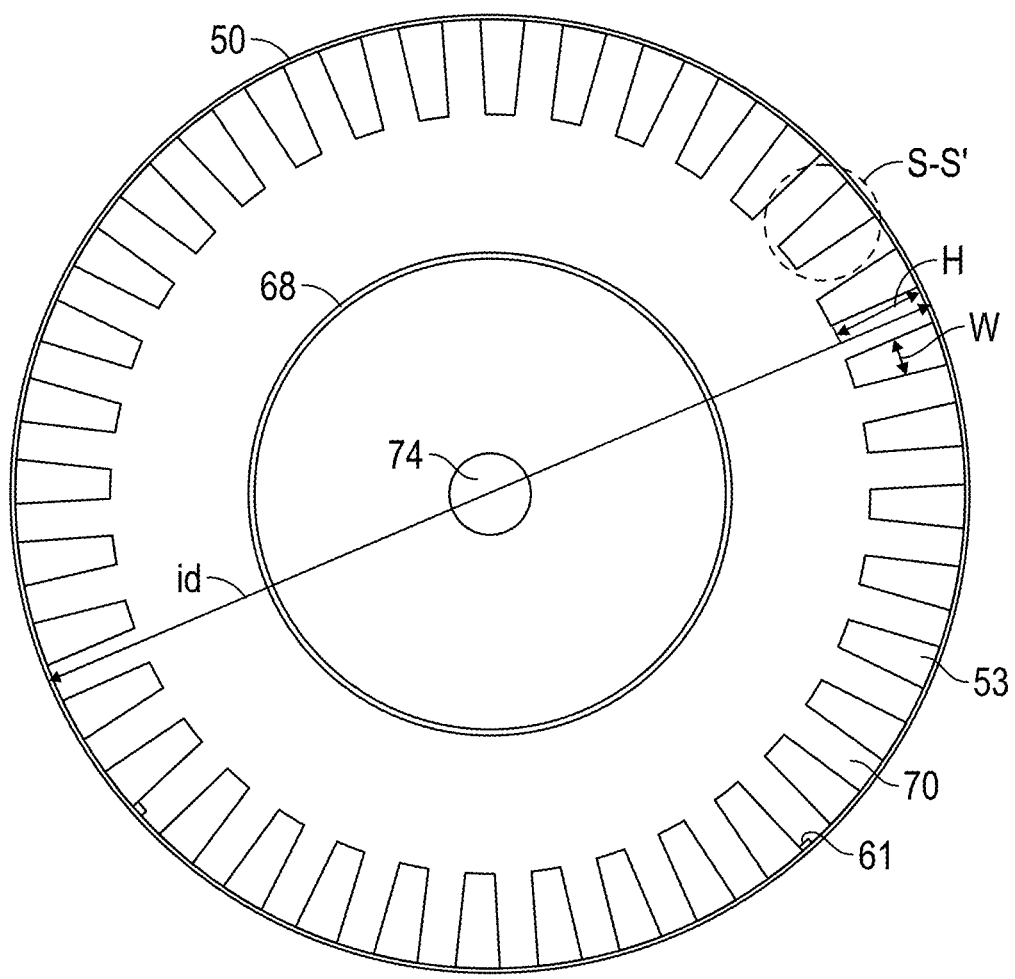
FIG. 33B is a left side cross-sectional view (cut X-X') of the reactor seen in FIG. 33A and according to a plan parallel to the vertical axis.

| ID | Name | Function | Position | Interacts with | Type of interaction |
|---|---|---|---|---|---|
| id | Inner diameter of kiln | | FIG. 33B | | |

-continued

Figure 35A:
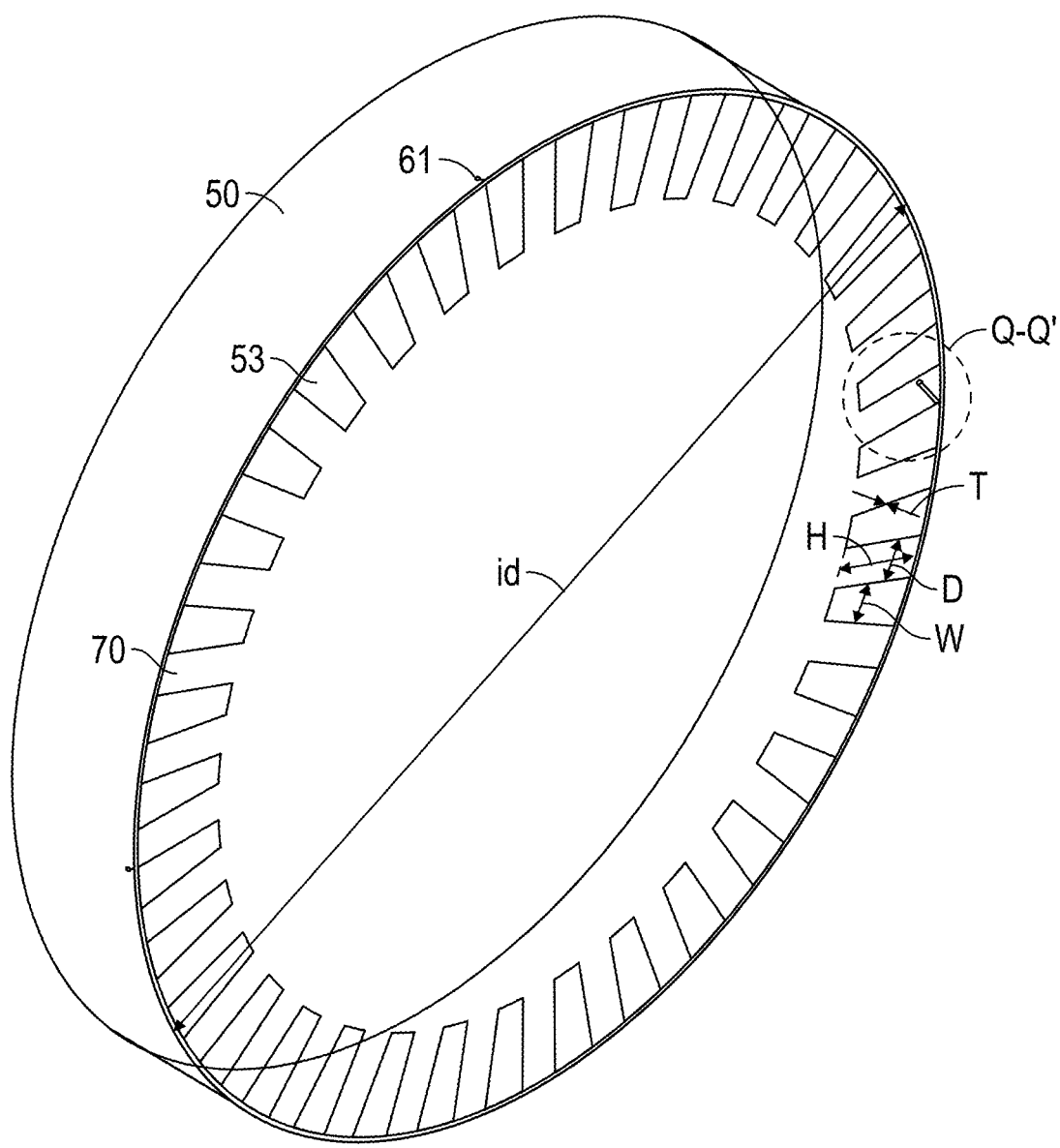
FIG. 35A is a 3D view of a short section of an embodiment of a reactor, cut according to a plane parallel to the inner diameter of the reactor, which illustrates the arrangement of separator pieces to form a pieced separator and, for simplicity, illustrates the positioning of only four shelf is in contact with four separator pieces which would guide solid material from one section of the reactor to another section.
Figure 35B:
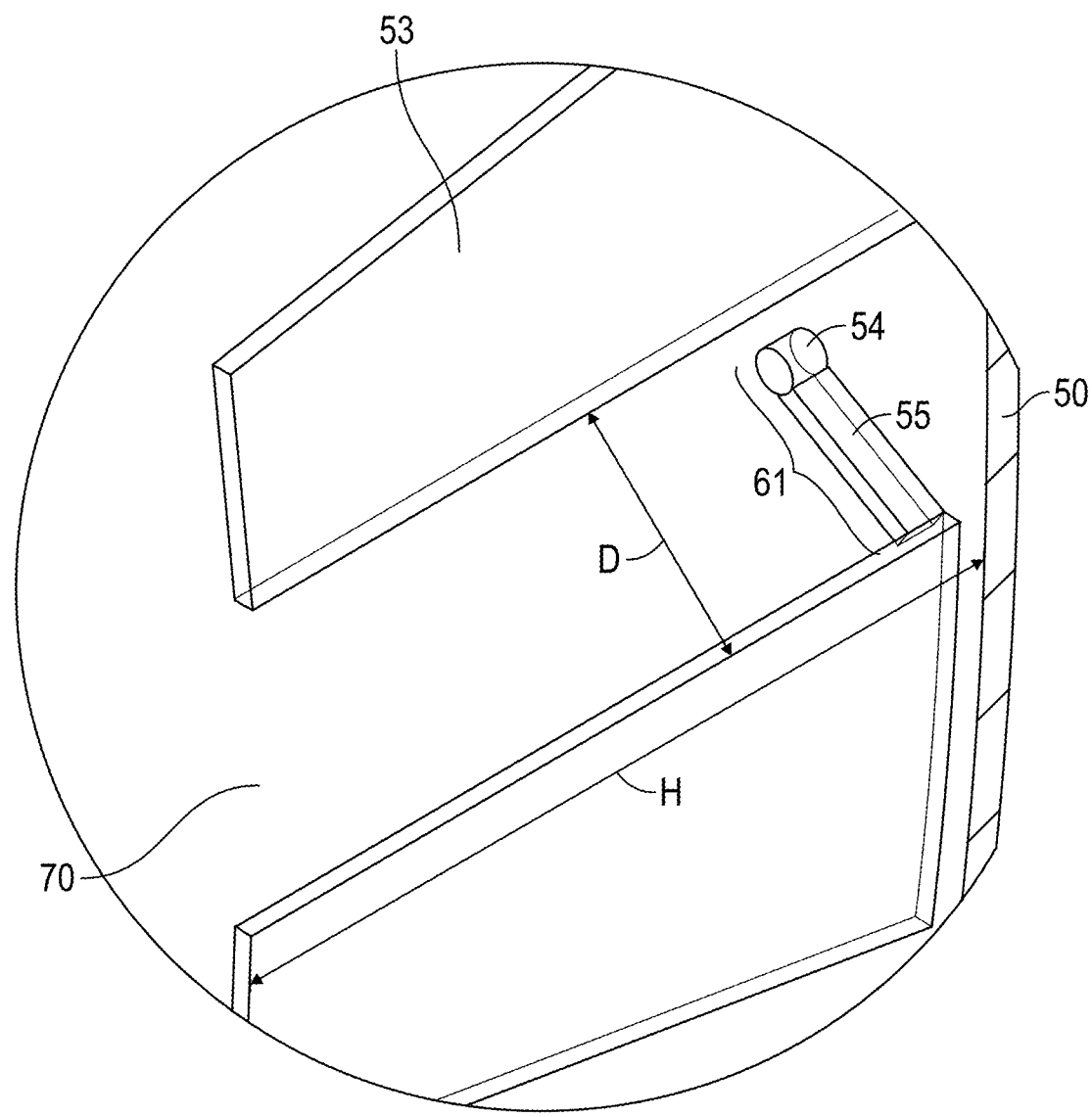
FIG. 35B is a 3D close-up view of the section Q-Q' circled in FIG. 35A showing a more detailed view of a shelf 1 in contact with a separator piece which would guide solid material from one section of the reactor to another section.
Figure 36:
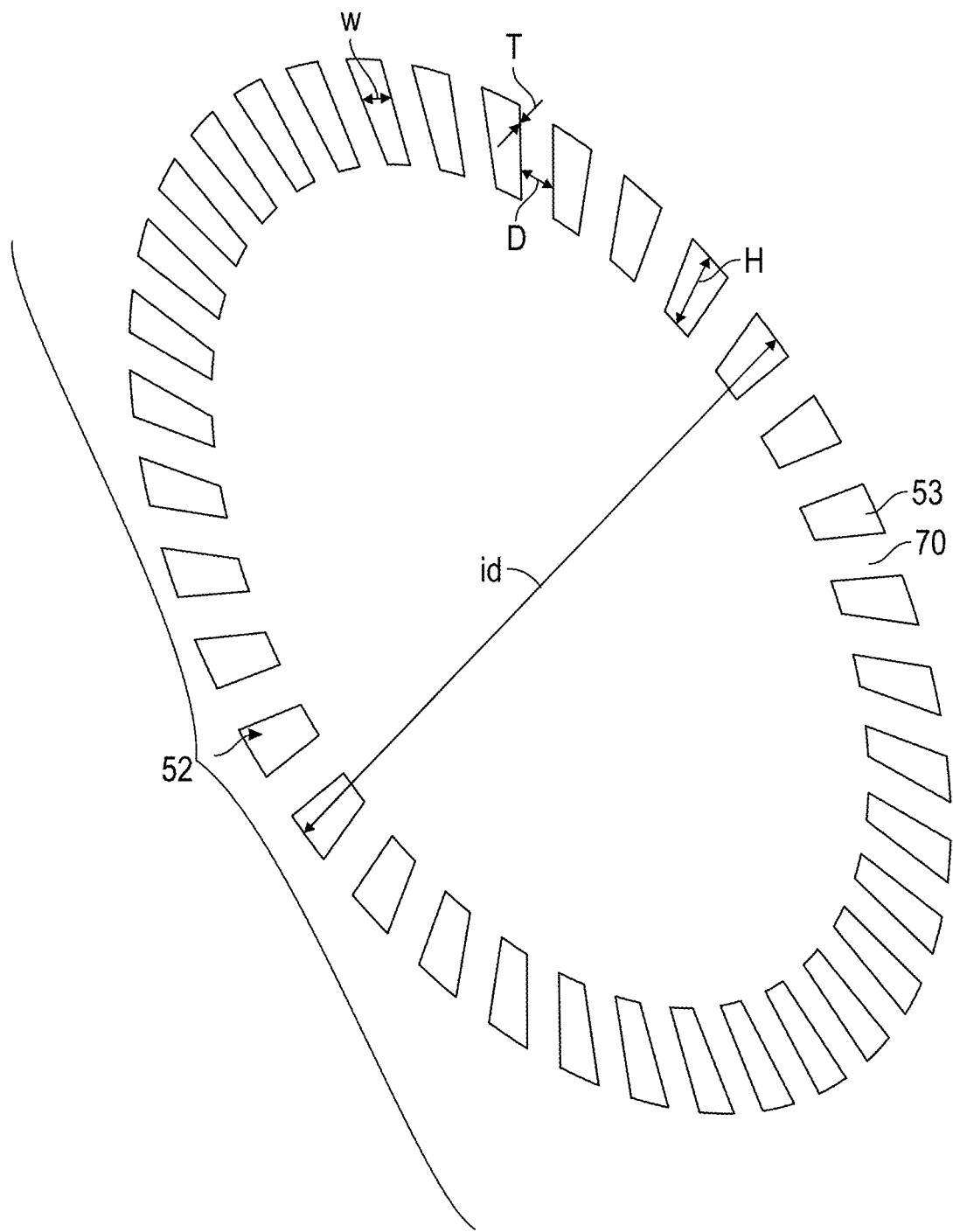
FIG. 36 is a 3D view of an isolated pieced separator, consisting of a series of separator pieces which have the shape of a deformed rectangle, in which the gaps between separator pieces allow the passage of solid material from one section of the reactor to another section.
Figure 37:
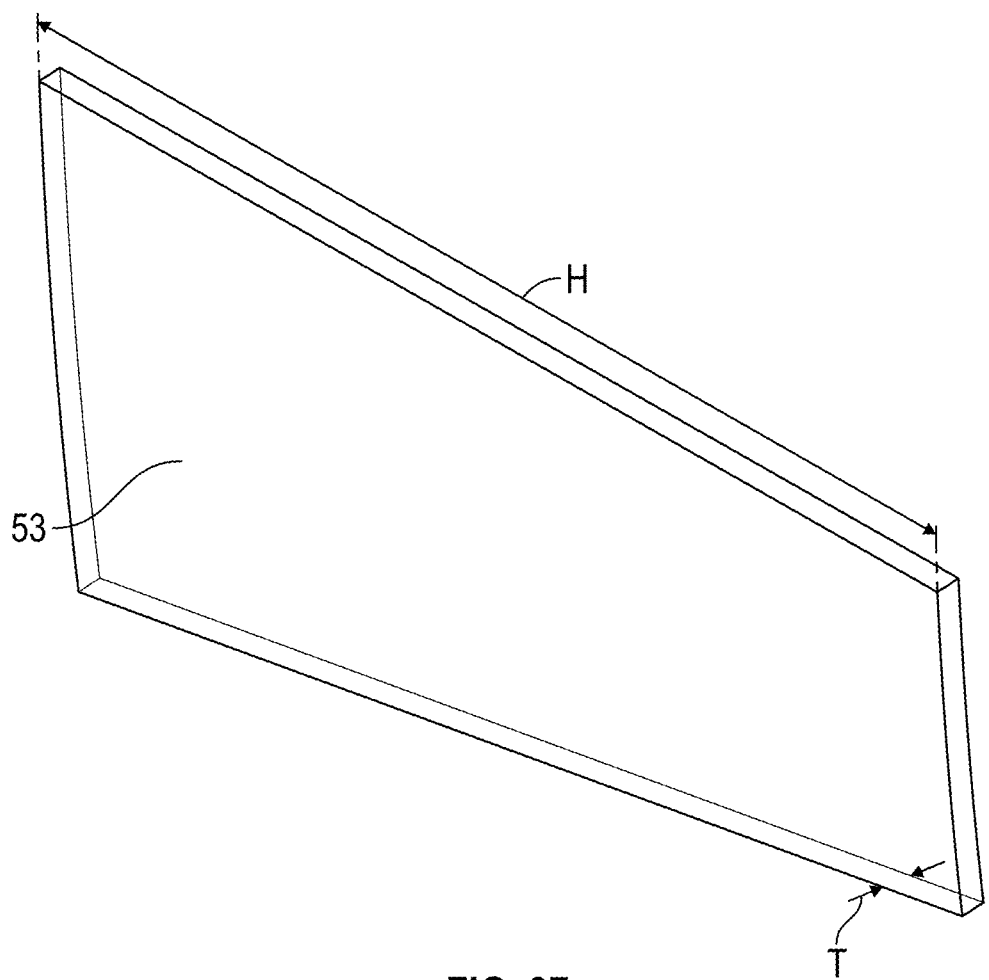
FIG. 37 is a 3D view of a single separator piece according to FIG. 36.
Figure 38:
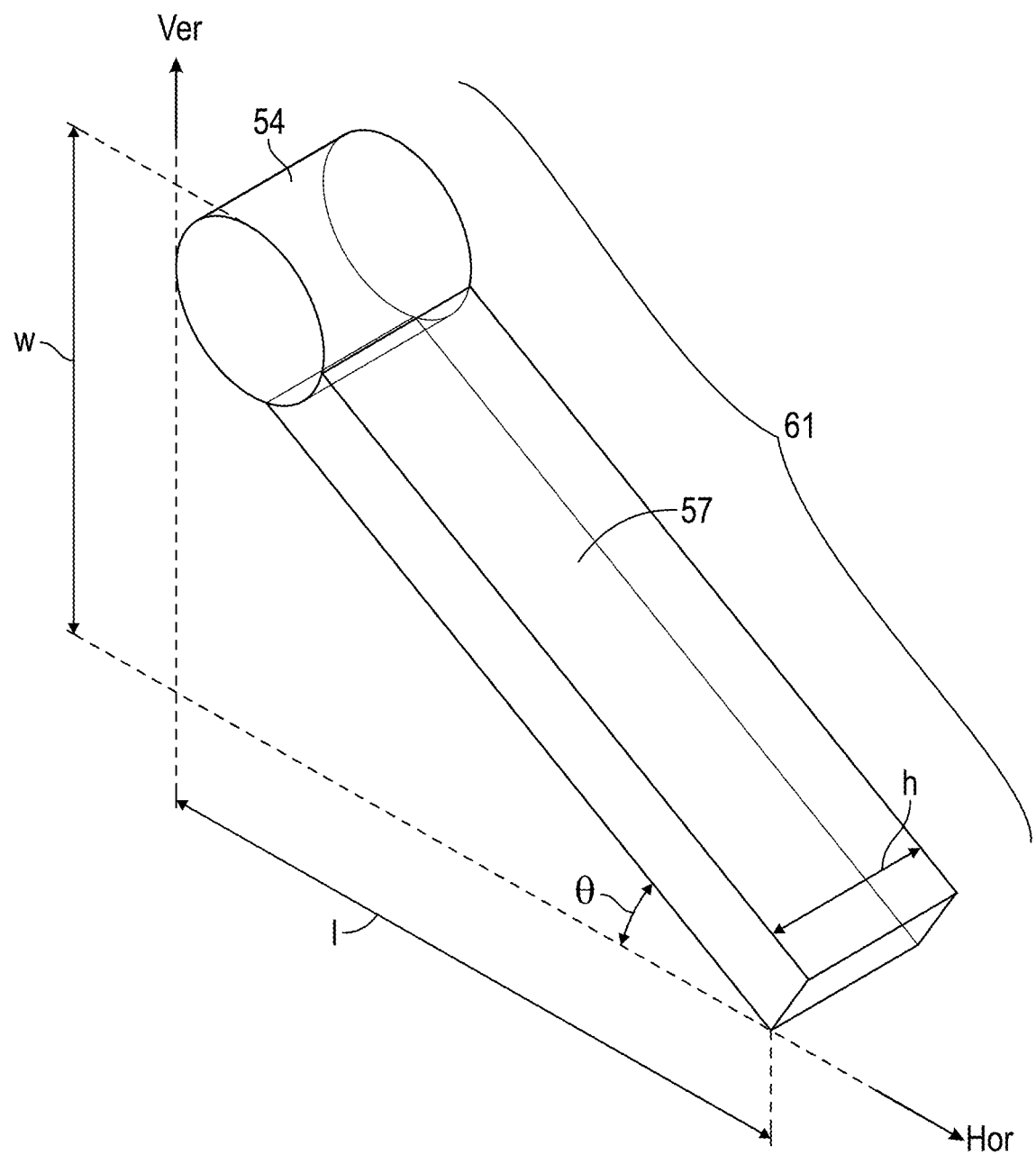
FIG. 38 is a 3D view of a single shelf 1, illustrating the stopper (54) and guide (55) portion of this type of shelf, wherein 0 is the angle between the horizontal axis and the guide.
Figure 44:
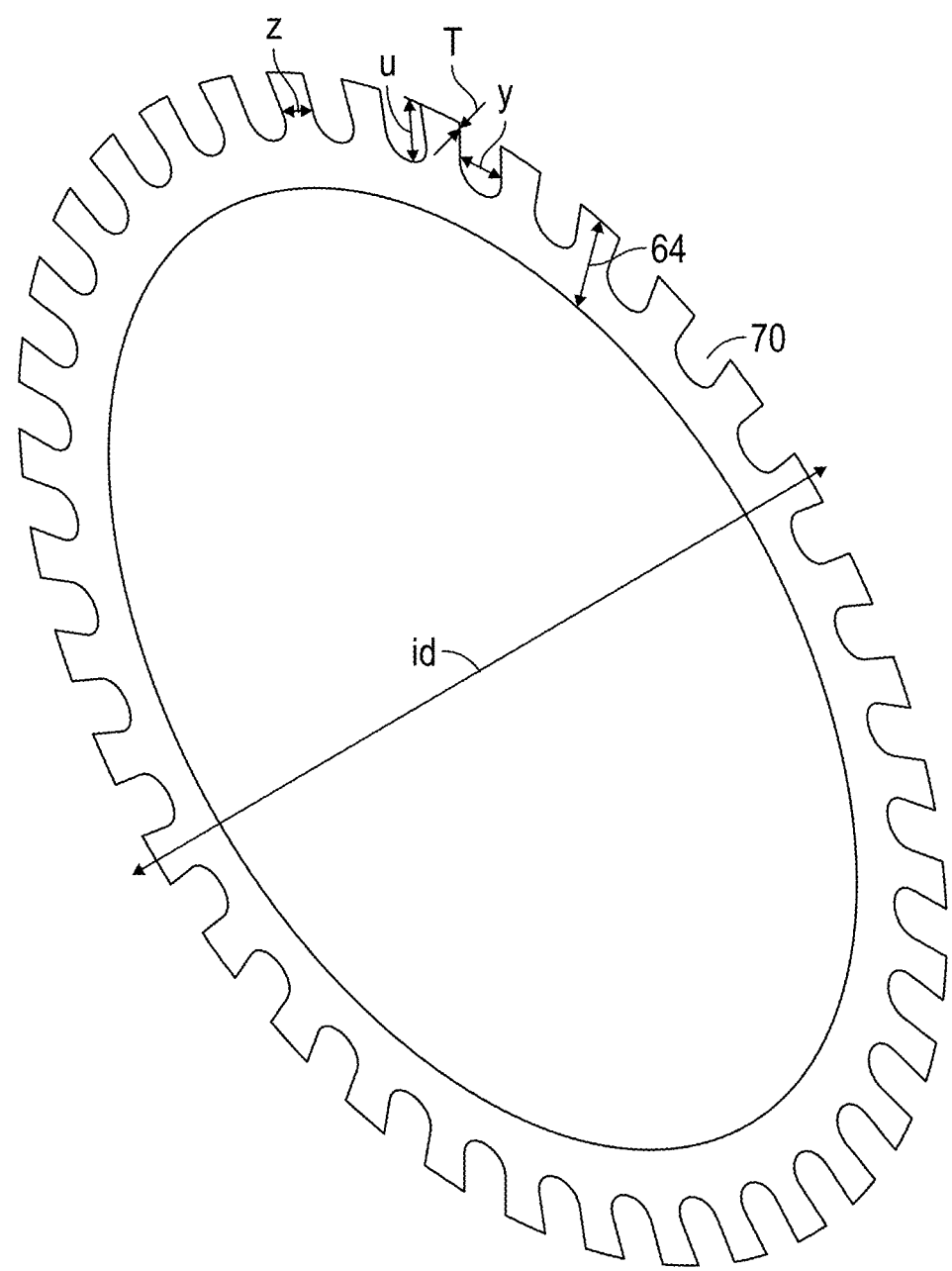
FIG. 44 is a 3D view of a punctured separator, consisting of one piece which has several holes which are used to allow the passage of solid material from one section of the reactor to another section.
Figures 45A, 45B:
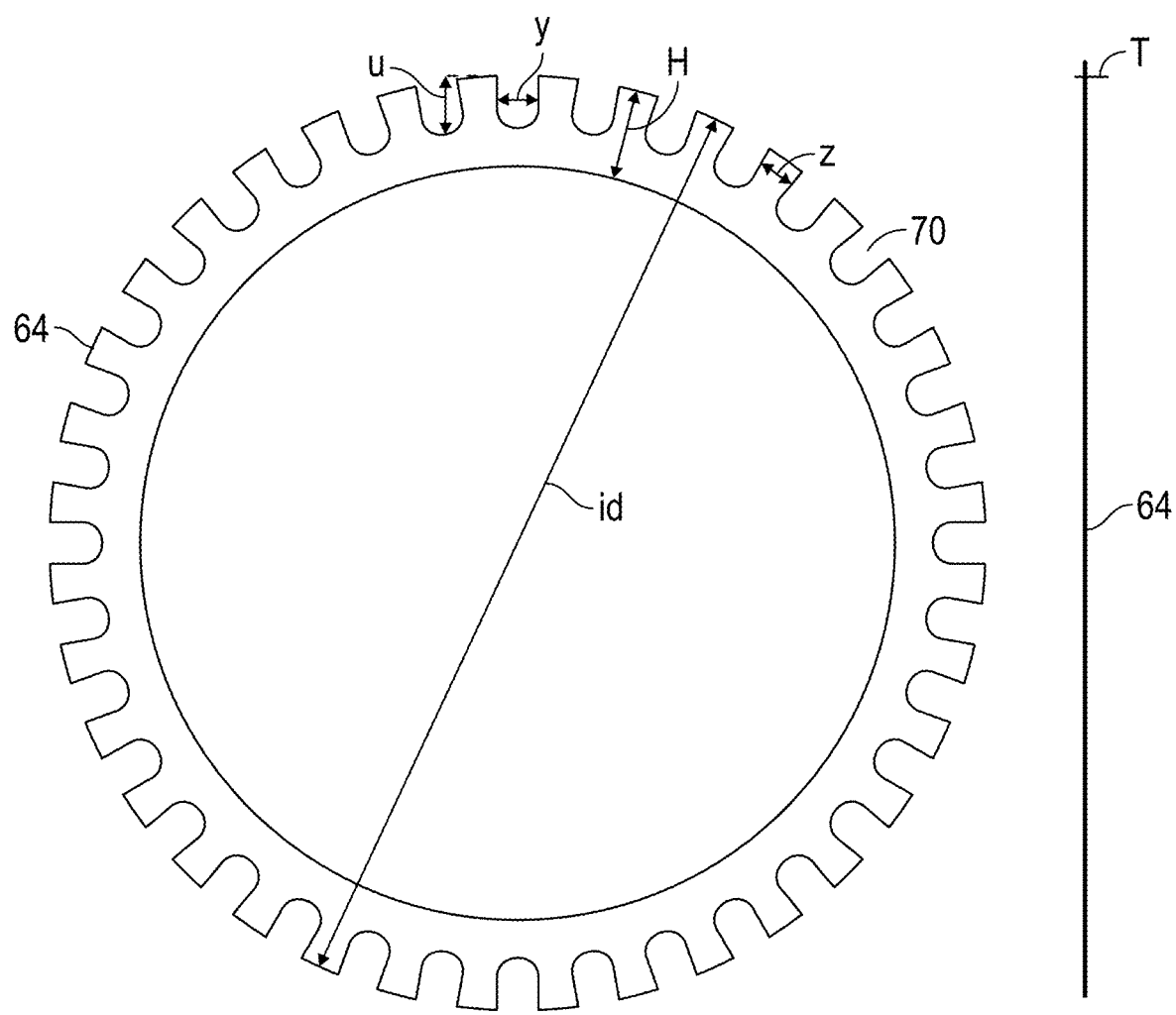
FIG. 45A is a front view of the punctured separator represented in FIG. 44.
FIG. 45B is a side view of the punctured separator represented in FIG. 44.
Figure 46A:
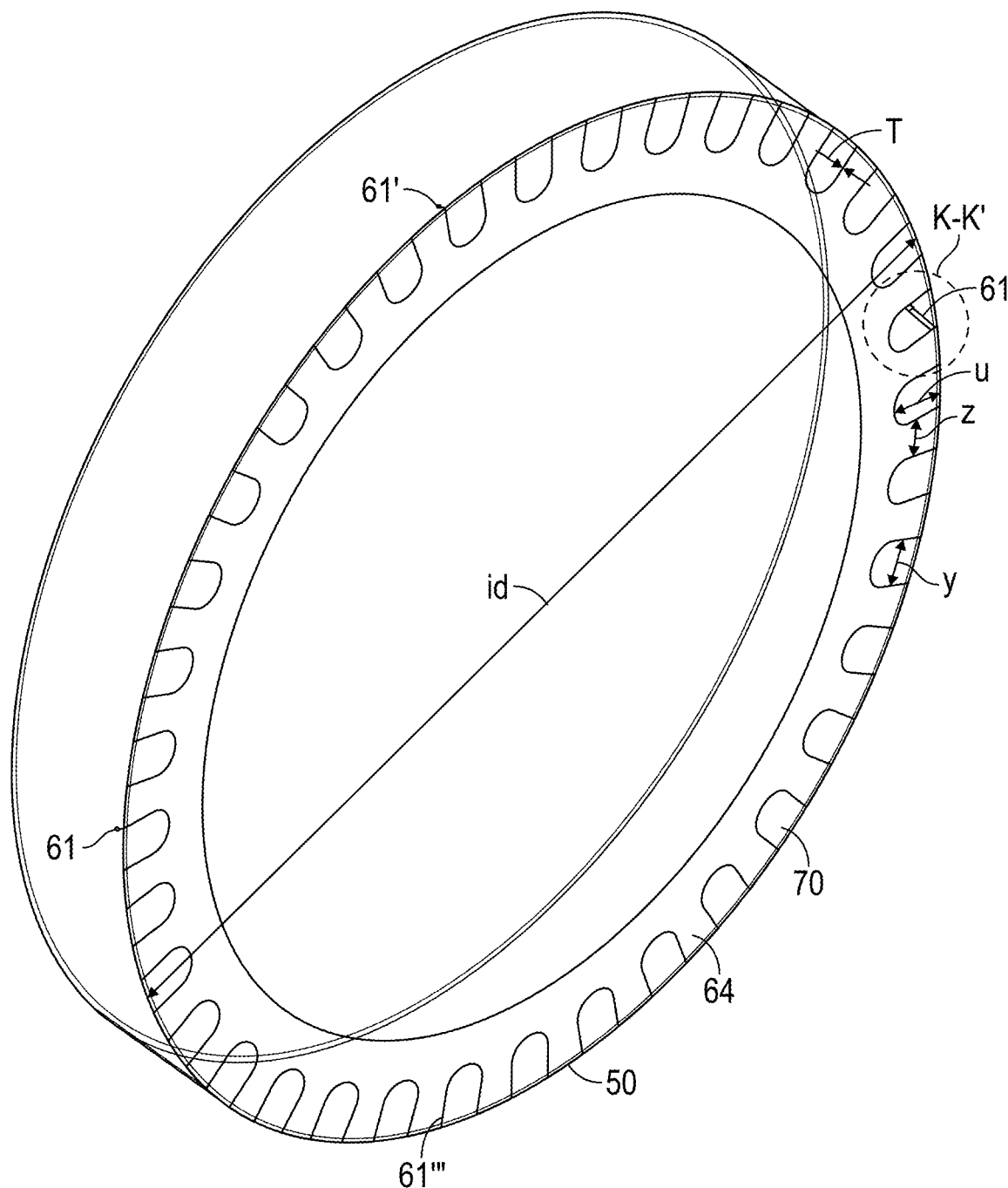
FIG. 46A is a 3D view of a short section of an embodiment of a reactor, cut according to a plane parallel to the inner diameter of the reactor, which illustrates the placement of a punctured separator and, for simplicity, illustrates the positioning of only four shelf is in contact with the punctured separator which would guide solid material from one section of the reactor to another section.
Figure 46B:
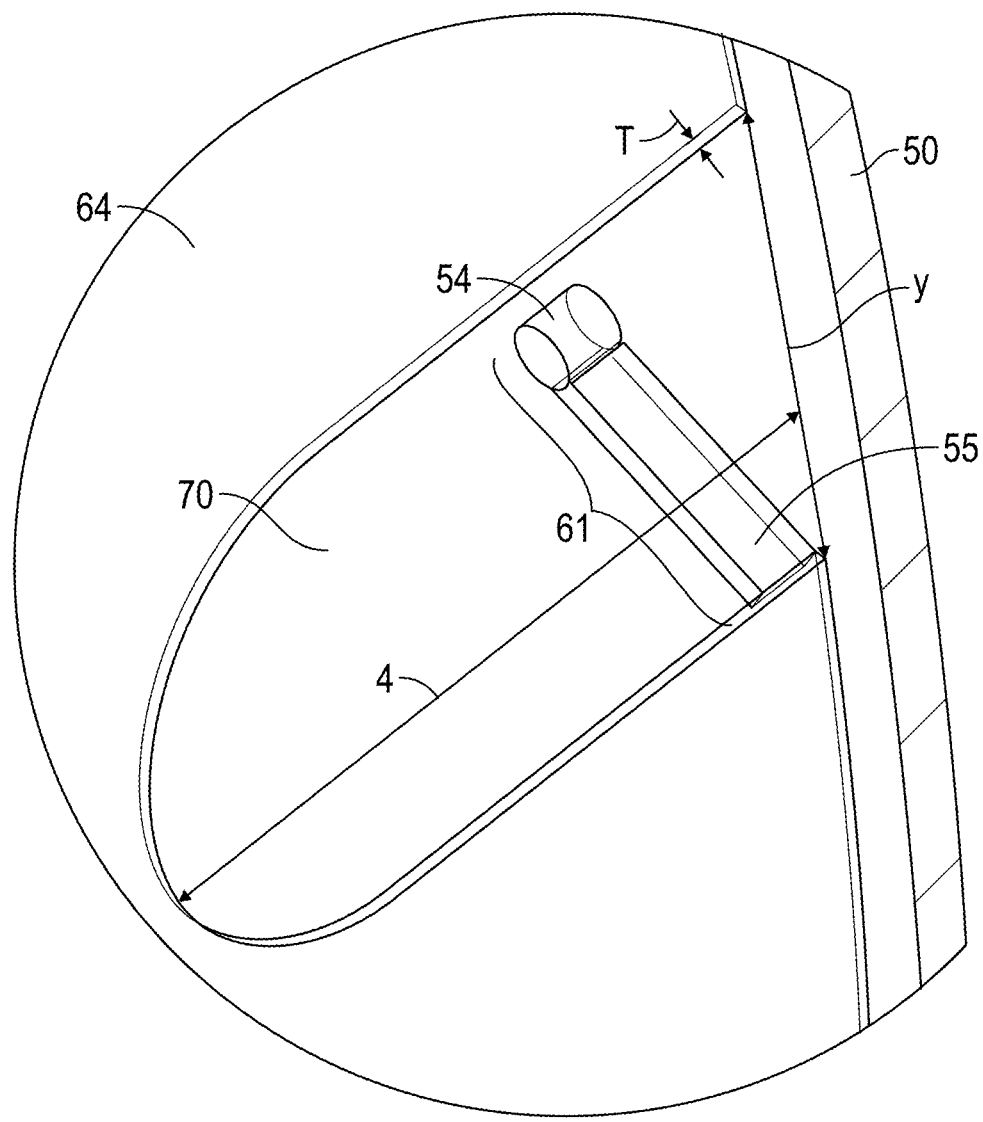
FIG. 46B is a 3D close-up view of the section K-K' circled in FIG. 46A showing a more detailed view of a shelf 1 in contact with a punctured separator which would guide solid material from one section of the reactor to another section.

| ID | Name | Function | Position | Interacts with | Type of interaction |
|---|---|---|---|---|---|
| H | Height of a separator | | FIG. 33B | | |
| D | Distance between separator pieces | | FIG. 35A | | |
| W | Width of a separator piece | | FIG. 33B | | |
| T | Thickness of a separator | | FIG. 33B | | |
| h | Height of a shelf | | FIG. 38 | | |
| l | Length of a shelf | | FIG. 38 | | |
| w | Width of a shelf | | FIG. 38 | | |
| u | Height of a hole | | FIG. 44 | | |
| y | Width of a hole | | FIG. 44 | | |
| z | Distance between separator holes | | FIG. 44 | | |
| θ | Angle of a guide | | FIG. 38 | | |
| Ver | Vertical axis | | FIG. 33A | | |
| Hor | Horizontal axis | | FIG. 33A | | |
| 50 | Rector wall | Heated surface which provides heat to the reaction supports and provides a surface on which the reaction supports can rest on and fall off of | FIG. 33A | 71 | Rotates and provides a surface and heat to reaction supports (71). Also provides a surface for solid material (66) to flow out as it is pushed out of the reactor. Provides a surface on which shelves and separators can be installed. |
| 51 | Shovel | Takes solid material out of the reactor | If guides are angled to the right, the shovels are placed at the extremity of the right-most guides of the reactors. They are positioned such that solid material which slides on the guides of the right-most shelves fall into the shovels. If guides are angled to the left, the shovels are placed at the extremity of the left-most guides of the reactors. They are positioned such that solid material which slides on the guides of the left-most shelves fall into the shovels. | 66 | Drives solid material (66) out of the reactor |
| 52 | Pieced separator | Separates the reactor into different sections and is consisted of several separator pieces. Provides a surface to restrain the movement of reaction supports in order keep reaction support(s) in a certain section of the reactor as it moves around due to the rotation of the reactor. Provides holes between the separator pieces in which solid material can travel from one section to another, ultimately leading to shovels. | Placed along the circumference of the interior reactor wall. Pieced separators are distance z between one another. | 71, 65, 66 | Separates the reactor into different sections (65). Provides holes for the movement of solid material (66). Provides a wall to keep a reaction support (71) in a specific section as it falls. |

| ID | Name | Function | Position | Interacts with | Type of interaction |
|---|---|---|---|---|---|
| 53 | Separator piece | A separator piece which makes up a pieced separator. A separator piece can have various forms such as cylindrical, rectangular or conical. The separator piece has the function of restraining the movement of reaction supports to ensure that reaction supports to not leave the section of the reactor delimited by the pieced separators. | Placed distance D between one another along the circumference made up by the pieced separator | 71 | Provides a wall to keep a reaction support (71) in a specific section as it falls |
| 54 | Shelf 1 stopper | Part of a shelf 1 on which reaction supports make contact and which allows reaction supports to move upwards as the reactor rotates | Placed above the shelf 1 guide and attached to the reactor wall | 71, 50 | Stops reaction supports (71) from falling until they climb high enough on the reactor wall (50) and fall over |
| 55 | Shelf 1 guide | Part of shelf 1 which directs solid material to a certain direction, ultimately leading the solid material towards the shovels | Placed below the shelf 1 stopper. Placed such that material that slides on the reactor wall and doesn't rest on a shelf 1 stopper, slides towards the shovels and possibly through a separator. | 51, 66 | Guides solid material (66) towards the shovels (51) |
| 56 | Shelf 2 stopper | Part of a shelf 2 on which reaction supports make contact and which allows reaction supports to move upwards as the reactor rotates | Placed above the shelf 2 guide and attached to the reactor wall | 71, 50 | Stops reaction supports (71) from falling until they climb high enough on the reactor wall (50) and fall over |
| 57 | Shelf 2 guide | Part of shelf 2 which directs solid material to a certain direction, ultimately leading the solid material towards the shovels | Placed below the shelf 2 stopper. Placed such that material that slides on the reactor wall and doesn't rest on a shelf 2 stopper, slides towards the shovels and possibly through a separator. | 51, 66 | Guides solid material (66) towards the shovels (51) |
| 58 | Shelf 3 stopper | Part of a shelf 3 on which reaction supports make contact and which allows reaction supports to move upwards as the reactor rotates | Placed above the shelf 3 guide and attached to the reactor wall | 71, 50 | Stops reaction supports (71) from falling until they climb high enough on the reactor wall (50) and fall over |
| 59 | Shelf 3 guide | Part of shelf 3 which directs solid material to a certain direction, ultimately leading the solid material towards the shovels | Placed below the shelf 3 stopper. Placed such that material that slides on the reactor wall and doesn't rest on a shelf 3 stopper, slides towards the shovels and possibly through a separator. | 51, 66 | Guides solid material (66) towards the shovels (51) |
| 60 | Shelf 4 | Shelf made up of a single long piece on which reaction supports make contact and which allows reaction supports to move upwards as the reactor rotates | Placed parallel to the horizontal axis and attached to the reactor wall. Positioned within the same section of the reactor and placed along the circumference of the reactor wall such that there is equal space between other shelf 4 which are in the same section of the reactor. | 71, 50 | Stops reaction supports (71) from falling until they climb high enough on the reactor wall (50) and fall over |
| 61 | Shelf 1 | Shelf made up of a circular stopper and an angled guide on which reaction supports make contact and which | Placed next to other shelf 1s and attached to the reactor wall. Sets of shelf 1s are | 71, 50, 51, 66 | Stops reaction supports (71) from falling until they climb high enough on the reactor wall (50) and fall |

-continued

Figure 47A:
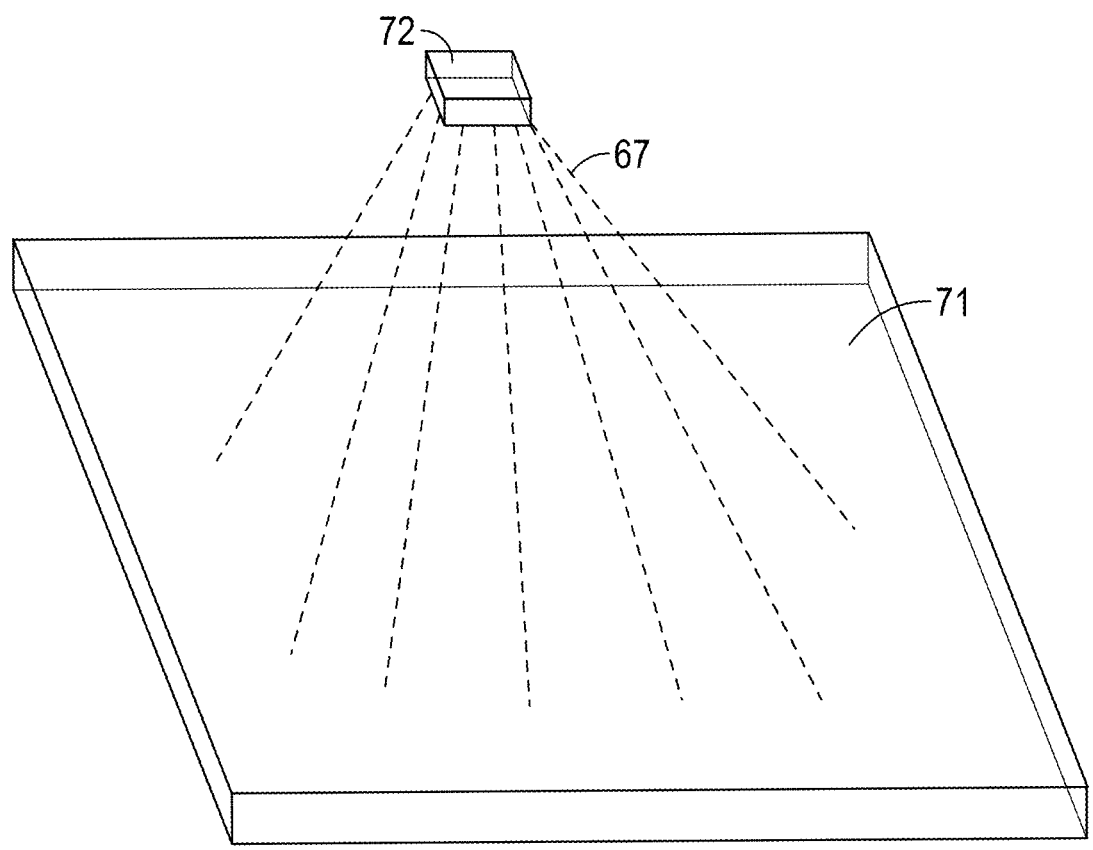
FIG. 47A is a 3D representation of feed material being sprayed onto a reaction support.
Figure 47B:
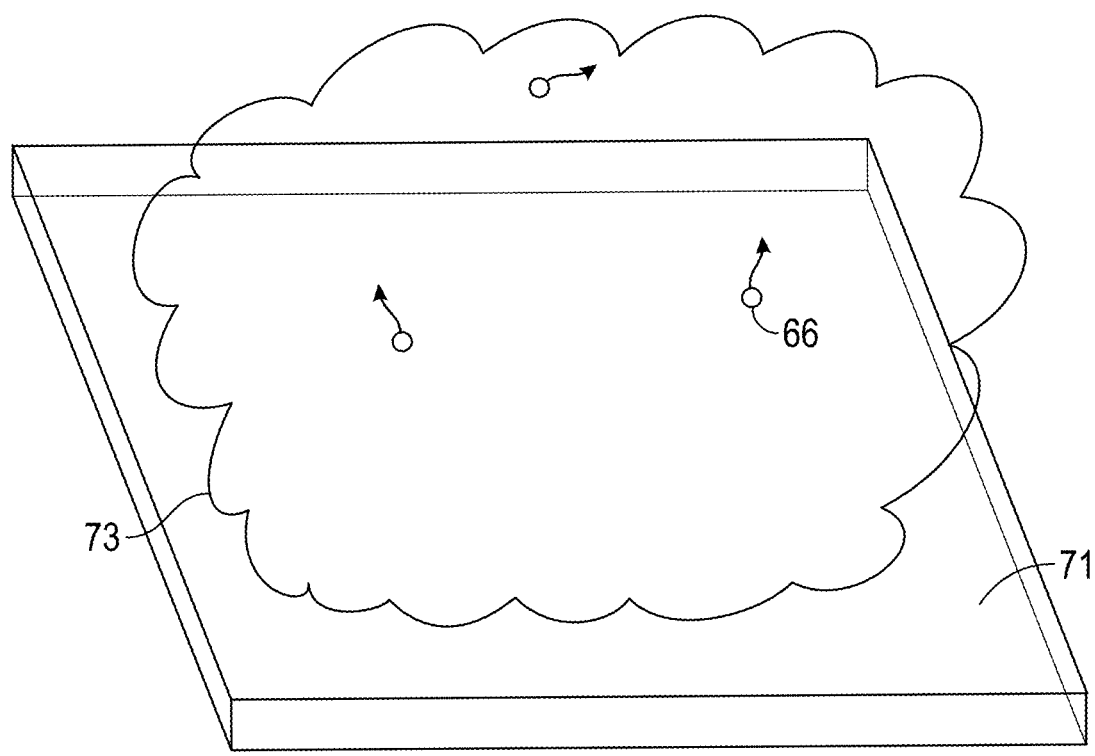
FIG. 47B is a 3D representation of the pyrolysis vapors being formed through pyrolysis reactions of the feed material on the reaction support and the entrainment of solid material formed through pyrolysis reactions of the feed material on the reaction support.
Figure 47C:
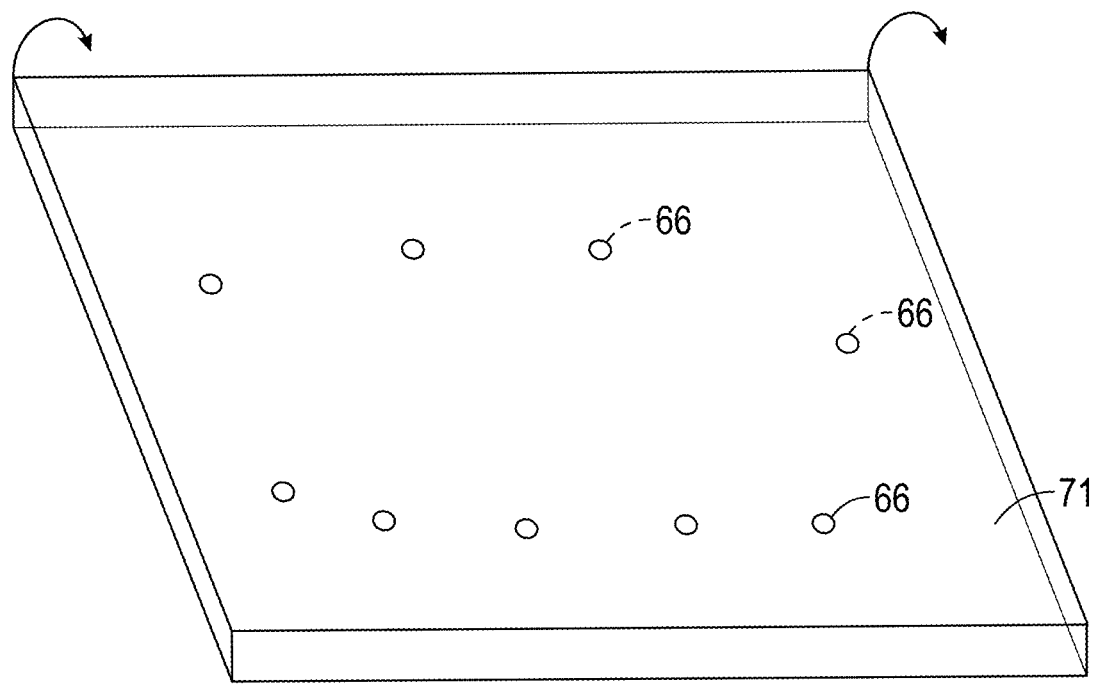
FIG. 47C is a 3D representation of the solid material deposited on reaction support due to the pyrolysis reactions and illustrating the flipping of the reaction support.
Figure 47D:
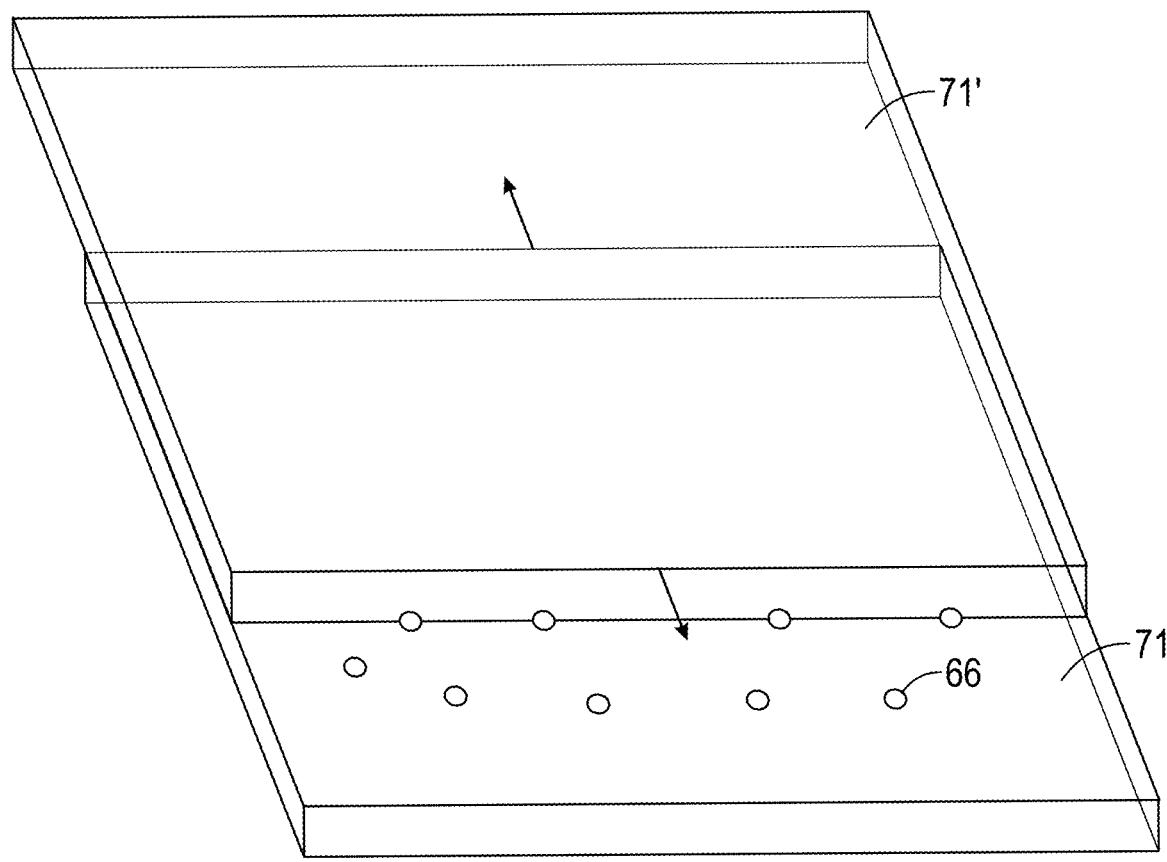
FIG. 47D is a 3D representation of a second reaction support (71') scraping against the reaction support illustrated in FIG. 47C, which is removing solid material deposited on the reaction support illustrated in FIG. 47C.
Figure 47E:
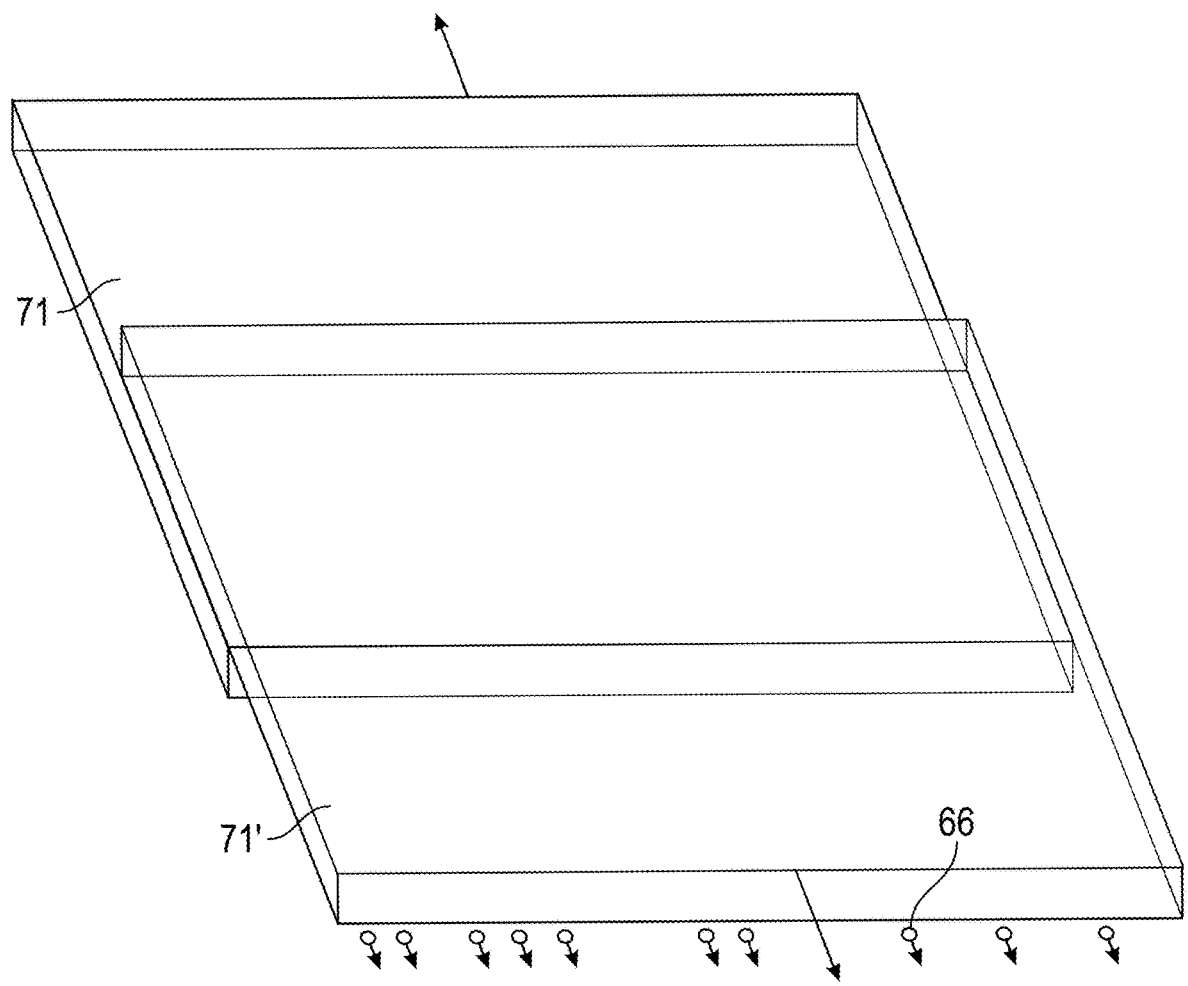
FIG. 47E is a 3D representation of the removal of solid material from the reaction support illustrated in FIG. 47D.

| ID | Name | Function | Position | Interacts with | Type of interaction |
|----|------|----------|----------|----------------|---------------------|
| | | allows reaction supports to move upwards as the reactor rotates | arranged parallel to the horizontal axis. Sets of shelf 1s are positioned within the same section of the reactor and placed along the circumference of the reactor wall such that there is equal space between other sets of shelf 1s which are in the same section of the reactor. | | over. Guides solid material (66) towards the shovels (51) |
| 62 | Shelf 2 | Shelf made up of a rectangular stopper and an angled guide, both connected to one another, on which reaction supports make contact and which allows reaction supports to move upwards as the reactor rotates | Placed next to other shelf 2s and attached to the reactor wall. Sets of shelf 2s are arranged parallel to the horizontal axis. Sets of shelf 2s are positioned within the same section of the reactor and placed along the circumference of the reactor wall such that there is equal space between other sets of shelf 2s which are in the same section of the reactor. | 71, 50, 51, 66 | Stops reaction supports (71) from falling until they climb high enough on the reactor wall (50) and fall over. Guides solid material (66) towards the shovels (51) |
| 63 | Shelf 3 | Shelf made up of a rectangular stopper and an angled guide, neither of them connected to one another, on which reaction supports make contact and which allows reaction supports to move upwards as the reactor rotates | Placed next to other shelf 3s and attached to the reactor wall. Sets of shelf 3s are arranged parallel to the horizontal axis. Sets of shelf 3s are positioned within the same section of the reactor and placed along the circumference of the reactor wall such that there is equal space between other sets of shelf 3s which are in the same section of the reactor. | 71, 50, 51, 66 | Stops reaction supports (71) from falling until they climb high enough on the reactor wall (50) and fall over. Guides solid material (66) towards the shovels (51) |
| 64 | Punctured separator | Separates the reactor into different sections and is consisted of a single piece with several holes. Provides a wall to keep a reaction support in a specific section as it falls. Provides holes between the separator pieces in which solid material can travel from one section to another, ultimately leading to shovels. | Placed along the circumference of the interior reactor wall. Pieced separators are distance z between one another. | 71, 65, 66 | Separates the reactor into different sections (65). Provides holes for the movement of solid material (66). Provides a wall to keep a reaction support (71) in a specific section as it falls. |
| 65 | Reactor section | Section separated by separators. Location in which reaction supports are confined and cannot escape as they move around and fall during the reactors rotation. | FIG. 33A | | |
| 66 | Solid material | Solid material formed during pyrolysis reactions or fed into the reactor | FIG. 47B | 71, 50, 51, 55, 57, 59, 60-63, 75-78 | Is formed from feed material (67) as it hits reaction supports (71). It is scraped off said reaction supports by other reaction supports and rests on the |

-continued

| ID | Name | Function | Position | Interacts with | Type of interaction |
|---|---|---|---|---|---|
|  |  |  |  |  | reactor wall (50). As the reactor rotates, the solid material is pushed by guides (55, 57, 59) towards the shovels. Once within a shovel (51), the solid material is lifted and dropped onto the solid material ramp (77). It slides on the solid material ramp into the solid exit tube (76), in which it is pushed by the screw conveyor (75), ultimately leading out of the reactor (78). Solid material also rests on stoppers (54, 56, 58) and falls off onto reaction supports or onto other reactor internals as the reactor rotates and the stoppers move higher and higher. |
| 67 | Feed material | Material fed into the reactor and sprayed onto hot reaction supports which act as reaction sites for pyrolysis reactions | FIG. 47A | 71, 66 | Is sprayed onto reaction supports (71) and reacts to form pyrolysis vapours and solid material (66) |
| 68 | Reactor inlet shell | Shell surrounding the reactor inlet hole to provide space for insulation and to provide structural integrity for the reactor's rotation | Placed around the reactor inlet hole |  |  |
| 69 | Reactor outlet shell | Hole through which vapours and entrained solid may exit the reactor | Placed in the center of the hemisphere located at the extremity of the reactor which is closest to the shovels |  |  |
| 70 | Hole in separator | Allows the passage of solid material across separators (from one section of the reactor to another) | FIG. 44 | 66 | Permits the passage of solid material (66) through a separator |
| 71 | Reaction support | Location on which thermal processing occurs. Reaction supports are heated due to heat transfer with the reactor wall. As reactor feed material makes contact wit a reaction support, it reacts to form pyrolysis vapours and char, some of which is deposited onto the reaction support. The reaction supports move up the reactor wall as the reactor rotates due to shelves. As a reaction support reaches high enough in the reactor, it falls onto other reaction supports, flips and scrapes the reaction supports below it. | FIG. 47A | 71, 60-63, 66, 67 | Is a reaction support for the thermal processing of feed material (67). Solid material (66) gets deposited onto the reaction supports during thermal reactions. Solid material is scraped off as other reaction supports (71) pass over the surface of the reaction support on which solid material is deposited. Is pushed by shelves (60-63) as the reactor rotates. Falls off and flips. Scrapes other reaction supports during its decent. |
| 72 | Spray nozzle | Sprays feed material onto the reaction supports | FIG. 47A | 67, 71 | Sprays feed material (67) onto the reaction supports (71) |
| 73 | Pyrolysis vapor | Vapor produced from pyrolysis reactions | FIG. 47B | 66 | Entrains solid material (67) |
| 74 | Reactor inlet hole | Hole through which feed material passes to enter the reactor | Placed in the center of the reactor inlet shell | 67 | Hole through which feed material (67) passes to enter the reactor |
| 75 | Screw conveyor | Pushes solid material through the solid exit tube | Located within the solid exit tube | 66, 76 | Pushes solid material (66) through the solid exit tube (76) |
| 76 | Solid exit tube | Tube which houses the screw conveyor and permits the flow of solid material out of the reactor | Placed in the center of the reactor outlet shell | 66, 75 | Houses the screw conveyor (75) and allows the passage of solid material (66) |

-continued

Figure 42:
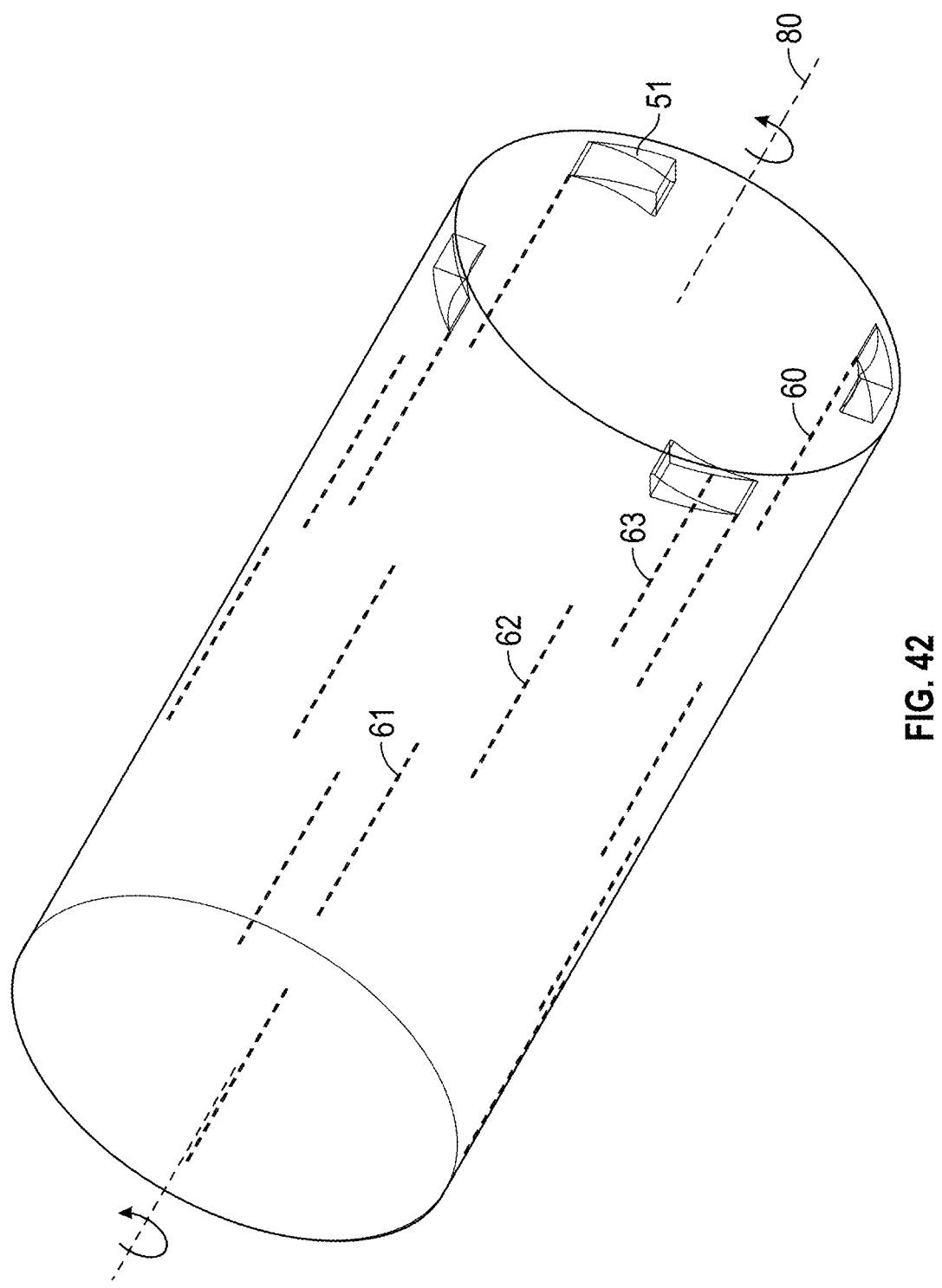
FIG. 42 is a 3D view of the cylindrical section of a reactor according to an embodiment which shows the use of all 4 types of shelf variants and shovels but, for simplicity, omits the use of separators.
Figure 48A:
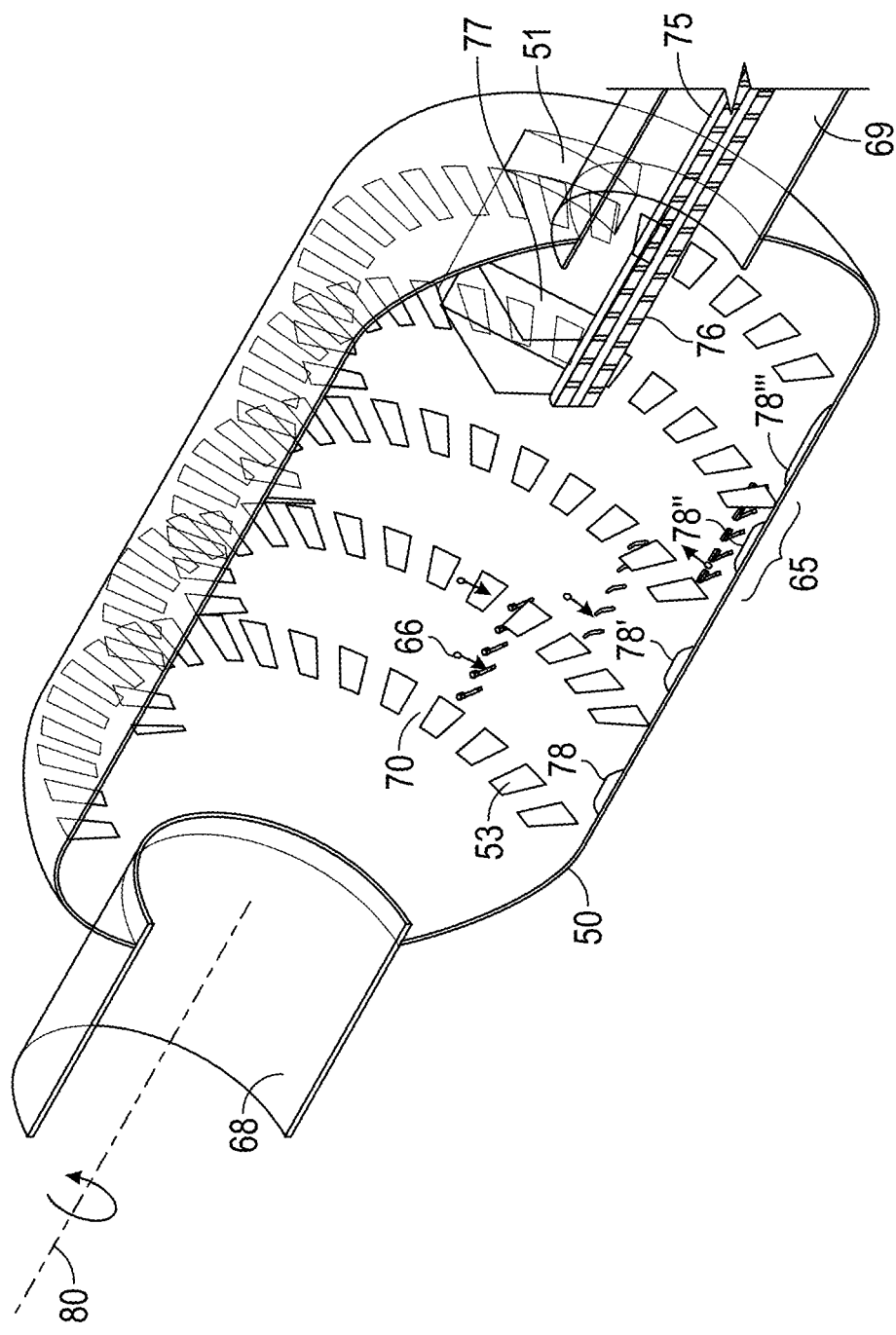
FIG. 48A is the first frame out of six of a 3D representation showing the first movement of solid material produced in the reactor during pyrolysis reactions within the reactor and illustrating firstly how the solid material produced in the reactor during pyrolysis reactions moves from section to section, illustrating secondly how the solid material produced in the reactor during pyrolysis reactions exits the reactor using shovels, a solid material ramp, a solid exit tube and a screw conveyor, and illustrating thirdly the accumulation of solid material produced in the reactor during pyrolysis reactions (78, 78', 78", 78''') within each section of the reactor and showing the increase in size of said accumulation of solid material due to the guiding action of the guide portion of the shelves. Subsequent FIGS. 48B to 48F showing following steps of solid material production and moving inside rotating kiln. Taking into account that part of solid particles produced during pyrolysis step may be entrained by the vapours exiting the rotating kiln and without deposing.
Figure 48B:
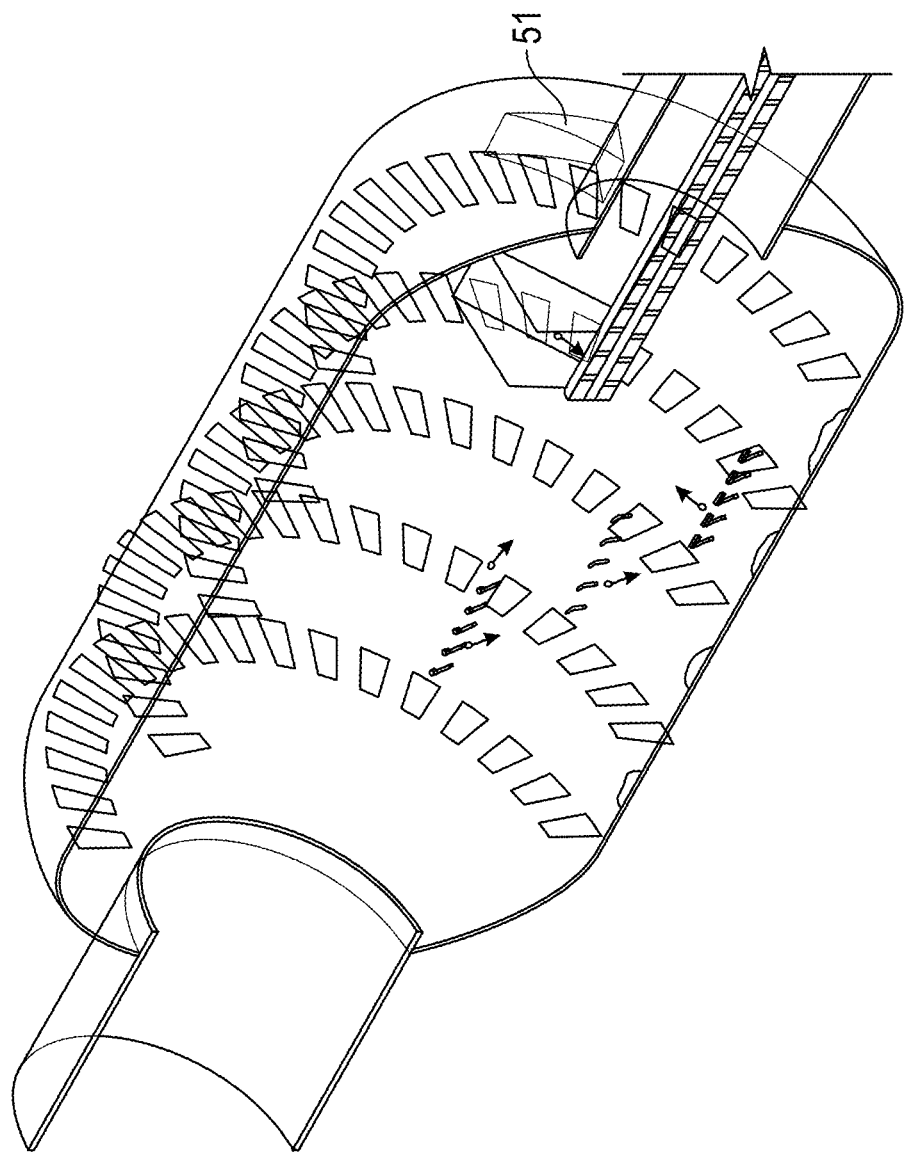
FIG. 48B is the second frame out of six of a 3D representation, during the next advanced stage, showing the movement of solid material produced in the reactor during pyrolysis reactions within the reactor and illustrating firstly how the solid material produced in the reactor during pyrolysis reactions moves from section to section, illustrating secondly how the solid material produced in the reactor during pyrolysis reactions exits the reactor using shovels, a solid material ramp, a solid exit tube and a screw conveyor, and illustrating thirdly the accumulation of solid material produced in the reactor during pyrolysis reactions (78, 78', 78", 78''') within each section of the reactor and showing the increase in size of said accumulation of solid material due to the guiding action of the guide portion of the shelves.
Figure 48C:
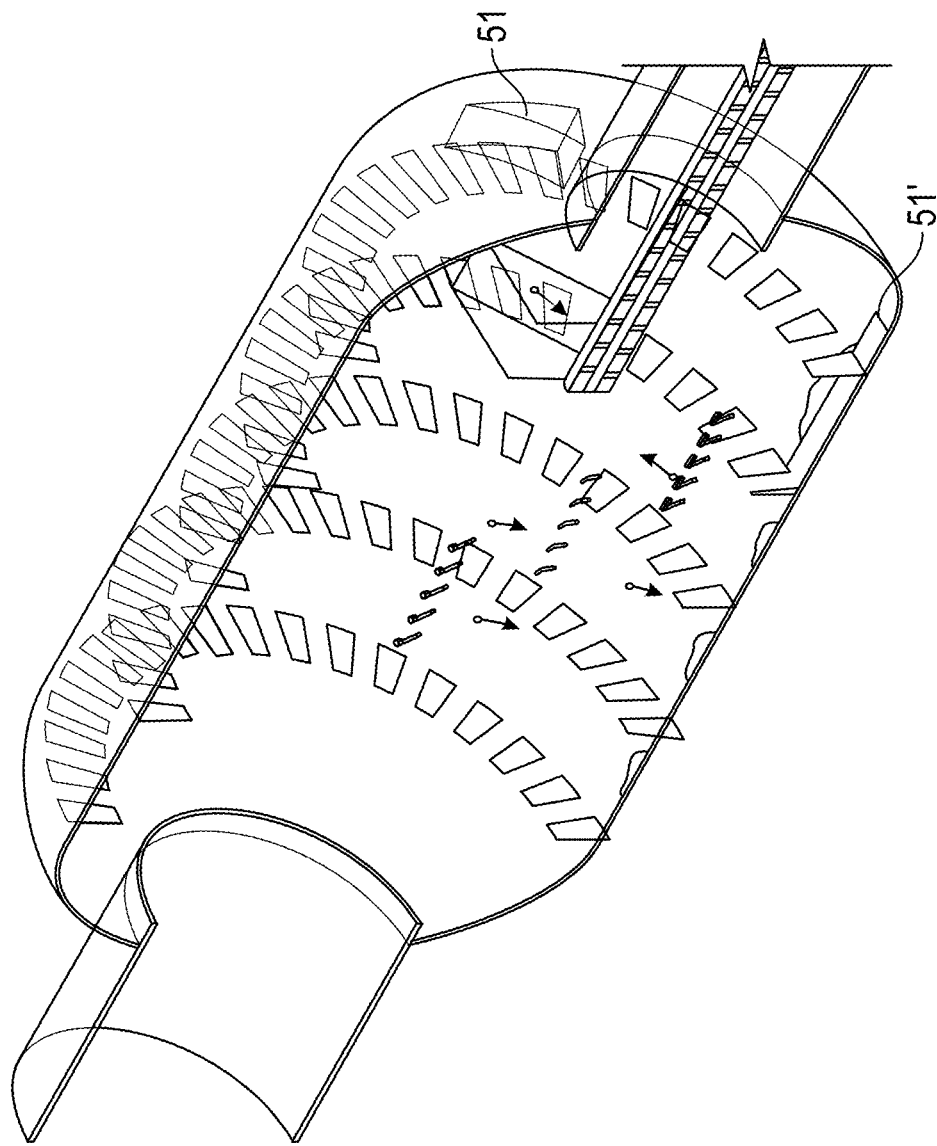
FIG. 48C is the third frame out of six of a 3D representation, during the next advanced stage, showing the movement of solid material produced in the reactor during pyrolysis reactions within the reactor and illustrating firstly how the solid material produced in the reactor during pyrolysis reactions moves from section to section, illustrating secondly how the solid material produced in the reactor during pyrolysis reactions exits the reactor using shovels, a solid material ramp, a solid exit tube and a screw conveyor, and illustrating thirdly the accumulation of solid material produced in the reactor during pyrolysis reactions (78, 78', 78", 78''') within each section of the reactor and showing the increase in size of said accumulation of solid material due to the guiding action of the guide portion of the shelves.
Figure 48D:
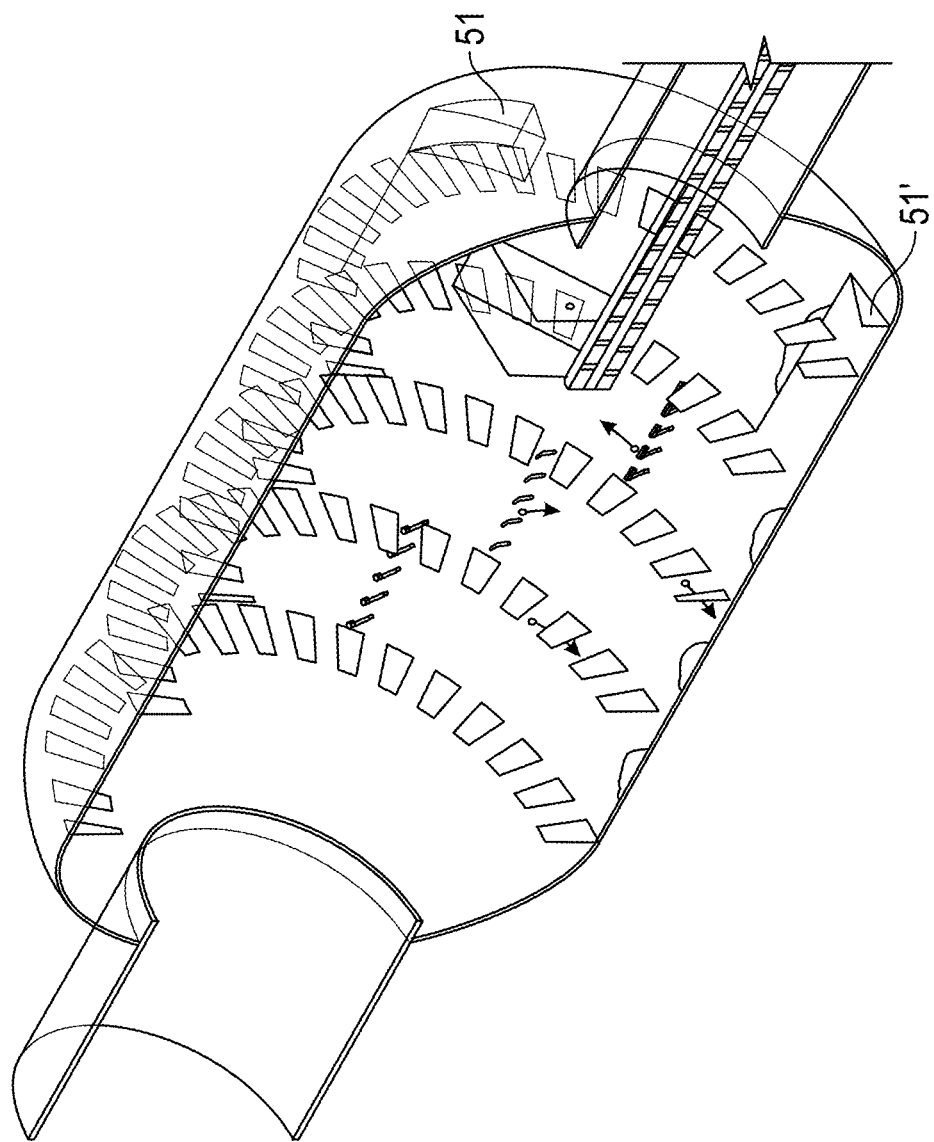
FIG. 48D is the fourth frame out of six of a 3D representation, during the next advanced stage, showing the movement of solid material produced in the reactor during pyrolysis reactions within the reactor and illustrating firstly how the solid material produced in the reactor during pyrolysis reactions moves from section to section, illustrating secondly how the solid material produced in the reactor during pyrolysis reactions exits the reactor using shovels, a solid material ramp, a solid exit tube and a screw conveyor, and illustrating thirdly the accumulation of solid material produced in the reactor during pyrolysis reactions (78, 78', 78", 78''') within each section of the reactor and showing the increase in size of said accumulation of solid material due to the guiding action of the guide portion of the shelves.
Figure 48E:
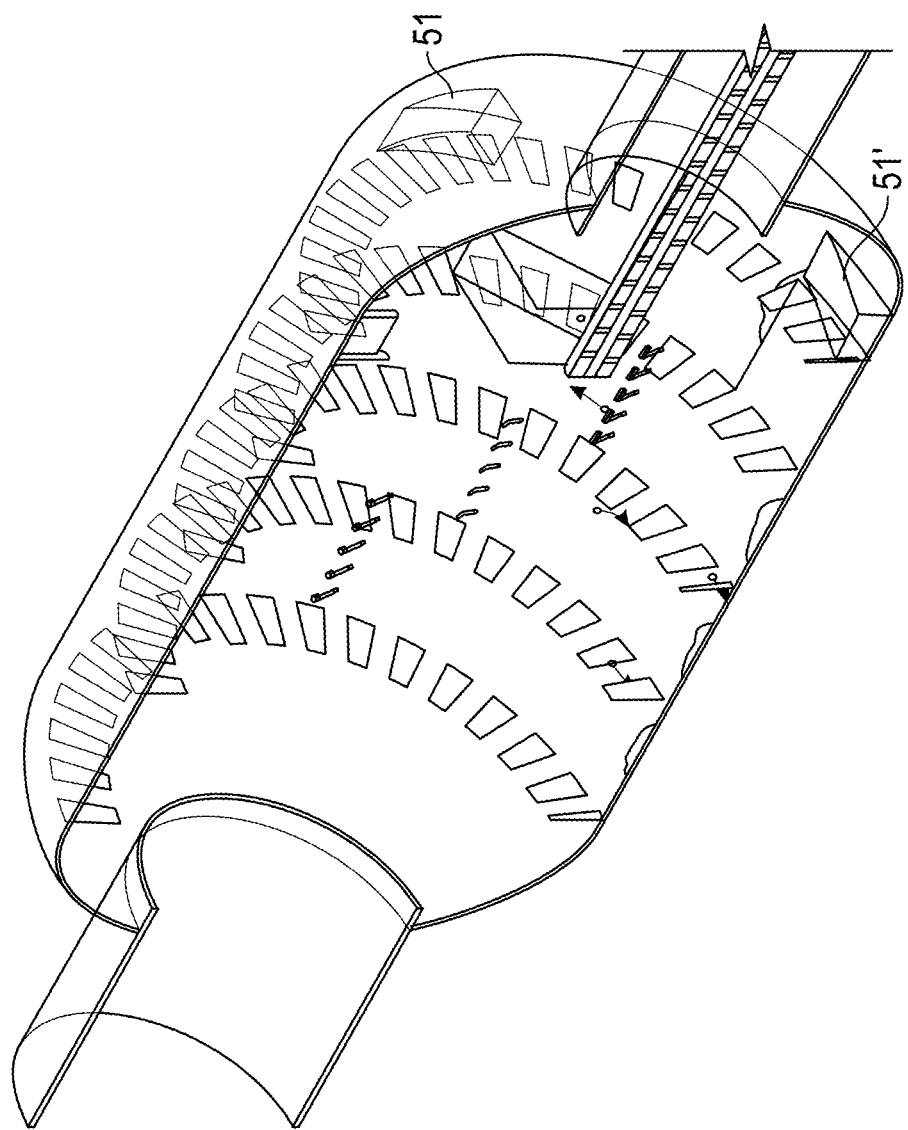
FIG. 48E is the fifth frame out of six of a 3D representation, during the next advanced stage, showing the movement of solid material produced in the reactor during pyrolysis reactions within the reactor and illustrating firstly how the solid material produced in the reactor during pyrolysis reactions moves from section to section, illustrating secondly how the solid material produced in the reactor during pyrolysis reactions exits the reactor using shovels, a solid material ramp, a solid exit tube and a screw conveyor, and illustrating thirdly the accumulation of solid material produced in the reactor during pyrolysis reactions (78, 78', 78", 78''') within each section of the reactor and showing the increase in size of said accumulation of solid material due to the guiding action of the guide portion of the shelves.
Figure 48F:
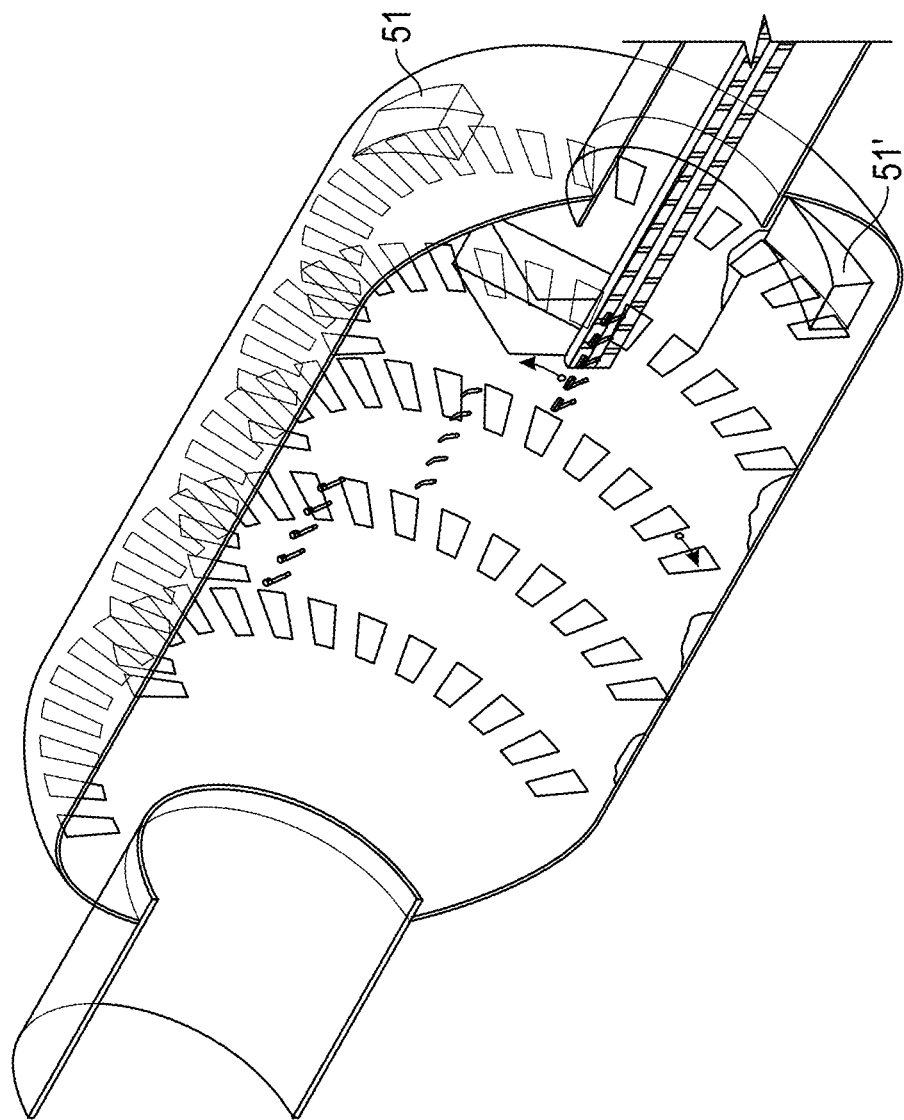
FIG. 48F is the sixth frame out of six of a 3D representation, during the last and more advanced stage, showing the movement of solid material produced in the reactor during pyrolysis reactions within the reactor and illustrating firstly how the solid material produced in the reactor during pyrolysis reactions moves from section to section, illustrating secondly how the solid material produced in the reactor during pyrolysis reactions exits the reactor using shovels, a solid material ramp, a solid exit tube and a screw conveyor, and illustrating thirdly the accumulation of solid material produced in the reactor during pyrolysis reactions (78, 78', 78", 78''') within each section of the reactor and showing the increase in size of said accumulation of solid material due to the guiding action of the guide portion of the shelves.
Figure 49A:
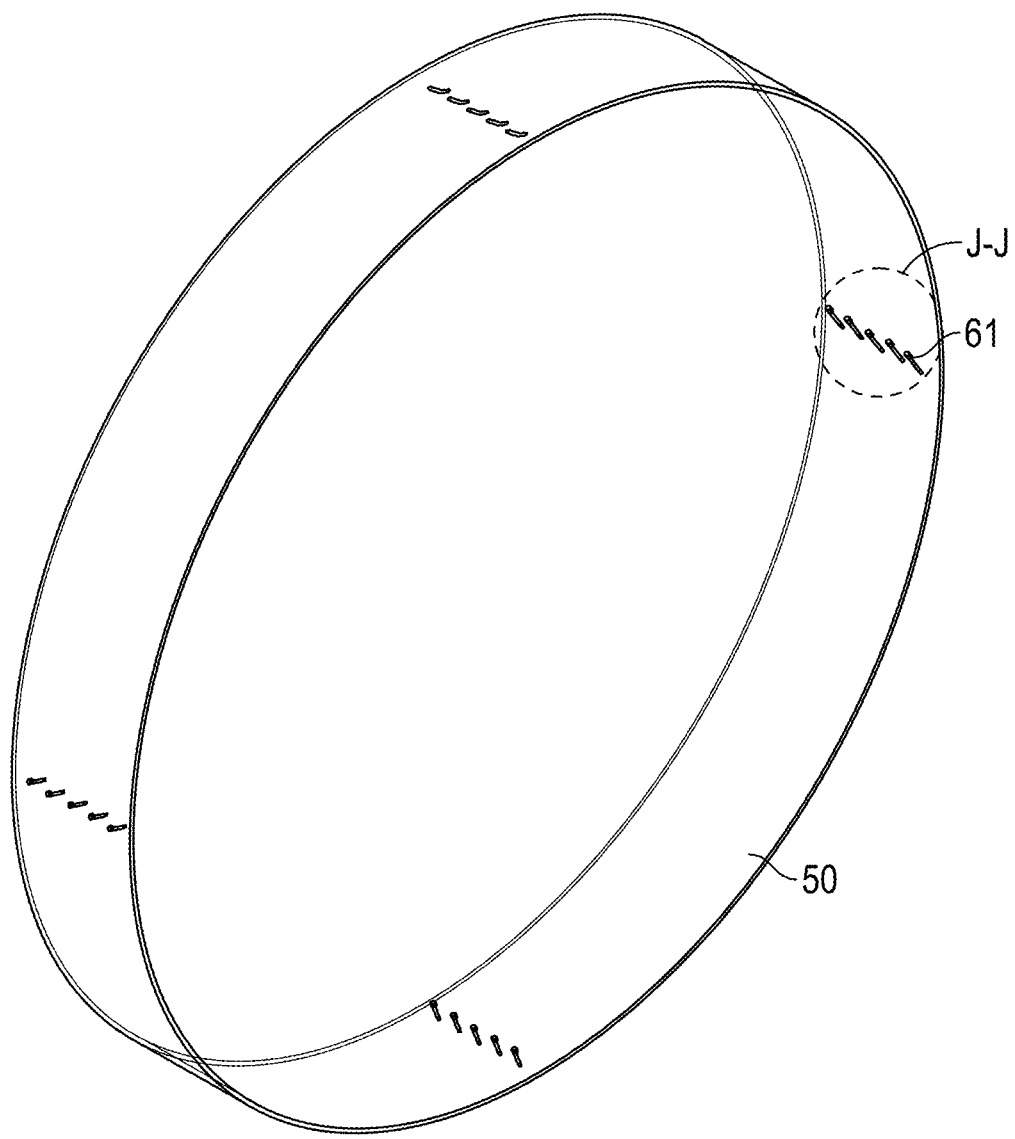
FIG. 49A is a 3D view of a short section of a reactor according to an embodiment which shows the use of only one type of shelf variant without the use of separators to illustrate the positioning of the shelves in relation with one another.
Figure 49B:
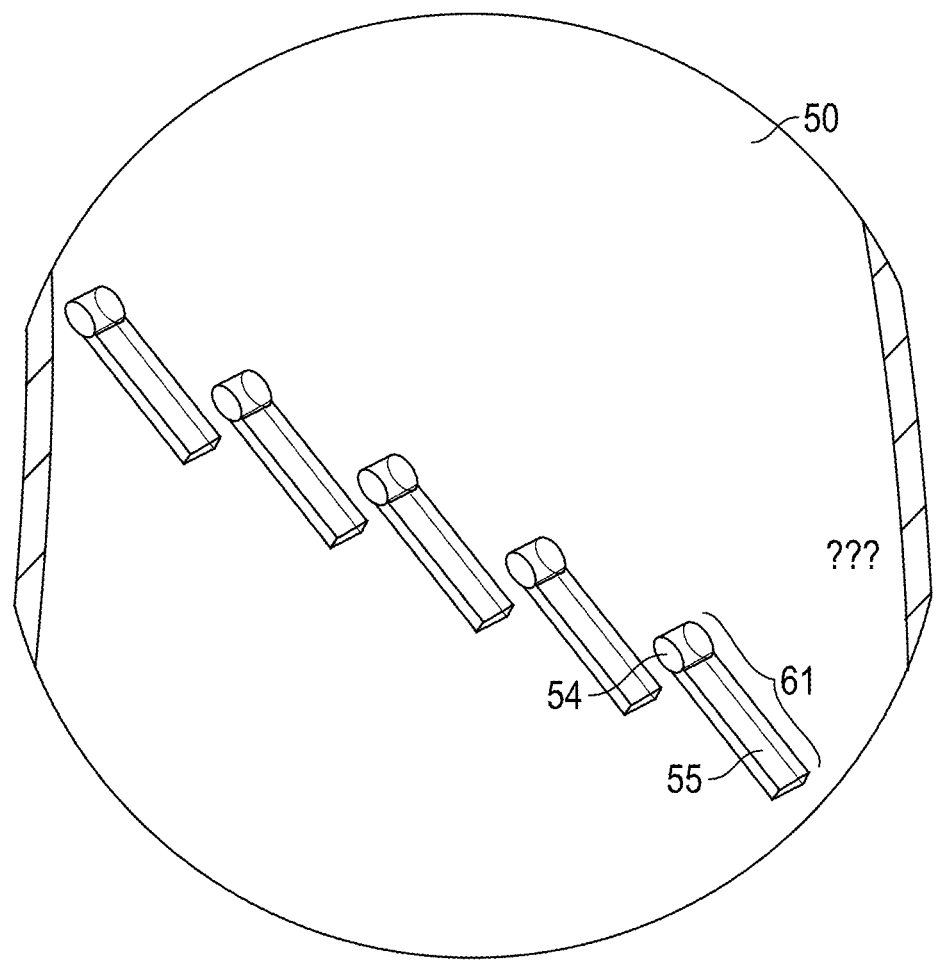
FIG. 49B is a close-up 3D view of the section J-J' circled in FIG. 49A showing a more detailed view of the shelves close together.

| ID | Name | Function | Position | Interacts with | Type of interaction |
|---|---|---|---|---|---|
| 77 | Solid material ramp | Guides solid material which has fallen from a shovel towards the solid exit tube | Placed adjacent to the solid exit tube and positioned such that all solid material which falls from the shovels can land onto the solid material ramp and flow into the solid exit tube | 66 | Guides solid material (66) |
| 78 | Accumulation of solid material | | FIG. 48A | | |
| 79 | Reactor | Rotating kiln which processes feed material, ultimately producing solid material and pyrolysis vapors | FIG. 33A | 67 | Processes feed material (67) |
| 80 | Axis of rotation | | FIG. 42 | | |
| 81 | Movement of solid material | | FIG. 48A | | |
| 100 | Liquifier | Increases the liquid fraction of the material being fed into it. Acts as a pretreatment vessel. Equipped with a self refluxing condenser to condense vapors exiting the top of the liquifier. | Placed before the rotating kiln reactor to pre-treat the material entering the reactor. | | |

General Definition of the Invention

A first object of the present invention is constituted by processes for producing liquid fuels from a mainly organic starting material with a reduced content in water and/or with a reduced content in solids, said mainly organic starting material being at least partially liquified and optionally further dewatered; the thereby obtained at least partially liquid fraction being thereafter used as feeding stream that is submitted to a pyrolysis treatment resulting in a solid gas fraction allowing the recovering of a liquid fuels after a controlled liquid solid separation treatment.

The mainly organic starting material may contain solids of the metal, glass and/or rocks type.

According to a preferred embodiment of the invention, the mainly organic starting material, after pyrolysis, produces more than 3% solids. The solids resulting from pyrolysis of the starting material can be predicted by a combination of ashing (ASTM D-4422) and CCR (Conradson Carbon Residue) (ASTM D189) performed on the whole sample.

Advantageously, the mainly organic starting material contains at least 80 weight % of organic material, advantageously at least 90% wt. of organic material and more preferably between 95 to 99.9% wt. of organic material.

Preferably, the mainly organic starting material is, before being submitted to pyrolysis, thermally and/or chemically liquified and optionally further dewatered.

The mainly organic starting material has, before being submitted to pyrolysis, has at least one of following properties:
a liquid content of at least 50 weight percent, more preferably of at least 60% wt., more preferably to a liquid content ranging from 70% wt. to 95% wt.; and/or
when water is present in the waste oil, said water is between 1 and 10% weight of the waste oil and is used to improve the amount of the light oil fraction recovered, and/or
when no water is present in the waste oil, water, at least one inert gas or at least one component that may become an inert gas by heating is added in the waste oil and/or in the vessel, optionally in an amount that represents 1 to 15% wt. of the waste oil.

The mainly organic starting material is advantageously thermally and/or chemically liquified until the viscosity of the liquified organic material has, according to ASTM method ASTM D7845, reached a value that is inferior to 30 poises, preferably inferior to 20 poises, The residual solids present in the mainly organic starting material, before being submitted to the pyrolysis treatment, may have a average size lower than 5 mmm, advantageously a size lower than 5 mm, and more preferably a average size ranging from 2 to 6 mm.

Preferably, the mainly oily starting material has, according to ASTM method Number ASTM D4052, a density superior to 0.89, advantageously ranging from 0.9 to 1.1 kg per liter.

According to a preferred embodiment, the mainly organic starting material is selected among:
Marpol, VT (vacuum tower asphalt extender), asphalt flux, bottom flux; and
in the case of heavy fuels among 0.9 kg/L and 1.2 kg/L.

The obtained partially liquid fraction obtained by liquefaction and/optional dewatering is advantageously submitted to a pyrolysis treatment of the flash cracking type being performed preferably on a heated reaction support, and resulting in a solid gas fraction allowing the recovering of a liquid fuel after a controlled liquid solid separation treatment.

Preferably, the mainly organic starting material is, before being submitted to flash cracking and/or being at least partially liquified and optionally further dewatered before, submitted to flash cracking, in a form of agglomerates. The flash cracking is advantageously performed in at least one mobile equipment and/or in at least one stationary pyrolysis equipment that is preferably an equipment of the rotating kiln type.

Preferably, the flash cracking is performed in a rotating kiln comprising:
a. a rotating kiln;
b. a heating system;
c. at least one shelf on the reactor wall, the at least one shelf being either parallel to the center axis of the reactor, when the reactor is horizontal, or slanted with respect to the center axis when the reactor is slanted or not slanted;
d. a charge of plates of consistent shapes; e. means for bringing the mixture to be thermally processed on the surface of at least part of the plates;
f. means for removing the solids from the reactor; g. means for recovering the reaction and straight run products; and
h. means for venting the gas, obtained by the thermal processing, outside the reactor zone.

Such rotating kiln is described in detail in international patent application WO2011143770A1, which content is thereby incorporated by reference, The feeding stream, just before spraying for flash cracking on the heated reaction support, is advantageously in a form of pellets, granules and/or powder. Thus, the agglomerates may have, after drying and filtering, at least one of the following features:
a humidity content lower than 75% wt.;
a content in metal, stones and/or glass together representing less than 25% weight percent of the total amount of agglomerates; and
a total carbon content comprised between 30% wt. and 75% wt.

Advantageously, the agglomerates are in the form of pellets with an average weight ranging from 1 to 500 grams per pellet, preferably this average weight ranging from 1 to 50 grams per pellet.

Preferably, the pellets have a total carbon content ranging from 30% wt. to 75% wt. and pellets have advantageously a humidity content less than 60% wt., preferably ranging from 0 to 65% wt.

The liquid fuels recovered by using the processes of the first object of the present invention has advantageously a low sulfur content that is, according to ASTM D7544-12, comprised between 0% wt. and 5% wt., preferably lower than 0.05% wt., more preferably lower than 0.03% wt., and more advantageously the sulfur content is lower than 0.01% wt.

A second object is constituted by processes for producing liquid fuels from starting material, that are waste hydrocarbons and/or organics material or a mixture of the two, said process includes:
a) an optional preliminary step wherein water content of the starting material is reduced preferably to a value lower than 55% wt. and/or wherein particulate size has been reduced to a size ranging from 3 mm to 0.1 mm;
b) a thermal step wherein at least partial liquifying and at least partial dewatering of the starting material, eventually obtained in previous steps a) occurs, wherein starting material is heated under:
  a pressure that is preferably ranging from 0.3 to 1 atmosphere and more preferably this pressure is about 0.5 atmosphere, and
  at a temperature that is preferably lower than 250 degrees Celsius, preferably between 150 and 330 degrees Celsius;
c) recovering of the liquid fraction resulting from step b), said liquid fraction may contain solid matters in suspension;
d) a pyrolysis step wherein:
  liquid fraction obtained in step b) or c), is flash cracked on a heated reaction's support that is preferably in at least one mobile equipment or in at least one stationary equipment of the rotating kiln type, preferably under positive pressure and/or, preferably in the presence of a sweep gas, that is preferably an inert gas, and
  reaction and straight run products are recovered from the rotating kiln as solids and as a solid-gas mixture;
e) a post treatment step wherein solid-gas mixture exiting the rotating kiln is submitted to a solid-gas separation allowing the recovering of substantially clean vapours and solids; and
f) a condensation and/or fractionation step to obtain liquid fuel and gas, and
wherein part of the heavy bio-oil and/or heavy hydrocarbon fraction recovered from pyrolysis step can be incorporated in liquid fraction resulting from step c), preferably in order to adjust solid liquid ratio in the liquid feed stream entering the reactor.

A third object is constituted by processes for producing liquid fuels from starting material, that are waste hydrocarbons and/or organics material or a mixture of the two, said process includes:
a) an optional preliminary step wherein water content of the starting material is reduced preferably to a value lower than 55% wt. and/or wherein stone and/or metallic content is reduced;
b) a thermal step wherein at least partial liquifying and at least partial dewatering of the starting material eventually obtained in previous steps a), occurs and wherein starting material is heated under:
  a pressure that is preferably ranging from 0.1 to 1 atmosphere and, more preferably, this pressure is about 0.5 atmosphere, and
  at a temperature that is preferably lower than 250 degrees Celsius, preferably between 150 and 330 degrees Celsius;
c) recovering of the liquid fraction resulting from step b);
d) recovering unliquified solid fraction from step b) and submitting said solid fraction to grinding in order to obtained particle with an average size preferably lower or equal to 4 mm, preferably ranging from 0.1 to 3 mm;
e) mixing the fluid fraction obtained in step b) and the solid fraction resulting from grinding in a proportion that does not substantially affect the thermodynamic properties of the liquid fraction, the mixing results in a liquid containing solids in suspension;
f) a pyrolysis step wherein:
  liquid, obtained in step(s) c) and/or e), is treated, by flash cracking on a reaction's support, in at least one of the following stationary or mobile equipment of the rotating kiln type, preferably under positive pressure and/or preferably in the presence of a sweep gas, that is preferably an inert gas, and
  reaction and straight run products are recovered from the stationary or from the mobile pyrolysis equipment as solids and as a solid-gas mixture; and
g) a post treatment step, wherein solid-gas mixture, exiting the stationary and/or the mobile equipment, is submitted to a solid-gas separation allowing the recovering of substantially clean vapours and solids; and
h) a condensation and/or fractionation step to obtain liquid fuel and gas, and
wherein, in the case wherein liquefaction in step c) is incomplete, the remaining unliquified solid fraction is incorporated in the liquid obtained in step c) preferably before entering the pyrolysis reactor and at concentration and/or particle size that does not affect significantly the physicodynamic properties of the liquid entering the rotating kiln; and wherein heavy hydrocarbon and/or heavy bio-oil fraction, recovered from pyrolysis step, is incorporated in liquid fraction resulting from step c), preferably in order to adjust the solid-liquid ratio in the liquid feed stream entering the reactor.

A fourth object of the present invention is constituted by processes for producing liquid fuels from starting material, that are waste hydrocarbons and/or organics material or a mixture of the two, in a form of agglomerates, said process includes:
- a) a pre-treatment step wherein agglomerates, such as pellets and/or powder, are made from the starting material;
- b) an optional drying step, wherein agglomerates obtained in the pre-treatment step is(are) or coming from the market and/or waste collection are dried to a water content lower than 55% weight;
- c) a thermal step wherein at least partial liquefying and at least partial dewatering of the agglomerates obtained in previous steps a) and/or b) occurs;
- d) a pyrolysis step wherein:
  liquid obtained in step c), is thermally flash cracked on a heated reaction's support preferably in at least one of the following stationary or mobile equipment of the rotating kiln type, preferably under positive pressure and/or preferably in the presence of a sweep gas, that is preferably an inert gas, and
  reaction and straight run products are recovered from the rotating kiln as solids and as a solid-gas mixture;
- e) a post treatment step wherein solid-gas mixture exiting the stationary or mobile equipment is submitted to a solid-gas separation allowing the recovering of substantially clean vapours and solids; and
- f) a condensation and/or fractionation step to obtain liquid fuel and gas, and wherein, in the case wherein liquefaction in step c) is incomplete, the remaining unliquified solid fraction is incorporated in the liquid obtained in step c), preferably before entering the stationary or mobile equipment and at concentration and/or particle size that does not affect significantly the physic-dynamic properties of the liquid entering the mobile or stationary equipment.

A fifth object the present invention is constituted by the processes according to any of the processes defined in previous objects of the invention and wherein the apparatus used for performing pyrolysis step comprises:
- a) a central module for thermal conversion, by flash cracking on a heated reaction support, of the feed material into a solid-gas mixture; and
- b) a post-treatment module for performing a solid-gas separation on the solid-gas mixture exiting the central module, wherein the post-treatment module is configured to perform the solid-gas separation, substantially without any condensation of the gas present in the solid gas-mixture exiting the central module.

A sixth object of the present invention is constituted by any of the processes defined in a previous object of the invention and wherein the apparatus, used for the thermal conversion of a feed material into useful products, comprises:
- a) a pre-treatment module for preparing, from the feed material, a feedstock that will be liquid or at least partially solid and/or at least partially heterogenic and/or at least partially dewatered and/or heated;
- b) a central module for thermal conversion by flash cracking on a heated reaction's support of the pre-treated feedstock into a solid-gas mixture; and
- c) a post-treatment module for performing a solid-gas separation on the solid-gas mixture exiting the central module, wherein the post-treatment module is configured to perform the solid-gas separation, substantially without any condensation of the gas present in the solid gas-mixture exiting the central module.

A seventh object of the invention is constituted by manufacturing process for fabricating polyvalent apparatus as defined for use in a process as defined in any of previously defined object of the, said manufacturing process involving known assembling methods, such as welding, screwing, sticking, for assembling constituting elements of the apparatus.

A eight object of the invention is the family of rotating kilns as defined in and for use in any of the processes defined in the previous objects of the invention and characterized in that they have, at one end of the reactor, an extension that is configured to be at least partially heated and to constitutes the exit of the solid-gas mixtures produced in the rotating reactor.

Advantageously, those rotating kilns:
- are obtained by modification of a rotating kiln as described in the first object, or as described in the second object of the invention or as disclosed in the complete description of international patent WO2011143770 A1 as originally filed, which content is fully incorporated by reference in the present description, and/or
- having at least one of the following features:
  a plate's width representing from 5 to 30% of the kiln's inner diameter;
  a plate thickness being at most 2 cm;
  a plate's length ranging from 100 to 400%, preferably from 150 to 200% of the plate's width;
  section's size, which is also the distance between two separators (when positioned . . . ), representing 102% to 125% of the length of a plate;
  the height separator must be 33% to 400% of the height of a plate; and
  the width of a hole must be smaller than 75% of a plate.

According to one advantageous embodiment of the invention, those rotating kilns preferably have sections, preferably substantially parallel, which are separated by separators, and the length of said sections are advantageously less than twice the length of a plate, more preferably approximately the length of a plate plus a small tolerance and/or the height of a separator is 33% to 400% the height of a plate. The rotating kilns having advantageously hole(s) in the separators to allow for the passage of solid material and the size of the hole(s) is preferably less than 75% of the width of a plate. The shelves, fixed on the internal wall of the reactor, preferably have the shape of a single rectangle and/or a series of rectangles and/or a series of rectangles with guides directly below them and/or a series of rectangle with guides attached to themselves and/or a series of stoppers and/or a series of stoppers with guides directly below them and/or a series of stoppers with guides attached to them. Advantageously, the shelves have the shape of a single rectangle and/or a series of rectangles and/or a series of rectangles with guides directly below them and/or a series of rectangle with guides attached to themselves and/or a series of stoppers and/or a series of stoppers with guides directly below them and/or a series of stoppers with guides attached to them. Preferably, shelves are not necessarily attached parallel to the central rotational axes, particularly when the central axis is inclined.

Figure 33C:
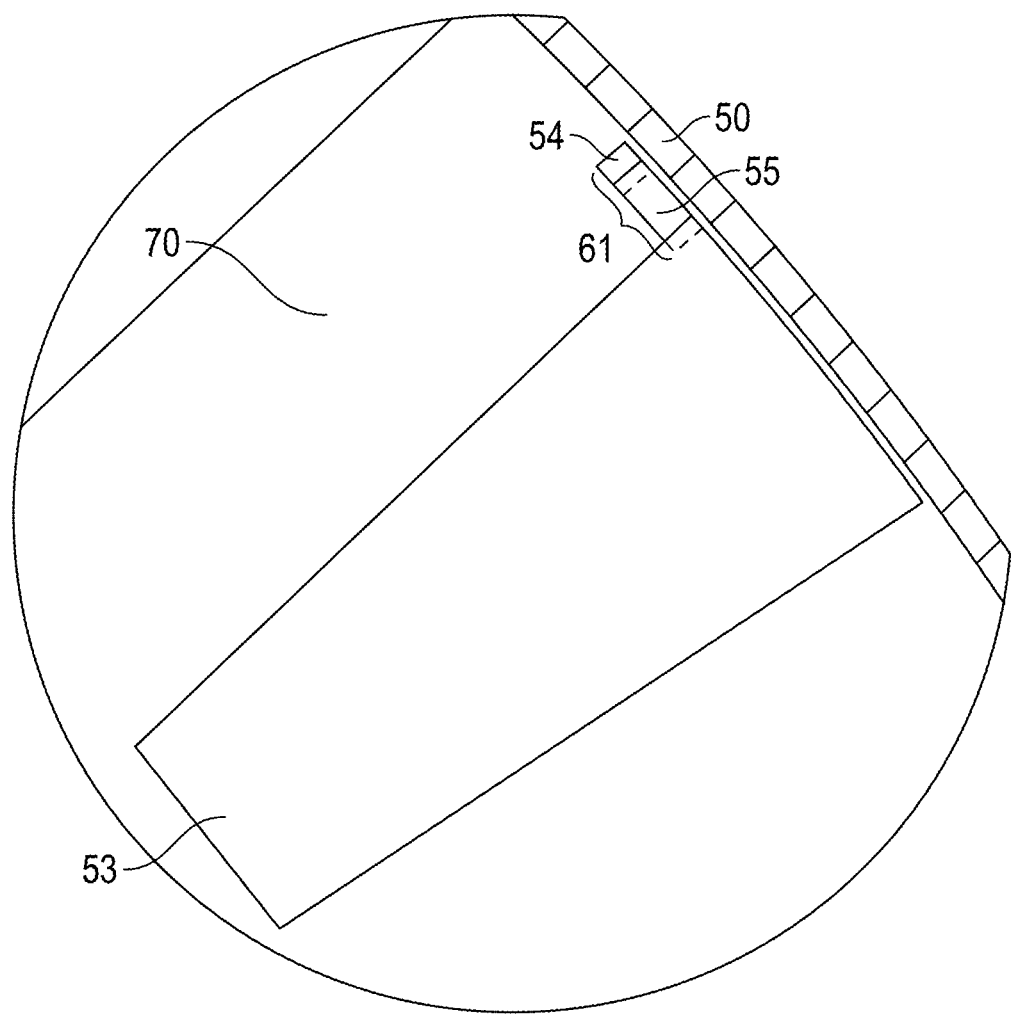
FIG. 33C is a close-up view of the section S-S' circled in FIG. 33B showing the front view of a shelf 1, consisting of a stopper which prevents the movement of reaction supports and a guide which directs the movement of solid material, attached to the reactor wall and positioned next to a separator piece.
Figure 34:
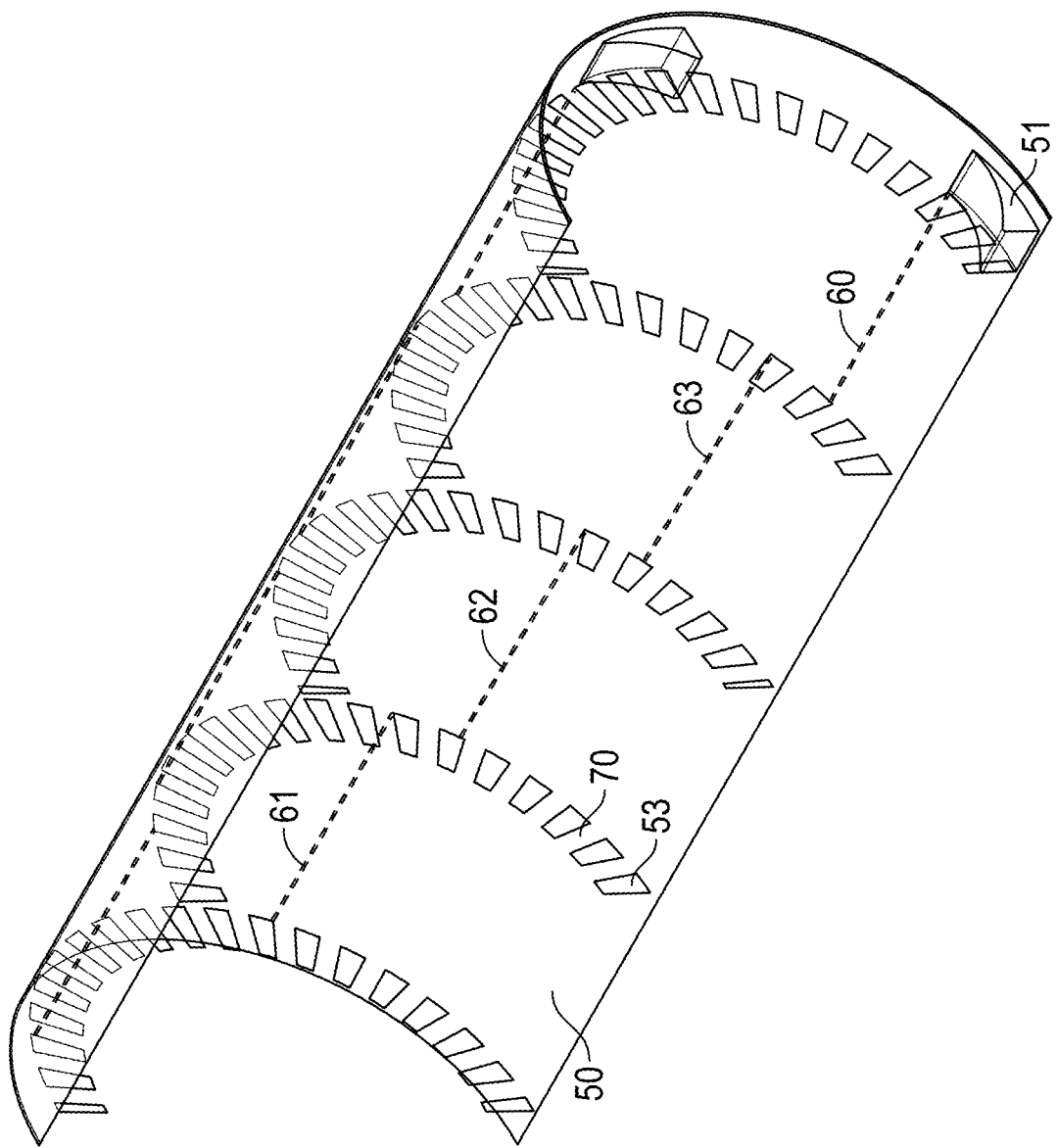
FIG. 34 is a 3D view of a front cross-sectional cut of the reactor seen in FIG. 33A according to a plane parallel to the vertical axis of an embodiment of the cylindrical section of a rector which illustrates the arrangement of all four types of shelf variants, pieced separators and shovels.
Figure 39:
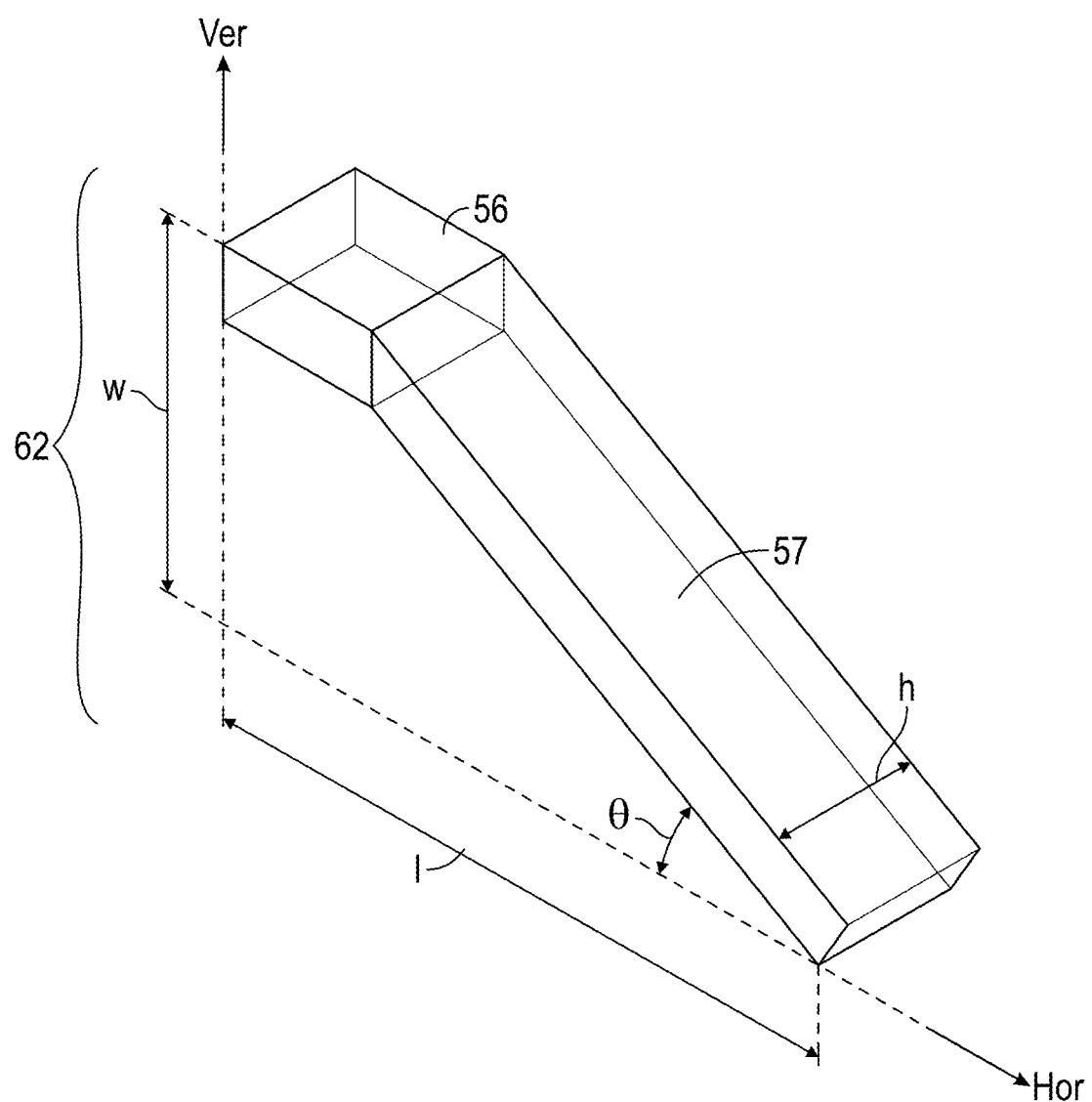
FIG. 39 is a 3D view of a single shelf 2, illustrating the stopper (56) and guide (57) portion of this type of shelf, wherein 0 is the angle between the horizontal axis and the guide.
Figure 40:
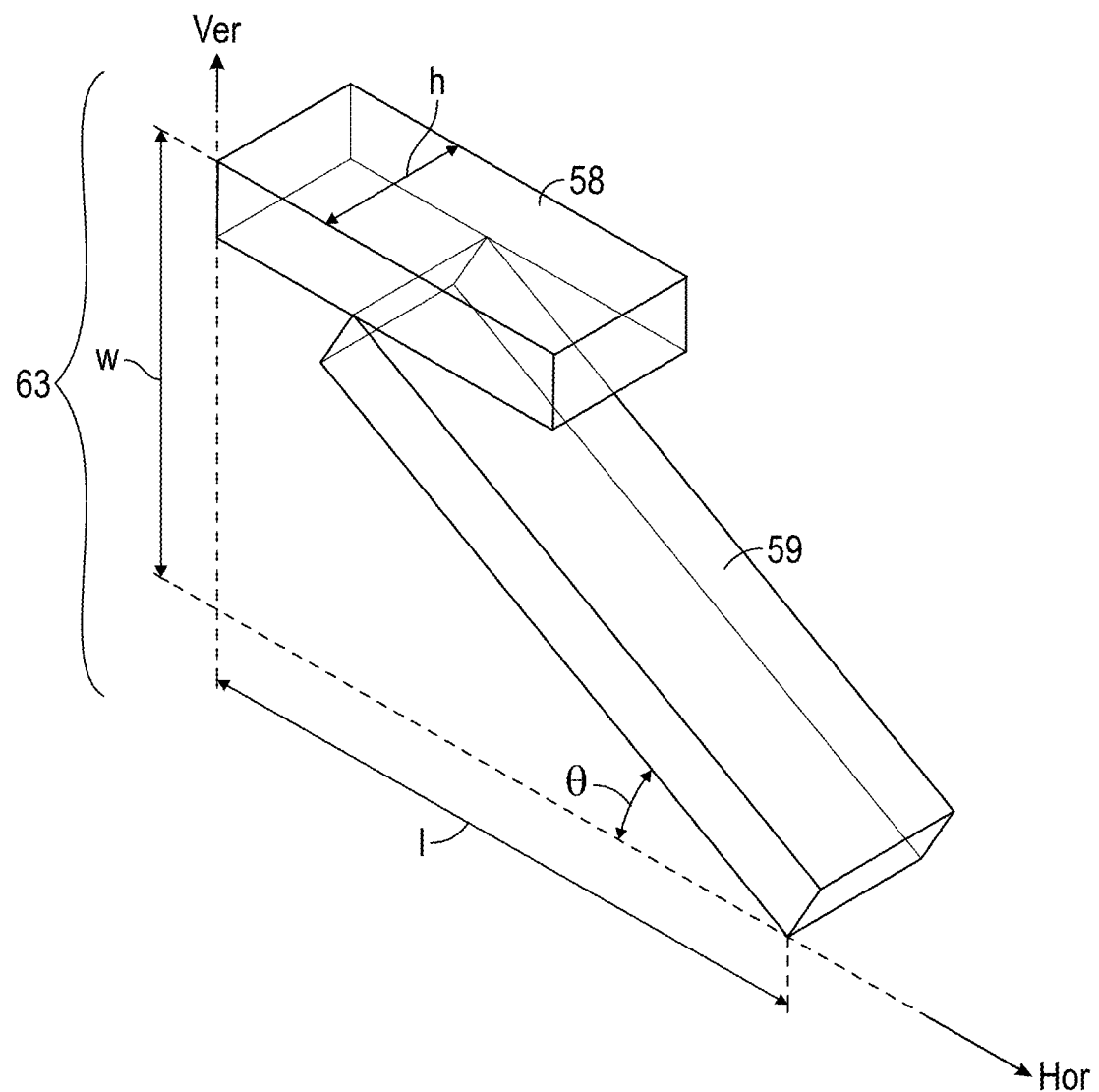
FIG. 40 is a 3D view of a single shelf 3, illustrating the stopper (58) and guide (59) portion of this type of shelf, wherein 0 is the angle between the horizontal axis and the guide.
Figure 41:
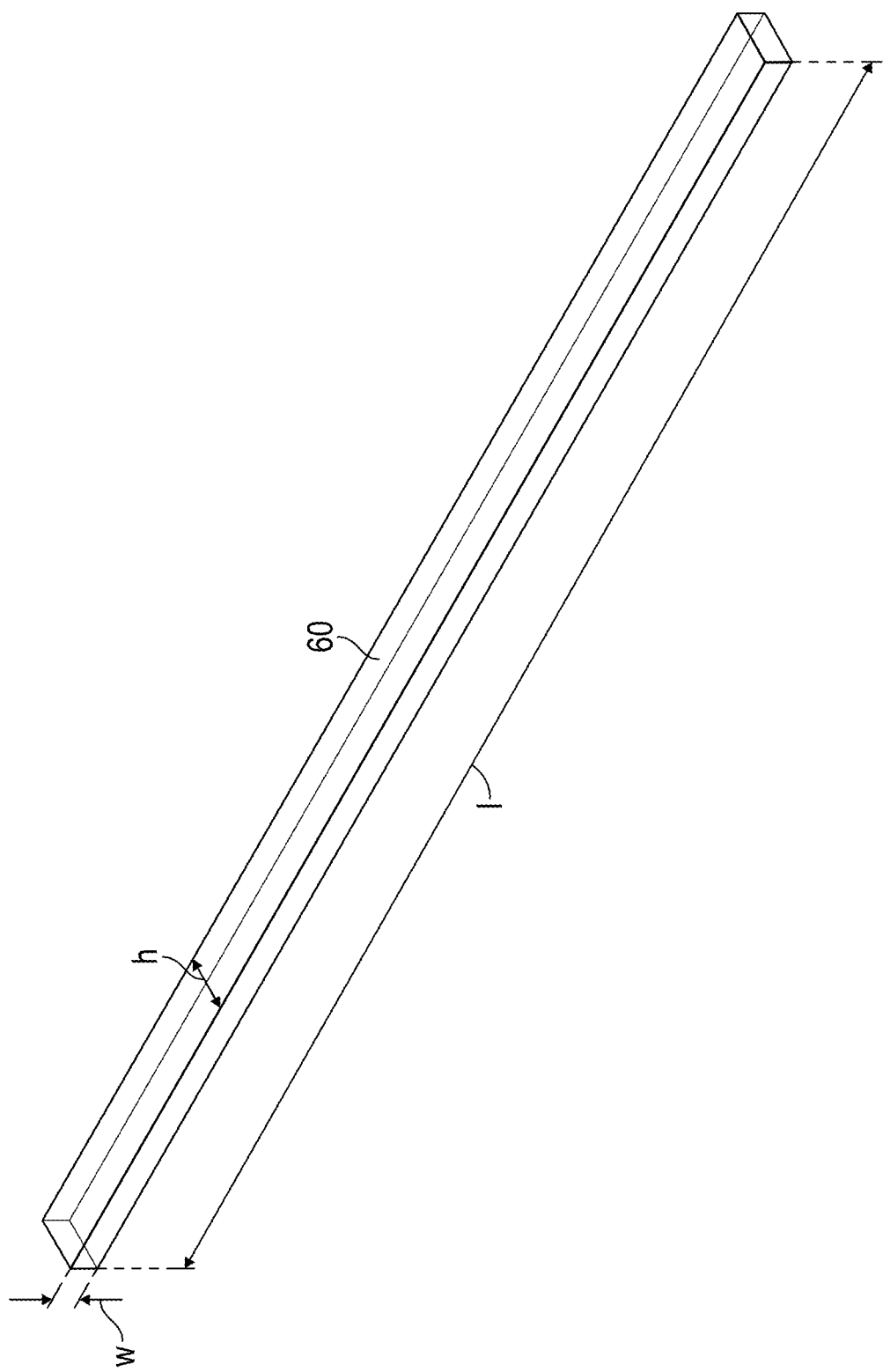
FIG. 41 is a 3D view of a single shelf 4, wherein the function of the stopper (54, 56, 58) and guide (55, 57, 59) are completed by a single element.
Figure 43A:
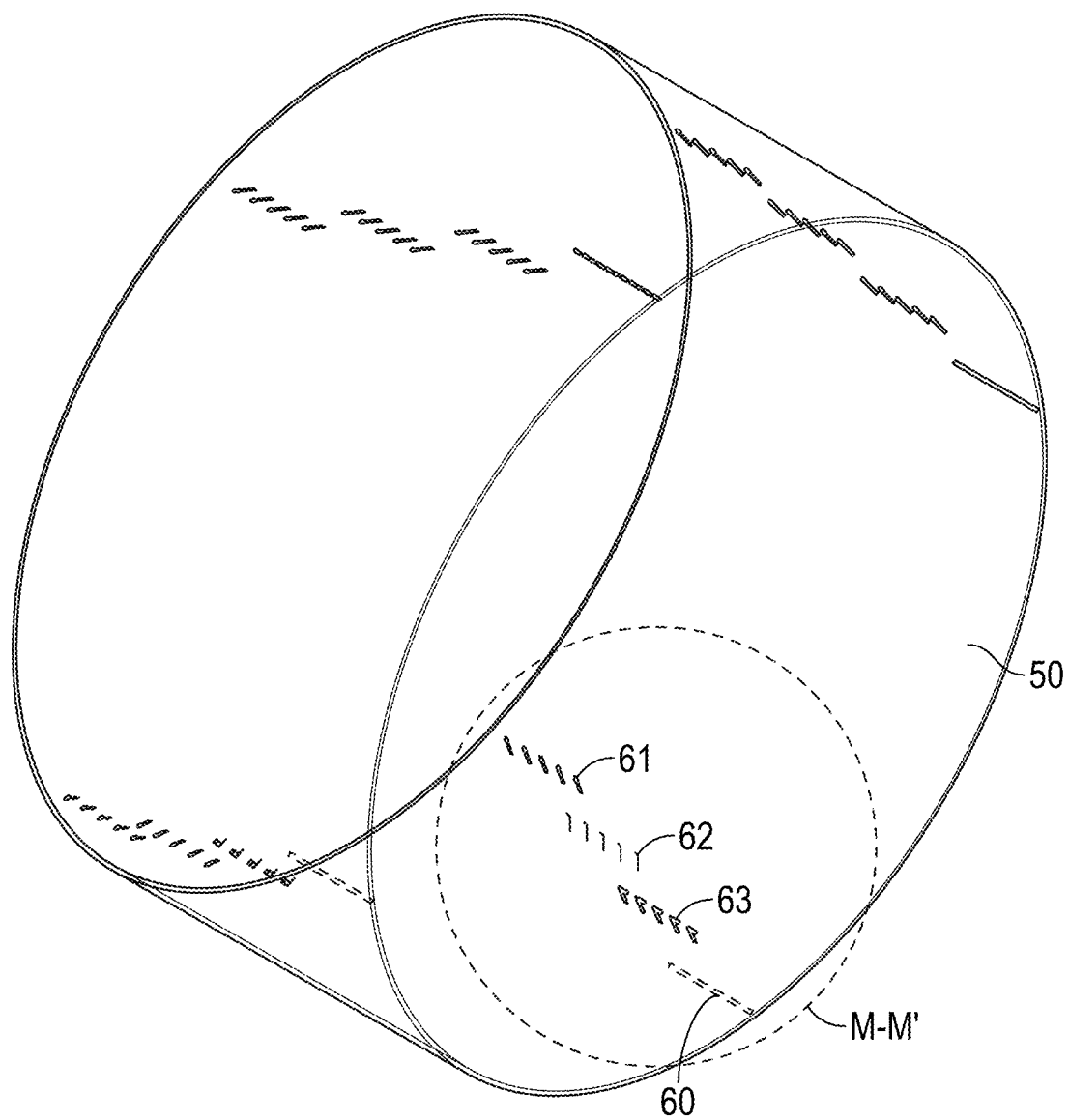
FIG. 43A is a 3D view of a short section of a reactor according to an embodiment which shows the use of all four types of shelf variants close together without the use of separators to illustrate the positioning of the four types of shelf variants in relation with one another.
Figure 43B:
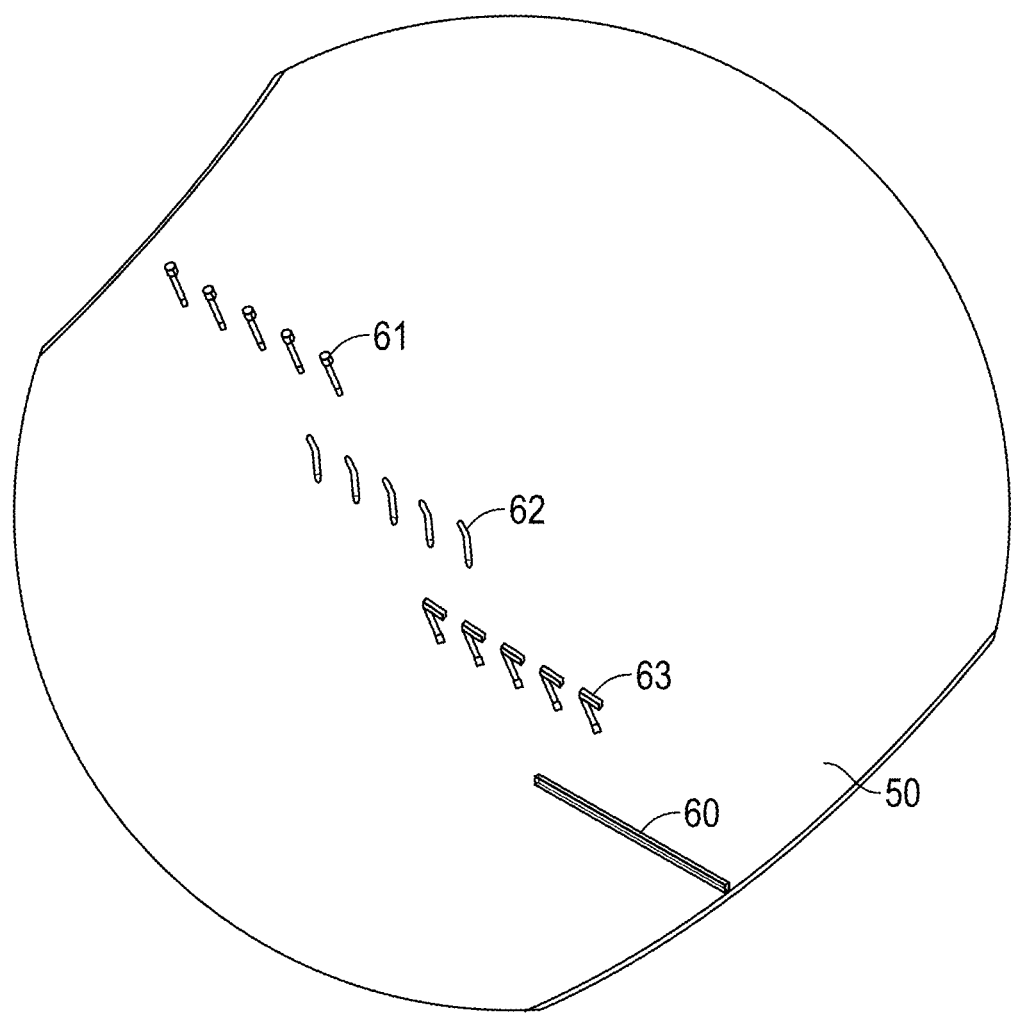
FIG. 43B is a close-up 3D view of the section M-M' circled in FIG. 44A showing a more detailed view of the four types of shelf variants close together.

According to a further preferred embodiment of the reactors of the present invention, at least one of the following feature is present:

shelves push the plates upwards as the kiln rotates clockwise, as this rotation occurs, any solid particles which lay on the kiln's surface are pushed towards the kiln's exit, from one section to another, this is due to the existence of guides, as illustrated in FIGS. 33 and 39 to 43, which are part of the shelves or are located directly underneath the shelves;

preferably each shelf has at least one guide, but the specific embodiment of the example as represented in Section 4 on FIGS. 33 and 39 and 43, shows configuration wherein at least one shelf is without guide, as the solid particles reach the end of a section, the last guide of that section pushes the solids through a hole, into the next section, the last guide of the last section pushes the solids through a hole leading to a mechanism (scoops for example) which allows the solids to exit from the kiln, the shelf and the guide can be two different structural elements or be a single structural element configured for providing both functionalities;

the shelves and guides must be attached, preferably on the wall of the rotating kiln, for example by spot welding in such a way that it supports the weight of the plates;

the angle of the guide, by reference to the horizontal, must be chosen such that it does not impede the falling and placement of the plates onto the kiln's inner surface;

the height of the separators range from 10 to 400%, preferably from 30 to 100%, of the height of a plate in order to prevent plates from moving from one section to another, and finally resulting in a chaotic moving and finally in an a accumulation in the section of the rotating kiln close to the exit of the fractions resulting from the pyrolysis treatment;

the width of a hole of a separator is limited/selected, preferably less or equal to 75% of the width of a plate, in order to prevent plates from entering the hole;

the distance between two separators is chosen to limit the movement of the plates, while also allowing the solid particles to fall on the inner surface of the kiln;

plates should not be too heavy, which could damage the kiln, while also optimising the area on which the fluid can pyrolyze on; and the centre of gravity of the plates was also taken into account, in order to make sure that the plates fall properly as the kiln rotates and do not significantly affect the integrity of those plates placed below.

Advantageously, the rotating kilns are configured in a way that:

the extension is connectable with a transit line that is advantageously heatable and configured to bring solid-gas mixtures exiting the rotating kiln to a post-treatment module configured to separate gas and solids present in the solid-gas mixture; and/or the extension is connectable with a transit line that is advantageously heatable and configured to bring solid-gas mixtures exiting the rotating kiln to a post-treatment module configured to at least partially separate gas present in the solid-gas mixture and/or the extension is connectable with a transit line that is advantageously heatable and configured to bring solid-gas mixtures exiting the rotating kiln to a post-treatment module configured to at least partially separate some of the solids present in the solid-gas mixture.

A ninth object of the invention is constituted by manufacturing processes for fabricating a rotating kiln, wherein the amount of the recovered liquid fraction represents between 30% and 80% weight of the organic reactor feed; and/or the amount of the recovered gaseous fraction represents between 30% weight and 60% weight of the reactor feed; and/or the amount of the recovered solid fraction represents between 0% weight and 20% weight, when the feedstock is organic waste material, said manufacturing process involving known assembling methods, such as welding, screwing, sticking, for assembling constituting elements of the apparatus, characterized in that they have, at one end of the reactor, an extension that is configured to be at least partially heated and to constitutes the exit of the solid-gas mixtures produced in the rotating reactor, obtained by modification of a rotating kiln as described in the first object, or as described in the second object of the invention or as disclosed in the complete description of international patent WO2011143770 A1 as originally filed, and/or having at least one of the following features:

a plate's width representing from 5 to 30% of the kiln's inner diameter;

a plate thickness being at most 2 cm;

a plate's length ranging from 100 to 400%, preferably from 150 to 200% of the plate's width:

section's size, which is also the distance between two separators (when positioned . . . ), representing 102% to 125% of the length of a plate;

the height separator must be 33% to 400% of the height of a plate; and the width of a hole must be smaller than 75% of a plate;

A rotating kiln having sections, preferably substantially parallel, which are separated by separators, and the length of said sections are advantageously less than twice the length of a plate, more preferably approximately the length of a plate plus a small tolerance and/or the height of a separator is 33% to 400% the height of a plate, having hole(s) in the separators to allow for the passage of solid material and the size of the hole(s) is preferably less than 75% of the width of a plate, wherein the shelves have the shape of a single rectangle and/or a series of rectangles and/or a series of rectangles with guides directly below them and/or a series of rectangle with guides attached to themselves and/or a series of stoppers and/or a series of stoppers with guides directly below them and/or a series of stoppers with guides attached to them, wherein the shelves have the shape of a single rectangle and/or a series of rectangles and/or a series of rectangles with guides directly below them and/or a series of rectangle with guides attached to themselves and/or a series of stoppers and/or a series of stoppers with guides directly below them and/or a series of stoppers with guides attached to them, wherein shelves are not necessarily attached parallel to the central rotational axes, particularly when the central axis is inclined, wherein at least one of the following feature is present:

shelves push the plates upwards as the kiln rotates clockwise, as this rotation occurs, any solid particles which lay on the kiln's surface are pushed towards the kiln's exit, from one section to another, this is due to the existence of guides, as illustrated in FIGS. 33 and 39 to 43, which are part of the shelves or are located directly underneath the shelves;

preferably each shelf has at least one guide, but the specific embodiment of the example as represented in Section 4 on FIGS. 33 and 39 and 43, shows configuration wherein at least one shelf is without guide, as the solid particles reach the end of a section, the last guide of that section pushes the solids through a hole, into the next section, the last guide of the last section pushes the solids through a hole leading to a mechanism (scoops for example) which allows the solids to exit from the kiln, the shelf and the guide can be two different structural elements or be a single structural element configured for providing both functionalities;

the shelves and guides must be attached, preferably on the wall of the rotating kiln, for example by spot welding in such a way that it supports the weight of the plates;

the angle of the guide, by reference to the horizontal, must be chosen such that it does not impede the falling and placement of the plates onto the kiln's inner surface;

the height of the separators range from 10 to 400%, preferably from 30 to 100%, of the height of a plate in order to prevent plates from moving from one section to another, and finally resulting in a chaotic moving and finally in an a accumulation in the section of the rotating kiln close to the exit of the fractions resulting from the pyrolysis treatment;

the width of a hole of a separator is limited/selected, preferably less or equal to 75% of the width of a plate, in order to prevent plates from entering the hole;

the distance between two separators is chosen to limit the movement of the plates, while also allowing the solid particles to fall on the inner surface of the kiln;

plates should not be too heavy, which could damage the kiln, while also optimising the area on which the fluid can pyrolyze on; and the center of gravity of the plates was also taken into account, in order to make sure that the plates fall properly as the kiln rotates and do not significantly affect the integrity of those plates placed below, wherein the rotating kiln is configured in a way that the extension is connectable with a transit line that is advantageously heatable and configured to bring solid-gas mixtures exiting the rotating kiln to a post-treatment module configured to separate gas and solids present in the solid-gas mixture.

A tenth object of the invention is the uses of any processes or apparatus or rotation react defined in any of the previously defined object of the invention for treating:
municipal waste material (MSW); and/or
biomass; and/or
plastic and/or
tires.

Advantageously, those processes are used for treating MSW and/or organic matter and/or used oils and to prepare:
a fuel, or a component in a blended fuel, such as a home heating oil, a low sulphur marine fuel, a diesel engine fuel, a static diesel engine fuel, power generation fuel, farm machinery fuel, off road and on road diesel fuel; and/or
a cetane index enhancer; and/or
a drilling mud base oil or component; and/or
a solvent or component of a solvent; and/or
a diluent for heavy fuels, bunker or bitumen; and/or
a light lubricant or component of a lubricating oil; and/or
a cleaner or a component in oil base cleaners; and/or
a flotation oil component; and/or
a wide range diesel; and/or
a clarified oil; and/or
a component in asphalt blends; and/or
a soil amendment; and/or
an additive to animal feed; and/or
an insulator; and/or
a humidity regulator; and/or
an air decontaminator; and/or
a protective element against electromagnetic radiation; and/or
an element to decontaminate soil and/or water; and/or
a biomass additive; and/or
a biogas slurry treatment; and/or
an element for paints and/or food colorants; and/or
a detoxification agent; and/or
a carrier for active pharmaceutical ingredients; and/or
an exhaust filter; and/or
a semiconductor; and/or
a therapeutic bath additive; and/or
a skin cream additive; and/or
a soap additive; and/or
a substitute for lignite; and/or
a filling for mattresses and/or pillows; and/or
an ingredient in food; and/or
a bio-oil for combustion; and/or
chemicals such as acids, alcohols, aromatics, aldehydes, esters, ketones, sugars, phenols, guaiacols, syringols, furans, alkenes; and/or
emulsification agent for fuels; and/or
a feed for steam reforming.

An eleventh object of the present invention is constituted by managing systems allowing continuous optimisation of a process for producing fuel by pyrolysis from a waste hydrocarbon and/or organic material, said system comprising at least one captor for measuring at least one parameter related to the composition of the feed stream entering the zone wherein pyrolysis takes place, preferably comprising at least one captor for measuring at least one of the following parameters:
humidity in the agglomerates;
rate of cellulosic material present in the feed stream before entering the rotating kiln;
temperature of the feeding stream in a liquid or in a semi liquid stage and/or heterogeneous state before entering the rotating kiln;
temperature and/or pressure in the vessel and/or in the rotating kiln;
a storage unit for storing data collected by sensors of the system; and
a calculating unit configured to adjust solid content present in the feed stream to the vessel, and/or to adjust solid content in the feed stream to the rotating kiln.

Advantageously, in those systems, feed stream solid content is adjusted by at least one of the following means for:
injecting a weak organic acid in the feed stream;
injecting a diesel having preferably following feature in the feed stream;
adjusting pressure at positive or negative value;
injecting at least part of the gas and/or solid exiting the pyrolysis zone and
adjusting temperature of the feeding stream in the range from 25 to 350 Celsius degrees.

In those managing systems, the managed process and/or the apparatus and/or the rotating kiln thereby used is/are defined in anyone of previously defined objects.

DETAILED DESCRIPTION OF PREFERRED EMBODIMENTS OF THE INVENTION

Starting Material—

Figure 26:
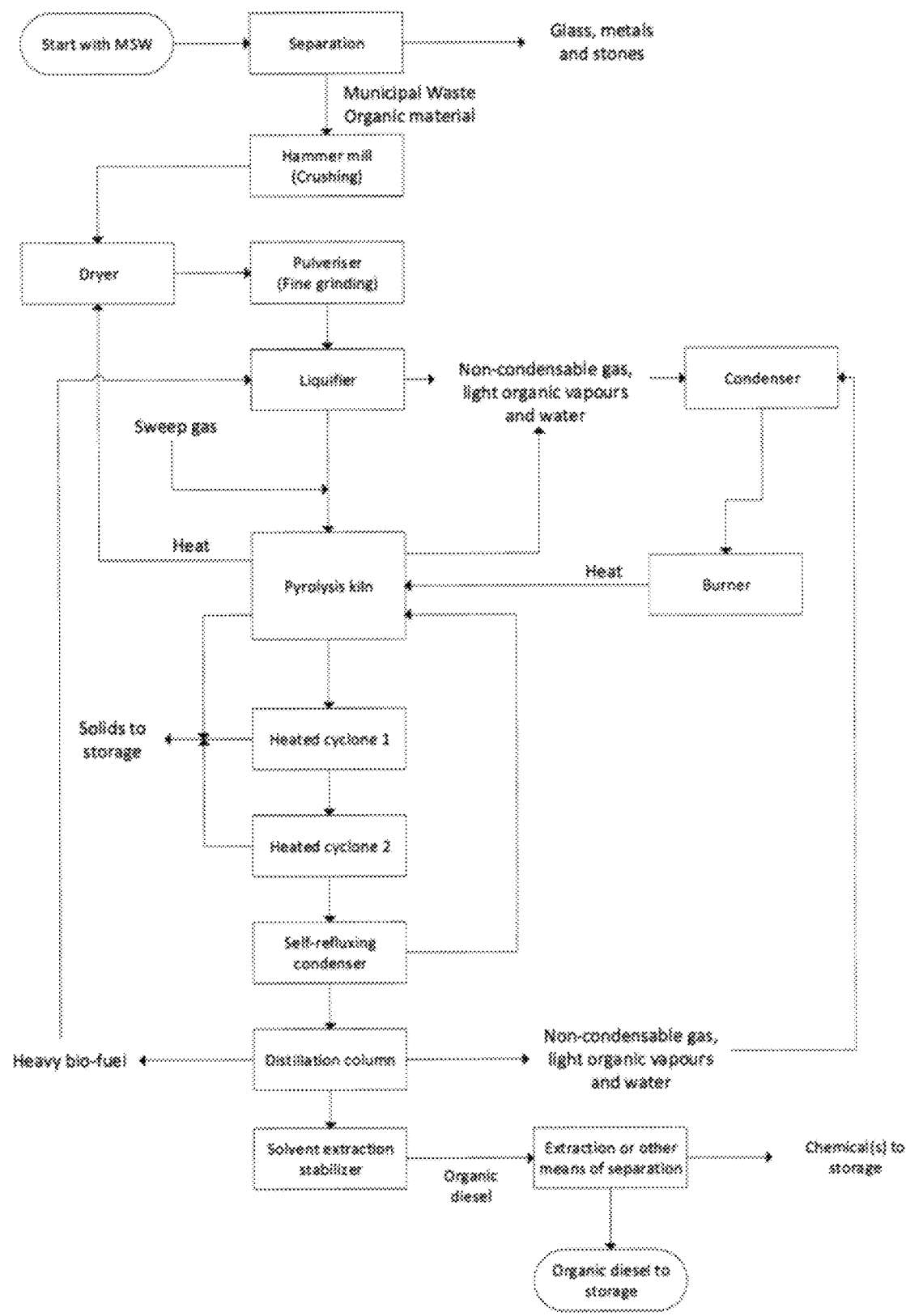
FIG. 26 is a simplified flow diagram illustrating a tenth embodiment of the process according to the present invention in which at least one of the chemicals present in the organic diesel exiting the solvent extraction stabilizer is separated and sent to storage.

The starting material for the process is MSW and/or waste hydrocarbons or a mixture of the two, wherein the MSW is preferably obtained after composting and/or recycling. The composition of MSW varies drastically throughout the year and with respect to location. Please refer to FIG. 26 for an example of the general composition of MSW in the United-States in 2012 before and after recycling and composting. The starting material may also be an oily feed material, even those with a high CCR and/or with high viscosity.

Preparation of Agglomerate

Preparation of Pellets

Material suitable for pelletization is positively selected from the starting material, inter alia after elimination of at least part of the stones and metallic parts with a small amount of residue set aside for disposal. The materials suited for fuel pellet production are shredded, fiberized and eventually stored in storage silos. For example, In primary shredding, the materials are delumped into 25-40 mm size to enable easy drying and separation. For example, delumped materials are dried from 50% wt. moisture to 25% wt. moisture, either on a paved sun drying yard or in a mechanical dryer. Dried waste materials are passed through a rotary sieve for separation of fine dirt and sand; fine materials can be sent as soil conditioner for further processing. Screened waste materials is passed through density separation phase in air density separator. Heavy particles are rejected and sent for dumping. Light fraction is passed through a cage mill for further size reduction with hot air for faster drying and moisture is reduced from 25% wt. to 15% wt. Dried combustible material having 25-40 mm size is refuse-derived fuel and its calorific value is about 3000 kCal/kg. Refuse-derived fuel can be ground further in a secondary shredder for making it suitable for palletisation, then it can be later combined with high-BTU admixture materials such as carpet waste, poly film or other acceptable plastic derivatives. They are transferred through pellet mills to produce the final fuel pellet with different diameters i.e. 10 mm to 25 mm, suitable for different uses. These fuel pellets are hard and odorless, can be stored for up to three years without significant biological or chemical degradation, and due to their increased bulk density, are more durable and can be more easily transported. High bulk density and regular size makes its transport, storage, conveying and combustion easier as compared to other fuels. Parameters of refuse-derived fuel pellets are for example as follows:

| Parameter | Concentration (% wt.) |
|---|---|
| Carbon | 40.12 |
| Hydrogen | 3.31 |
| Sulphur | 0.41 |
| Nitrogen | 0.3 |
| Oxygen | 25.06 |
| Moisture | 14.7 |
| Ash | 16.1 |

Briquetting

Before briquetting, municipal waste has to be processed for size reduction, preferably adding binder agents and reducing the moisture content. In general, the moisture content, fraction size, pressing temperature, and compacting pressure of compressed waste are the most important parameters to manufacture briquettes with acceptable quality. The pressing temperature and compacting pressure depend on the type of briquetting machine used. Fraction size has great influence on the briquetting process. The coarser the fraction is, the higher compacting power is needed for briquetting. Briquette has lower homogeneity and stability. By increasing the fraction size, the binding forces inside the material decrease which effects on faster decay by burning.

Preparation of Powders

The physical transformation of municipal waste into powder is done, for example through the use of a pulverizer. As a matter of example, first the material suitable for pulverisation is positively selected, inter alia after elimination of at least part of the stones and metallic parts with a small amount of residue set aside for disposal. Once properly selected, the material suitable for pulverisation enters a hammermill, which is a steel drum equipped with a rotating shaft on which hammers are mounted. As the shaft rotates, the hammers swing and crush the material entering the hammermill. As the material is crushed, its size is reduced and, once the material is small enough, it passes through a screen to be further processed. Once the crushed material exits the hammermill through the screen, it is conveyed, for example, with an auger and enters a dryer which reduces the moisture in the material. The dried material then enters a pulverizer, for example the TORXX KINETIC PULVERIZER commercialised by Marathon Equipment on the date of Jun. 15, 2017, which grinds the material entering it into particles with dimensions, for example, smaller or equal to 3 mm.

Hydrothermal Liquefaction Also Named (HTL) is a thermal depolymerization process used to convert wet biomass into crude-like oil—sometimes referred to as bio-oil or biocrude—under moderate temperature and high pressure. The crude-like oil (or bio-oil) has high energy density with a lower heating value of 33.8-36.9 MJ/kg and 5-20% wt. oxygen and renewable chemicals.

The reaction usually involves homogeneous and/or heterogeneous catalysts to improve the quality of products and yields. Carbon and hydrogen of an organic material, such as biomass, peat or low-ranked coals (lignite) are thermochemically converted into hydrophobic compounds with low viscosity and high solubility. Depending on the processing conditions, the fuel can be used as produced for heavy engines, including marine and rail or upgraded to transportation fuels, such as diesel, gasoline or jet-fuels.

In the framework of the presently application, this expression correspond to the step wherein agglomerates are at least partially in a liquid feedstock to be submitted to thermal treatment in a rotating kiln.

Liquefaction and Dehydration of the Feed—

The resulting pre-treated starting material then enters a liquefaction vessel to be liquefied, thus increasing the liquid fraction of the said feed material. Advantageously, at least part of the liquid in the liquefaction vessel is taken from a unit downstream from the pyrolysis reactor and preferably consists of 1 to 50 weight percent of the liquid, more preferably 5 to 40 weight percent of the liquid, more preferably 10 to 30 weight percent of the liquid, more preferably 15 to 25 weight percent of the liquid, more preferably 18 to 22 weight percent of the liquid. When the pre-treated solid feed material enters the liquefaction vessel, it preferably mixes with the liquid contents of the vessel and is heated to a temperature which is preferably between 60° C. and 330° C., more preferably between 140° C. and 260° C., more preferably around 250° C. The pressure in the vessel is preferably between 0.1 to 10 atmospheres, more preferably between 0.3 and 5 atmospheres, more preferably between 0.5 and 2 atmosphere. Upon heating, some of its components melt, others vaporize, others remain solid and others decompose to form vapours and solids. By heating the pre-treated starting material, some of the water will evaporate and will exit the vessel, along with other lighter vapours, thus effectively dehydrating the material to be fed into the kiln. Advantageously, the liquefaction vessel is equipped with a self-refluxing condenser in order to condense some of the vapours exiting the vessel. The methods of heating the vessel are, for example, by introducing a flame near the walls of the vessel, by the injection of superheated steam into the vessel, by the transfer of heat with a thermal fluid, by electromagnetic radiation, by an electric heat source, or by coil visbreaking, or any combination of at least two of these. Coil visbreaking is achieved by circulating the fluid within the vessel though heated pipes via the use of a pump, wherein said pipes may, for example, be heated by any one or any combination of the methods listed above. After the liquefaction step, the resulting material is deemed liquid and may or may not contain entrained solids and/or vapours.

Thermal Processing in the Rotating Kill

The resulting liquid reactor feed stream is sprayed onto metal plates in a rotating kiln, where it is thermally cracked and/or vaporized. The reactor operates under positive pressure. The reaction products, organic vapours and solid coke, are swept out of the reactor as soon as possible to prevent secondary reactions. Most of the coke is removed from the organic vapor stream, before the bio-oil is condensed, usually in a box and/or cyclones. The residual coke is washed out for the organic vapours preferably in a wash column or in a dephlegmator. The organic vapour stream is condensed and separated into specified products. The non-condensable gas, heated or non-heated gas and possibly the naphtha is (are) used as fuel on site.

Thermally treating of the feed material comprising:
a) at least one step performed in a rotating kiln operating under positive pressure managing system and wherein in the process a sweep gas, that is an inert gas or a substantially non-reactive gas, is injected into the rotating kiln or in the feed stream entering the rotating operating kiln; or
b) at least one step performed in a rotating kiln having a pressure control system that keeps the reactor under positive pressure; or
c) at least one step performed in a rotating kiln wherein a sweep gas is injected in the rotating kiln or in the feed stream entering the rotating operating kiln, wherein in step a), or in step b), or in step c), the conditions of the thermal treatment are managed in order that the exit stream, after cooling, result in at least one liquid phase that is preferably essentially a bio-oil liquid phase.

Advantageously, the rotating kiln is of the indirect fired kiln type. According to a preferred embodiment, the overpressure managing system is a pressure control system positioned at the entry and/or at the exit of the rotating kiln, for example the pressure control system is a device controlling a valve at the exit. The feed material is advantageously organic liquid feed material.

The process of the invention involving thermal processing in a rotating kiln is particularly suited for thermally treating a feed material and for producing the following components: coke and non-condensable gas and/or light bio-oil and/or heavy bio-oil and/or naphtha, each of those produced components being recovered separately or in the form of mixtures of at least two of these components.

According to a preferred embodiment, the vapours and the solids exiting the kiln are routed to vapour-solid separation means.

Advantageously, the vapour-solid decantation means are a stationary box and/or a heated cyclone for the heavier solid and/or then are sent to a cyclone(s) to separate most of the solids present in the vapours exiting the rotating kiln from the vapours.

The vapour-solid separation equipment, preferably the separation box and/or the cyclones, is (are) preferably heated, at a temperature that is (are) above the temperature of the vapours exiting the kiln, more preferably this temperature is up to about 300 degrees Celsius, more preferably up to 200 degrees Celsius, advantageously up to about 20 degrees Celsius, more preferably up to 10 degrees over the temperature of the vapours exiting the kiln.

Advantageously, the vapour solid separation equipment, preferably the cyclones and/or the separation box, are heated at a temperature that is at least 10 degrees Celsius, and preferably at least 20 degrees Celsius, below the cracking temperature of the vapours.

The solid exiting the rotating kiln is advantageously a dry coke, i.e. this coke preferably contains less than 2 percent weight of bio-oil.

According to a preferred embodiment, most, preferably more than 50% wt., more preferably more than 90% wt., of the coke is removed from the vapours exiting the rotating kiln, and, in the case wherein the organic liquid feed is a mixture of treated MSW and a used oil, up to 99% wt. of the coke is removed from the vapour exiting the rotating kiln.

Advantageously, the vapours exiting the vapour solid separating equipment, such as cyclone(s), are partially condensed in a self-refluxing condenser and/or in a wash tower, to complete the removal of solids from the reactor products.

According to a preferred embodiment, the vapours exiting the last set wherein solids are eliminated, preferably this step takes place at the top of the condenser and/or of the wash tower, are routed to product separation, while the recovered heavy bio-oil containing the residual solids exits at the bottom.

Advantageously, the heavy bio-oil, containing the residual, is recycled, preferably in a dewatering step when present, and/or in the organic feed entering at the beginning of the process, and/or in the reactor organic liquid feed entering the rotating kiln, and/or in a step in which the organic feed is liquefied into organic liquid feed.

Advantageously, the absolute pressure in the rotating kiln, ranges from 1 to 4 atmospheres, preferably this pressure ranges from 1.1 to 1.5 atmospheres and/or the organic liquid feed is, before entering the rotating operating reactor, heated, preferably at a temperature that is at least 20 degrees Celsius under the cracking temperature of the components of the organic liquid feed.

Advantageously, the heating step(s) is(are) accomplished in a heater and/or by heat exchange with a hot bio-oil stream, a hot thermal fluid, by the injection of a hot gas, by direct contact with a hotter bio-oil stream, or by a combination of at least two of these methods.

Alternatively, the reactor feed stream resulting from the heating of the organic liquid feed is sprayed onto metal plates in a rotating kiln that contains metal plates, wherein it is thermally cracked and/or vaporized.

The reaction products that exit the rotating kiln, advantageously comprises organic vapours and other vapours present in the reaction zone of the rotating operating kiln and solid coke.

Advantageously, the reaction products exiting the rotating operating kiln are swept out of the rotating operating reactor as soon as possible, preferably in 5 seconds to 60 minutes, more preferably in about 5 minutes. Reactor residence time is a function of the organic liquid feed composition, of the pressure in the reactor, of the temperature, the sweep gas amount and composition, and/or of the desired products slates.

According to an alternative embodiment of the process, the reaction products, when swept out of the rotating are heated at a temperature that is advantageously slightly over the temperature at the exit of the reactor.

Advantageously, most of the coke is removed from the organic vapor stream exiting the rotating kiln, before the bio-oil is condensed preferably in a vapour-solid separator and then advantageously in cyclones and/or in a wash tower and/or in a self-reflecting condenser.

According to a preferred embodiment, the bio-oil product stream is condensed and separated into specified products and/or at least part, and preferably all, the non-condensable gas produced in the rotating operating kiln is used as fuel on site and/or at least part, and preferably all, the naphtha present in the organic liquid feed and/or produced in the rotating kiln is used as fuel on site.

Advantageously, the sweep gas is superheated steam and/or nitrogen and/or the sweep gas represents in weight up to 30% of the weight of the organic liquid feed, more preferably up to 10% wt., and more preferably between 0.5 and 5% wt. of the weight of the organic liquid feed.

According to an alternative embodiment, the cyclones are outside of the rotating operating reactor but inside a second enclosure, the second heated enclosure communicating or not with the first reaction's zone in order to benefit of a hot flue gas flow surrounding the cyclones.

Advantageously, wherein the residence time in the rotating kiln ranges from 5 seconds to 15 hours, preferably from 1 minutes to 15 hours, and this time is preferably comprised between 2 minutes and 30 minutes. At least part of the purified recovered bio-oil may be used on the site.

According to a preferred embodiment, the demetallisation of the total bio-oil liquid products (heavy bio-oil, light bio-oil and naphtha) recovered during the process is of at least 85% wt., preferably of at least 90% wt. and more preferably of at least 95% wt.

Advantageously, the total recovered bio-oil contains less than 60 PPM of metals.

Advantageously, the non-condensable gas and the naphtha produced are used as fuel on site to satisfy the energy self-sufficiency of the plant in function.

According to a preferred embodiment, the rotating kiln used in the process of the invention contains a charge made of plates and at least part of the surface of the plates is used to perform the thermal treating.

Advantageously, the thermal processing is performed on at least part of the surface of the plates in movement.

The processes of the present invention are particularly suited for the thermal processing of a mixture, wherein thermal processing being performed on at least 5%, preferably on at least 10% of the surface of the plates and/or on at least 5%, preferably on at least 10% of the plates. Advantageously, the plates when moving inside the reactor clean the walls of the reactor and/or the plates protect at least part of the walls of the reactor and avoid reactor wall failure due to hot pots and/or thermal shock.

According to a preferred embodiment, the plates contribute to the uniformity of temperatures conditions in the reactor and/or the plates contribute to the heat transfer taking place from the heated walls to the surface of the plates, particularly on the surfaces of those plates wherein thermal processing occurs and/or the plates contribute to avoid spraying of cold mixtures on the heated walls of the reactor, and avoid reactor wall failure due to thermal shock.

According to another preferred embodiment of the invention, the reactor comprises:
 a. a rotating kiln;
 b. a heating system;
 c. at least one shelf on the reactor wall;
 d. a charge of plates of consistent shapes;
 e. means for bringing the mixture to be thermally processed on the surface of at least part of the plates;
 f. means for removing the fine solids from the reactor, preferably either through entrainment with the exiting vapours, or through a separate solids exit, or both;
 g. means for recovering the reaction and straight run products; and
 h. means for venting the gas obtained by the thermal processing outside the reactor zone.

In the framework of the present application, the rotating kiln and internals to be used preferably have a structure as defined in the international patent application entitled PCT/CA2013/050111, complete content of said document being incorporated by reference in the present patent application.

In those reactors, the at least one shelf is advantageously placed on the reactor wall in such a way to keep a uniform distribution of the plates along the reactor length.

Preferably, the at least one shelf is either parallel to the center axis of the reactor, when the reactor is horizontal, or slanted with respect to the centre axis when the reactor is horizontal, or slanted with respect to the centre axis when the reactor is slanted or not slanted.

Advantageously, said means for bringing the mixture to be thermally processed on the surface of at least part of the plates, bring the said mixture on the surface of at least more than 10% of the plates, preferably on the surface of at least more than 30% of the plates, and more advantageously on the surface of about 50% of the plates present in said reactor.

Figure 27:
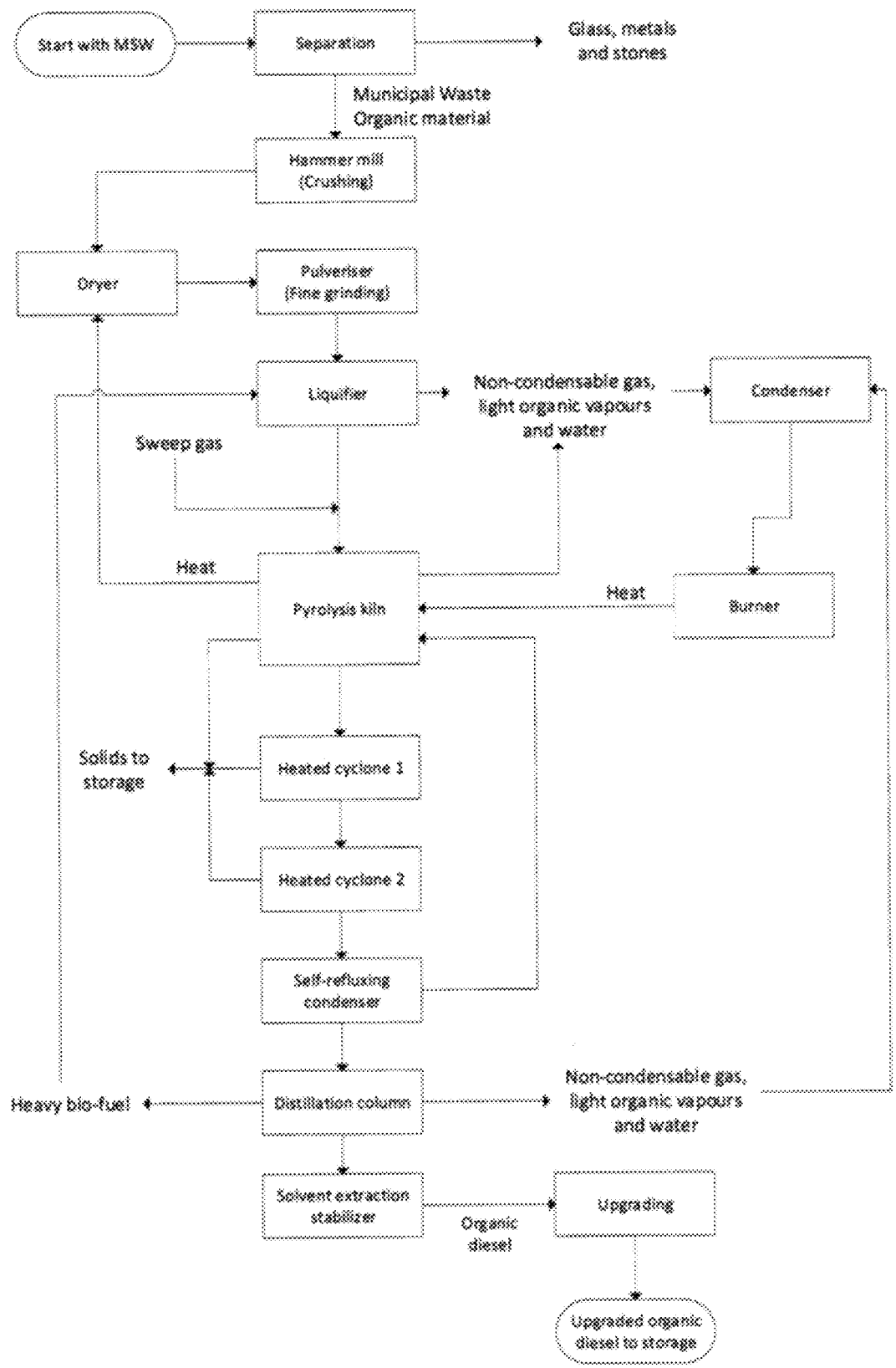
FIG. 27 is a simplified flow diagram illustrating an eleventh embodiment of the process according to the present invention in which the organic diesel exiting the solvent extraction stabilizer is upgraded to improve at least one of its properties before being sent to storage.
Figure 28:
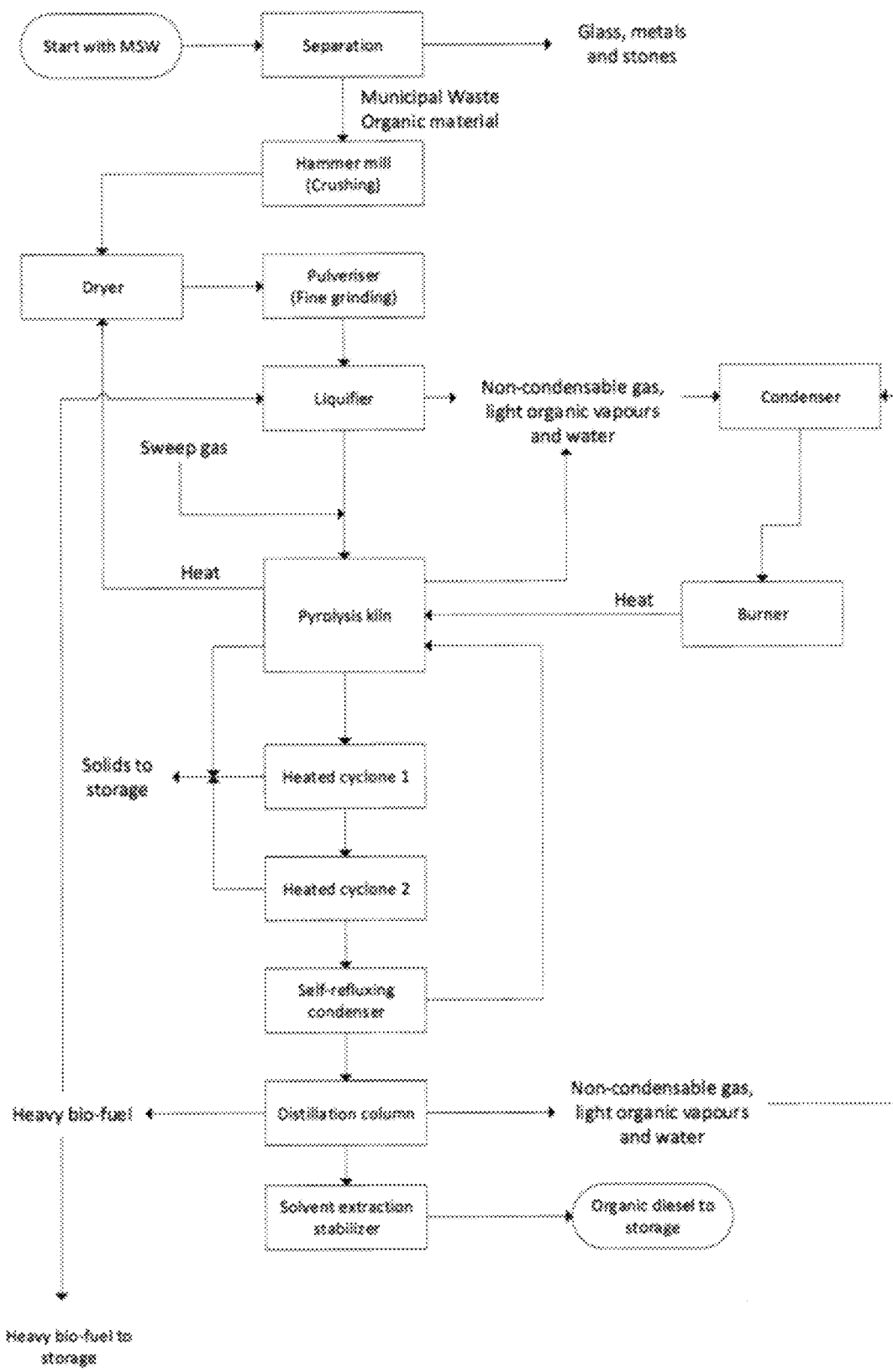
FIG. 28 is a simplified flow diagram illustrating a twelfth embodiment of the process according to the present invention as illustrated in FIG. 1 and wherein part of the heavy bio-fuel obtained from the distillation column is sent to storage.
Figure 29:
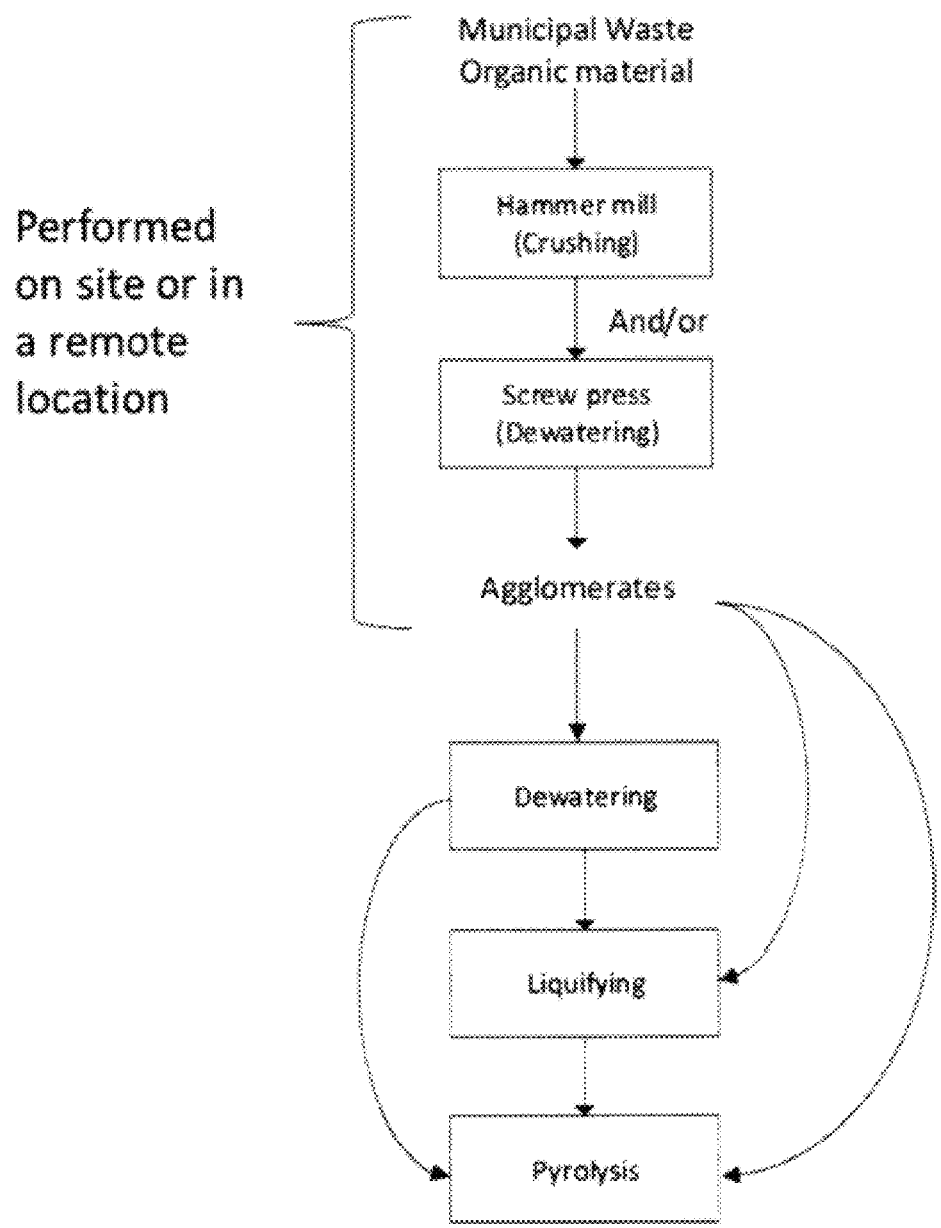
FIG. 29 is a simplified flow diagram illustrating a first embodiment of the preparation of agglomerates from Municipal Waste Organic material and wherein agglomerates are directly submitted to pyrolysis or are dewatered and/or liquified before being submitted to pyrolysis.
Figure 30:
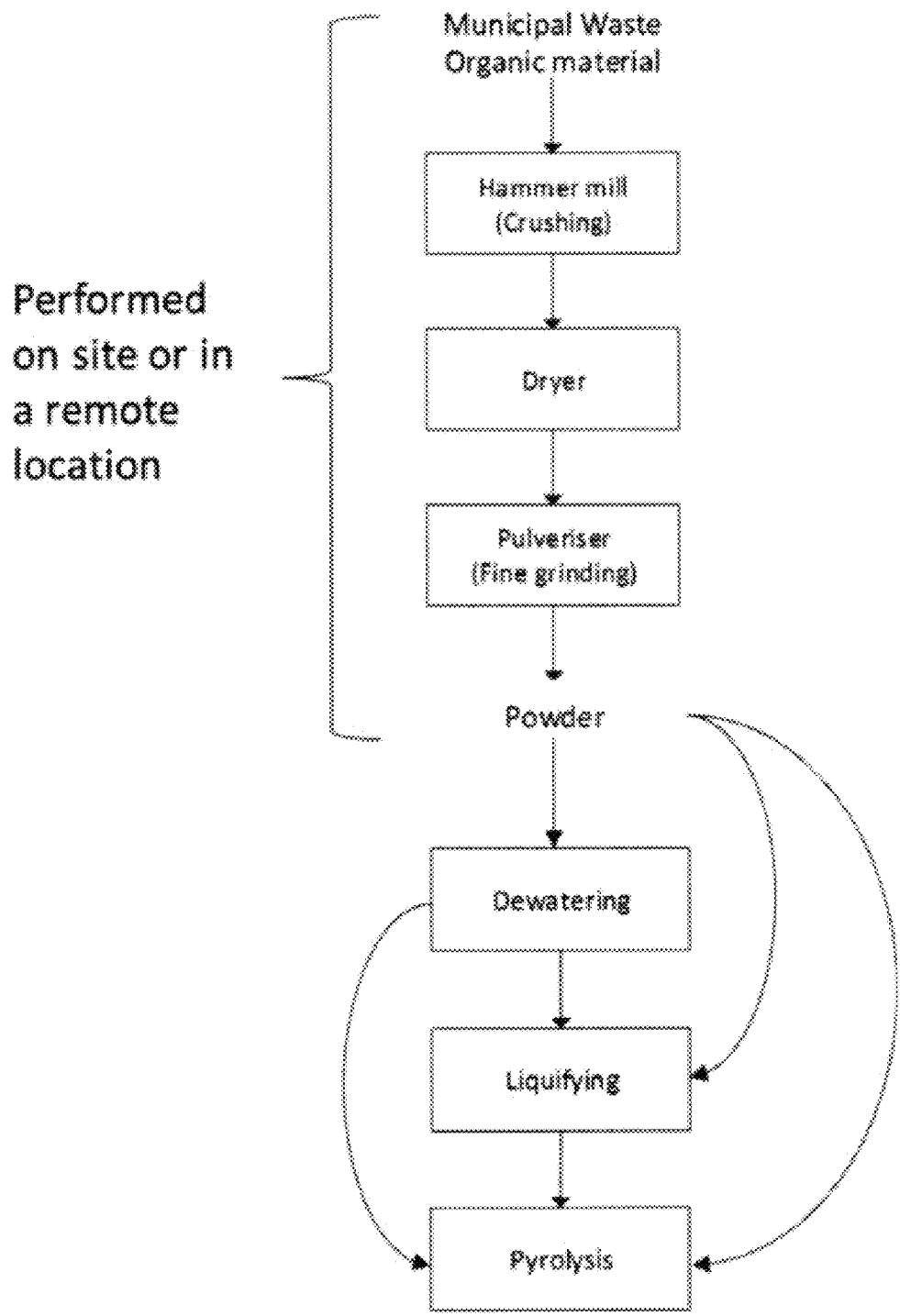
FIG. 30 is a simplified flow diagram illustrating a first embodiment of the preparation of a powder from Municipal Waste Organic material and wherein the powder is directly submitted to pyrolysis or is dewatered and/or liquified before being submitted to pyrolysis.
Figure 32:
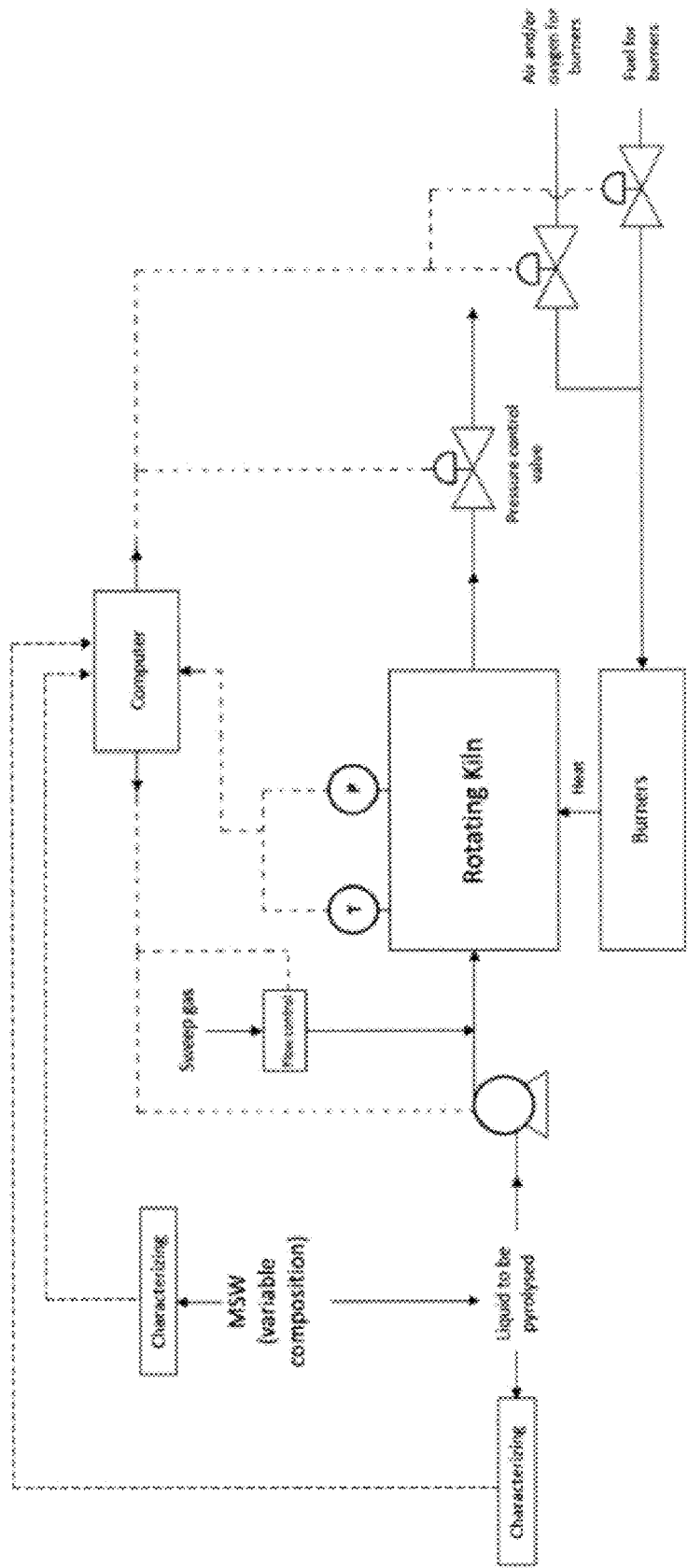
FIG. 32 is the diagram of one embodiment of a managing system, according to a first embodiment of the system for treating MSW with a variable composition, with captors represented.

One illustrating example of an embodiment of the managing system can be seen in FIG. 27. Preferably, the pressure within the kiln and temperature within and/or outside of the kiln are measured with appropriate instrumentation. For example, the pressure within the kiln is controlled with a pressure control valve downstream of the reactor. The temperature within kiln is controlled by controlling the amount of heat generated by the burners and/or by controlling the amount of liquid fed into the reactor and/or by controlling the temperature of the liquid entering the reactor and/or by controlling the amount of sweep gas entering the reactor and/or controlling the temperature of the sweep gas entering the reactor. The heat generated by the burners is controlled by adjusting the flow rate of fuel to the burners and/or by adjusting the flow rate of air and/or oxygen to the burners.

Preferably, the at least one shelf being either parallel to the center axis of the reactor, when the reactor is horizontal, or slanted with respect to the center axis when the reactor is slanted or not slanted.

In an alternative embodiment of the invention, shelves are at least partially replaced by a row of stoppers or protuberances to support the plates.

Preferably, at least one shelf is placed on the reactor wall in such a way to keep a uniform distribution of the plates along the reactor length, and more preferably, the at least one shelf is either parallel to the center axis of the reactor, when the reactor is horizontal, or slanted with respect to the centre axis when the reactor is slanted or not slanted.

Advantageously, the means for bringing the mixture to be thermally processed on the surface of at least part of the plates, bring the mixture on the surface of at least more than 10% of the plates, preferably on the surface of at least more than 30% of the plates, and more advantageously on the surface of about 50% of the plates present in the reactor.

The mixture to be thermally processed is advantageously a liquid, gas and/or solid and/or is a mixture of at least two of these, preferably the mixture comprises mostly organic compounds that may be transformed by thermal processing, more preferably the mixture comprises at least 80% wt., preferably at least 90% wt.), more preferably at least about 95% wt. of organic compounds that may be transformed by thermal processing.

Advantageously, the process is used to treat mixtures that may comprise other components that are not organic compounds and/or that may not be transformed by thermal processing.

Advantageously, the treated mixtures are composed of organic compounds that may be transformed by thermal processing in: a liquid phase, a gaseous phase, a solid phase, or in a combination of at least two of these phases and/or the mixture are mostly composed of organic compounds that may be transformed by thermal processing, in at least a liquid phase, a gaseous phase and a solid phase.

According to a preferred embodiment, the reactor liquid waste feed is substantially free of an organic liquid and of a slurry phase.

The processes of the invention, may operate in less than 10% vol., preferably in less than 5% vol. of an organic solid, and/or liquid and/or of a slurry phase and/or operate in the absence of an organic solid, liquid and/or slurry phase.

In the processes of the invention, the rotating kiln rotates around its centre axis, the axis is horizontal or slanted.

Advantageously, the rotating kiln rotates around its centre axis, the axis forming with the horizontal an angle that is less than 45 degrees, preferably less than 30 degrees and more preferably this angle is about 5 degrees and more advantageously the angle is of 0 degree.

According to another preferred embodiment, the center axis of the rotating kiln is horizontal or slanted and the angle is maintained constant except in the case wherein solid agglomeration occurs or when the reactor is cooled down after operation and/or the walls of the reactor are directly and/or indirectly heated.

Advantageously, the inside of the reactor is directly and/or indirectly heated and/or the heat source is generated by electricity, a hot bio-oil and/or gas stream, or obtained from the combustion of gas, naphtha, other oily streams, coke, coal, or organic waste or by a mixture of at least two of these.

The inside of the reactor may be indirectly heated by an electromagnetic field and/or the inside of the reactor is directly heated by a hot gas, liquid or solid stream, electricity or partial combustion of the feedstock, coke, products or by-products.

According to a preferred embodiment, the heating means comprises at least one heating system external to the walls of the reactor which is usually the case of an indirectly fired kiln.

Alternatively, the external walls of the reactor may be partially surrounded by, or exposed to, one or more burners and/or exposed to combustion gas and/or hot solids.

The walls of the reactor are advantageously surrounded by a fire box, and the fire box is stationary and may contain one or more burners.

According to another preferred embodiment, one or more shelves are attached to the internal walls or the external walls of the reactors and/or the shelve (s) is (are) are attached to the wall of the reactor in a way allowing for the thermal expansion of the shelves with minimum stress on the reactor walls and on the shelve(s).

Advantageously, the shelve(s) is(are) held by T shaped clamps and/or the shelve(s) is(are) symmetrically attached to the internal wall of the reactor and/or the shelve(s) is(are) attached to the internal wall in a designed and/or random pattern of the reactor.

According to another preferred embodiment, the number of shelve(s) that is(are) disposed, per square meter of the internal surface of the reactor, on the internal wall of the reactor ranges from 1 to 40, preferably from 2 to 20 and/or the number of shelve(s) that is(are) disposed, per square meter of the internal surface of the reactor, on the internal wall of the reactor ranges from 1 to 50 units, more preferably from 2 to 20, advantageously from 3 to 15 and this number is more advantageously about 4.

The number of shelves in the reactor may depend on the weight of the plates and/or on the maximum operating temperature of the reactor wall and/or on the material the shelves and plates are made of.

Advantageously, the space between two shelves represents from 0 to 100%, preferably this space from 5 to 100% of the radius of the cylinder.

Alternatively, the space between two shelves represents from 10 to 100% of the radius of the cylinder; this space is preferably about 25% of the radius of the reactor that is preferably a cylinder.

The distance between two shelves represents from 5 to 100% of the circumference of the inner wall of the reactor that is preferably a cylinder, more preferably a cylinder with conic ends.

Advantageously, the distance between two shelves represents from 10 to 100%, this space being preferably about 25% of the circumference of the inner wall of the reactor that is preferably a cylinder.

The processes of the invention wherein the form of the shelves in the rotating reactor is selected in the group constituted by flat, concave, convex, spiral and slanted are of a particular interest.

Advantageously, the shelves are slanted in relation to the reactor axis, the angle between the reactor axis and the shelves is the same as that between the reactor axis and the horizontal, and preferably the angle between the reactor axis and the horizontal can range from 0° to 30° and is more preferably 0°.

Advantageously, the height and/or the width of the shelves is calculated and depends on at least one of the following parameters: the space between the shelves, the space between the supports (the "T" brackets), the material the shelves are made of and the weight of the plates, more preferably, the height or width of the shelves ranges from 1 to 8 cm.

According to a specific embodiment, the height or width of the shelves ranges from 1.5 to 4 cm, and the width is preferably about 2.5 cm, more preferably about 2 and/or the width and the height of the shelves are selected in order for the shelves to be able to retain 2 to 3 plates.

The height of the shelves is, advantageously, at least about the thickness of the plates, preferably about twice the thickness of the plates and/or the shape of the plates of the charge is selected among the group of parallelograms, such as square, rectangles, lozenges, or trapezes.

According to a preferred embodiment, the plates of the charge are rectangular, triangular, hexagonal or octagonal and/or the shape of the plates of the charge is perfect or imperfect, or about perfect.

Advantageously, all the plates present in the reactor have about the same size and shape.

According to another preferred embodiment of the invention, the volume of the plates of the charge present in the reactor represents from 1 to 25% of the internal volume of the reactor and/or the volume of the plates of the charge present in the reactor represents about 4%, of the internal volume of the reactor.

Advantageously, the charge of the reactor is constituted by flat and/or slightly curved metal plates of consistent thickness and shape and/or by plates having a melting point which is at least of 100 degrees Celsius, and more preferably is of at least 150 degrees Celsius above the reactor wall maximum operating temperature in the thermal processing zone.

According to a preferred embodiment, the rotating reactor used is characterized by plates are heavy enough to scrape coke or other solids off the reactor wall and/or off other plates, more preferably each plate has a density that is superior to 2.0 g/cm$^3$, preferably superior to 2.0 g/cm$^3$ and more preferably comprised between 5.5 g/cm$^3$ and 9.0 g/cm$^3$.

Advantageously, the means for bringing the mixture in contact with at least part of the surfaces of the plates are spraying means and/or a conveyor, more advantageously, the means for bringing the mixture in contact with at least part of the surfaces of the plates are spray nozzles that spray the mixture onto the surface of the plates of the charge when the feed stream is liquid and/or is mixture of liquid and/or gas.

The means for bringing the solids outside the reactor is (are) advantageously entrainment with the product gas, scoop(s), screw conveyors and/or gravity.

The means for bringing the solid outside the reactors advantageously comprise an exit hopper arrangement attached to the solids exit tube.

According to another preferred embodiment, the reactor has two exits: one for the solids and one for the gas/vapours and entrained solids obtained.

Advantageously, the gas/vapours obtained during the thermal processing contain entrained solids.

Additionally, the reactor is equipped with means for avoiding accumulation of solid in the reactor and/or for plugging of any of the exits.

Advantageously, the means for avoiding accumulation are a screw conveyor in the solids exit tube, or a slanted solids exit tube and/or the reactor is a cylinder, or a cylinder with two conic extremities, or two cones attached by their basis, or a sphere.

In a preferred embodiment, the reactor is a heated cylinder having a length to radius ratio ranging from 1 to 20 and preferably ranging from 2 to 15, more preferably this ratio is about 10 or about 5.

According to another preferred embodiment of the invention, the processes of the invention are performed with a feeding line positioned about the longitudinal central axis of the reactor, the feeding line being attached to the internal walls of the reactor by attachment means that allow the feeding line to stay immobile despite the rotational movement of the reactor, the attachment means thus preferably comprise a tube and/or at least a ring surrounding the feeding line, the surrounding tube and/or surrounding ring(s) being attached to the internal wall of the reactor and leaving at least part of the feeding line not surrounded.

The diameter and/or the constituting material of the surrounding tube and/or of the surrounding ring(s) is (are) advantageously selected in order to allow the thermal expansion of the feeding line support ring.

According to an embodiment of a particular interest, the attachment means comprise a second tube and/or at least a second ring surrounding the first tube and/or the at least first ring surrounding the feeding line, the second surrounding tube and/or the surrounding ring(s) being attached to the internal wall of the reactor and to the external surface of the first tube and/or of the at least first ring surrounding the feeding line and leaving at least part of the feeding line not surrounded by support rings.

Advantageously, the length of the attachment means of the second tube and/or of the at least a second ring is about the distance between the external wall of the second tube and/or of the at least a second ring to the internal wall of the reactor; more preferably, the length of the attachment means of the second tube and/or of the at least a second ring is superior, preferably for at least 10%, more preferably superior for at least 20%, to the distance between the external wall of the second tube and/or of the at least a second ring to the internal wall of the reactor.

Advantageously, the length of the attachment means of the first tube and/or of the at least first ring to the second tube and/or to the at least a second ring is about the distance between the external wall of the first tube and/or of the at least first ring to the internal wall of the second tube and/or to the at least a second ring.

According to another preferred embodiment, the length of the attachment means of the first tube and/or of the at least first ring to the second tube and/or to the at least a second ring is superior, preferably for at least 10%, more preferably for at least 20% to the distance between the external wall of the first tube and/or of the at least first ring to the internal wall of the second tube and/or to the at least a second ring.

Advantageously, some, preferably each, of the attachment means are articulated to their attachment point.

According to another preferred embodiment, the reactor feed is made laterally trough one end of the reactor, and the exits of the vapours obtained during the thermal processing is positioned on the same end or at the opposite end of the reactor.

Advantageously, the reactor feed is made laterally trough one end of the reactor, and the exit of the cokes obtained during the thermal processing is positioned on the same end or at the opposite end of the reactor.

The reactor feed is advantageously made laterally trough one end of the reactor, and the exits of the vapours obtained during the thermal processing is advantageously positioned on the same end or at the opposite end of the reactor.

According to a preferred embodiment, the rotating kiln used to perform the process of the invention has heating means inside allowing the thermal processing to occur on the plates that are heated on the external walls of the kiln. In this configuration, the shelves are advantageously attached to the exterior surface of the kiln and/or the external walls of the kiln face the internal wall of the stationary housing.

The feeding of the mixture is advantageously performed on the top of the reactor and preferably is at equal distance of each end of the reactor.

The exit of the vapour is advantageously positioned on a side of the walls of the reactor and preferably at equal distance of both ends of the reactor.

According to another preferred embodiment, the exit of the coke is positioned on a side of the walls of the reactor and preferably at equal distance of both ends of the reactor.

Advantageously, the exit of the solids is on the bottom of the reactor and preferably is at equal distance of each end of the reactor.

Those processes of the invention wherein the continuous or semi-continuous thermal treating of the MSW and/or waste hydrocarbons and/or other organic material or a mixture of at least two of these is performed are of a particular interest.

The average residence time in the rotating kiln ranges advantageously from 5 seconds to 10 hours, preferably between 30 seconds and 2 hours, and more preferably is between 90 seconds and 10 minutes.

According to another preferred embodiment, the average organic vapour and organic liquid feed's residence time in the rotating kiln is, when:
- nitrogen as sweep gas is injected in the feed stream in an amount up to 15% wt., preferably in an amount up to 10% wt., more advantageously in an amount up to 7% wt., more preferably comprised between 5 seconds and 15 minutes, preferably between 8 and 10 minutes; and
- water steam is injected in the feed stream in an amount up to weight 10% wt., preferably in an amount up to 5% wt., more advantageously up to 3% wt., more preferably comprised between 0.5 minutes and 15 minutes, preferably between 4 and 5 minutes.

The heating temperature in the rotating kiln may range advantageously from 350 to 750 degrees Celsius.

Preferably the heating temperature on the surface of the plates in the reactor ranges from 390 to 500 degrees Celsius, more preferably from 420 to 455 degrees Celsius and, According to another preferred embodiment, the heating temperature in the reactor ranges from 500 to 520 degrees Celsius, an is preferably about 505 degrees Celsius, more preferably about 510 degrees Celsius particularly when MSW, organic material, shredded tires, bitumen, heavy oils, contaminated soils or oil sands or soil contaminated with heavy oils, or any combination of these are treated.

The rotation speed of the rotating reactor advantageously ranges from 0.5 rpm to 10 rpm.

The rotation speed of the rotating reactor depending on the size of the reactor and on the process requirements, may advantageously range from ranges from 1 rpm to 10 rpm, preferably 2 to 5 rpm from and is more advantageously about 3 rpm, for example in the case of a reactor treating 400 barrels of used oil per day.

According to a preferred embodiment of the process of the invention, the various fractions generated by the thermal processing are recovered as follow:
- the liquid fraction is recovered by distillation;
- the gaseous fraction is recovered by distillation; and
- the solid fraction is recovered for example in cyclones, a solids recovery box, a scrubber, a wash tower and/or a self-refluxing condenser.

Preferably are those processes wherein
- the amount of the recovered liquid fraction represents between 85% and 100% weight of the organic reactor feed; and/or
- the amount of the recovered gaseous fraction represents between 0% weight and 10% weight of the reactor feed; and/or
- the amount of the recovered solid fraction represents between 0% weight and 5% weight, when the feedstock is MSW and/or waste hydrocarbons and/or other organic material.

The processes are advantageously operated in a continuous or in a batch mode.

A second object of the present invention is constituted by non-environmental and by environmental uses of the processes defined in the first object of the present invention.

A third object of the present invention is a process for fabricating a plant comprising a rotating reactor and its internals for thermal processing according to the first object of the present invention, which process comprises assembly by known means the constituting elements of the reactor. Advantageously, the known assembling means comprise screwing, jointing, riveting and welding.

The sweep gas stream is any non-reactive, or a substantially non-reactive, gas that is introduced with the reactor feed stream, or via another injection nozzle, into the reactor via a separate nozzle. Examples of sweep gas streams include water steam, nitrogen and reaction non-condensable gas at normal conditions of atmospheric pressure and 15 degrees Celsius. By performing the process according to the present invention it has been surprisingly found that the sweep gas stream may additionally also serve a variety of functions such as, but limited to, the following functions:
- when injected into the reactor feed line, the sweep gas changes the density of the total feed stream; it changes the flow regimes within the feed line and/or nozzles, which results in lower incidence of fouling and plugging of the piping and spray nozzles, and in improved spray patterns; further, the sweep gas favours atomization of the organic liquid feed stream before the organic liquid feed reaches the reaction sites on the hot plates, and/or
- if introduced into the liquid feed at temperatures above that of the organic liquid feed stream, it will increase the feed stream temperature and reduce the energy, or heat, provided by the kiln, and/or
- it reduces the organic vapour's and/or organic liquid's residence time in the reactor, by sweeping the organic vapours out of the reactor soon after they are formed, thereby reducing the incidence of secondary reactions, or over-cracking, resulting in higher liquid yields and more stable liquid product bio-oils, and/or
- the sweep gas present in the reactor reduces the organic vapour's partial pressure, and favours the vaporization of the lighter organic fractions, for example gasoil and naphtha, in the feed and products; this also reduces over cracking in the lighter fraction and increases the stability of the bio-oil liquid products, and/or
- the sweep gas helps to stabilize the pressure in the reactor, and/or
- the sweep gas helps to keep the velocity of the vapours exiting the reactor stable, improving the solids-vapour separation efficiency in downstream equipment;
- when steam or nitrogen are used, the sweep gas reduces the risk of fires in the event of a leak in the reactor or in the downstream equipment; it will disperse the combustible vapours escaping and, hopefully, keep the combustible vapours from igniting, even if they are above their auto-ignition point, and/or
- it can also be part of the stripping gas stream in the product distillation unit.

Figure 50:
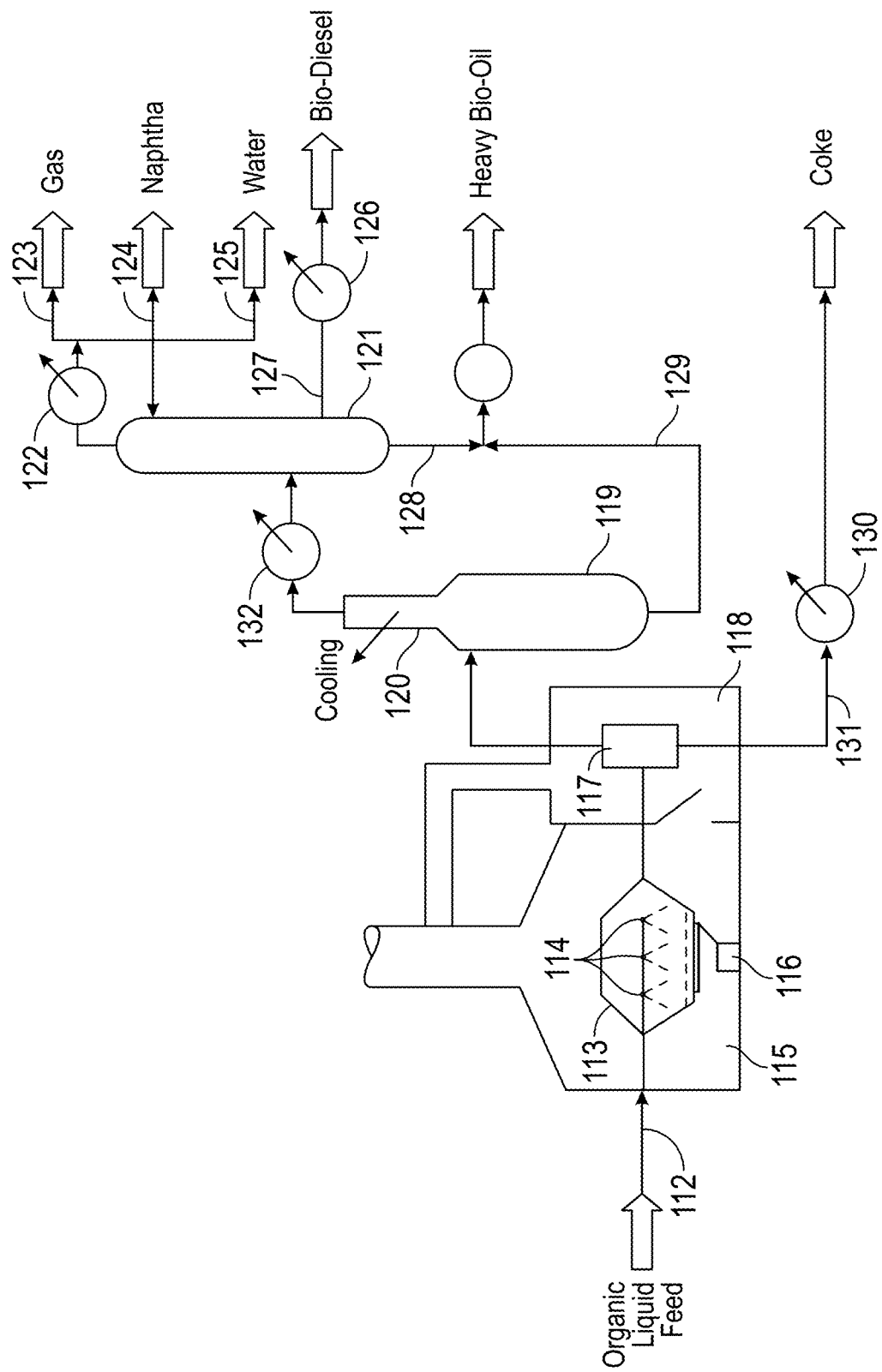
FIG. 50 is a simplified flow diagram illustrating a version of the process according to the present invention in which organic liquid feed is processed in the reactor and the reactor products are separated downstream.

As seen in FIG. 50, the organic liquid feed stream (112) is introduced into the reactor through one or more spray nozzles (114) within the rotating kiln (113) as described in the Canadian Patent Application No. 2,704,186. The kiln rotates within a combustion chamber (115) which is fired by temperature controlled burners (116). The rotating kiln has internals and is kept at the desired temperature such that the vaporization and thermal cracking of the organic liquid feed stream takes place before the liquid can reach the kiln wall.

The reactor operates at a positive pressure up to 100 kPa(g). The kiln operating temperature is determined by the quality and quantity of the reactor feedstock, and by the quality and quantity of the desired products, and by the reactor volume or residence time available. It can vary from 400 degrees Celsius to 700 degrees Celsius for MSW feeds, and around 500 degrees Celsius, when waste plastics are treated.

The organic vapours and the coke particles exit the reactor and enter a box and/or cyclone (117) separators where the solid particles are removed from the organic vapours. In a preferred mode, the vapour-solids separators are in a heated chamber (118) or heat traced to prevent dew point condensation and plugging of the equipment. The coke (131) and other solids drop by centrifugal force and gravity, they are cooled (130) and sent to storage. Normally, the coke and other solids exiting the reactor are non-leachable.

The organic vapours enter a flash drum (119) and self-refluxing condenser, or scrubbing tower (120) assembly, where the remaining coke is removed. The heavy bio-oil from the bottom of the flash drum (129) can be mixed with the distillation column bottoms and/or recycled to the reactor feed and/or sent to storage and sold. The vapours from the reactor are partially cooled (132) and enter the product separation unit (121). The vapours exiting the top of the main distillation column are cooled (122) and are separated in a three phase accumulator to yield the product gas (123), naphtha (124) and water (125).

The water is sent to storage or to the water treatment unit. After treatment, it can be re-used in the steam generation unit. Some of the naphtha is used as reflux to the main distillation column, the rest is sent to storage. It may be used as fuel in the plant. The gas is consumed on site as fuel in the plant.

The bio-diesel fraction (127) is pulled as a side cut, possibly through a stripper, cooled (126) and sent to storage.

The column bottoms or heavy product (128) can either be recycled to the liquifying vessel and/or to the feed entering the kiln, or cooled and sold as de-metalized, low sulphur, heavy fuel bio-oil.

Figure 2:
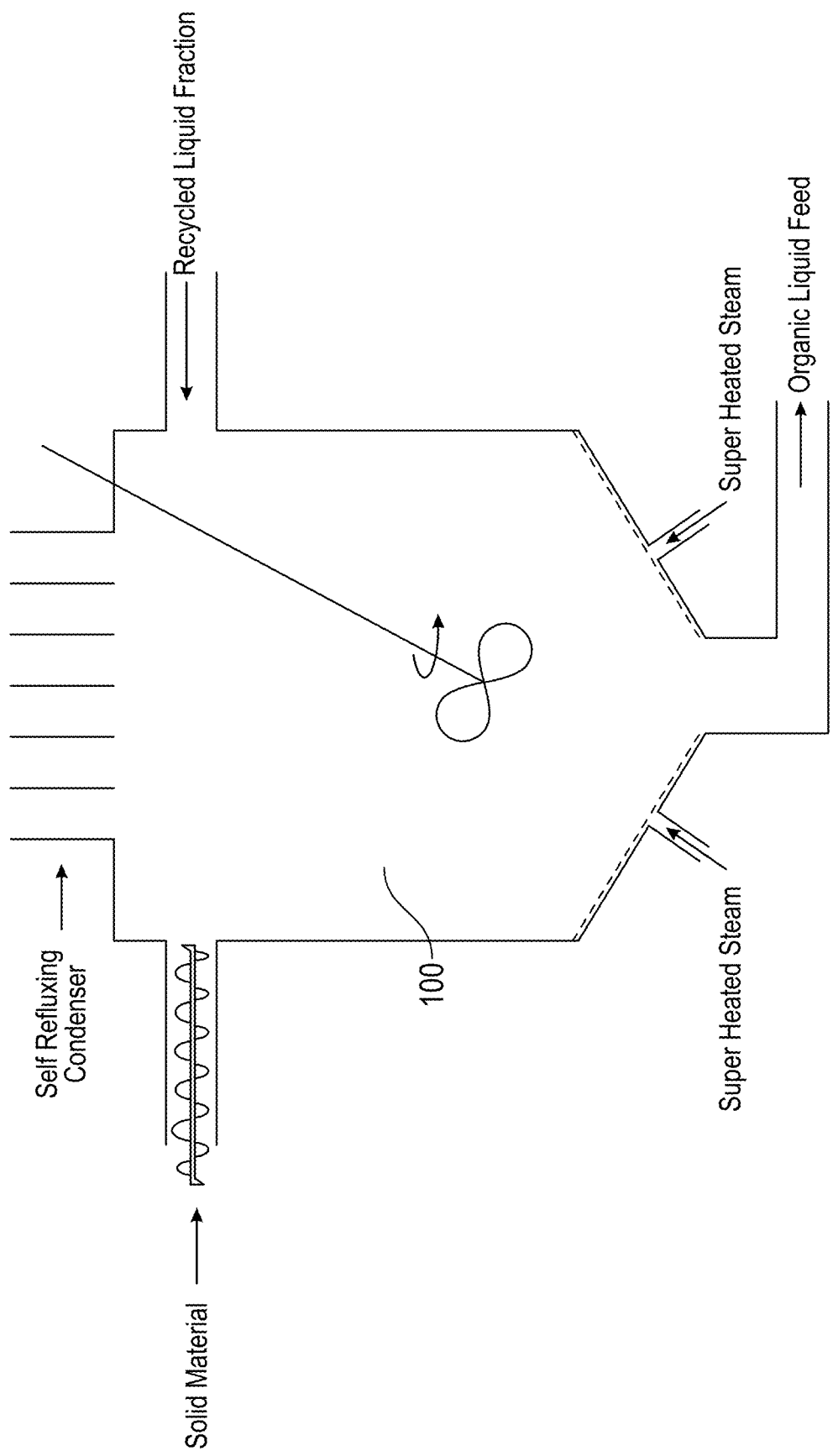
FIG. 2 is a simplified diagram of a liquifier which may be used to increase the liquid content of the feed entering the rotating kiln. In this embodiment, the contents of the liquifier are heated by the introduction of superheated steam into the liquifier through the use of feeding tubes positioned symmetrically along the conic bottom of the liquifier.
Figure 3:
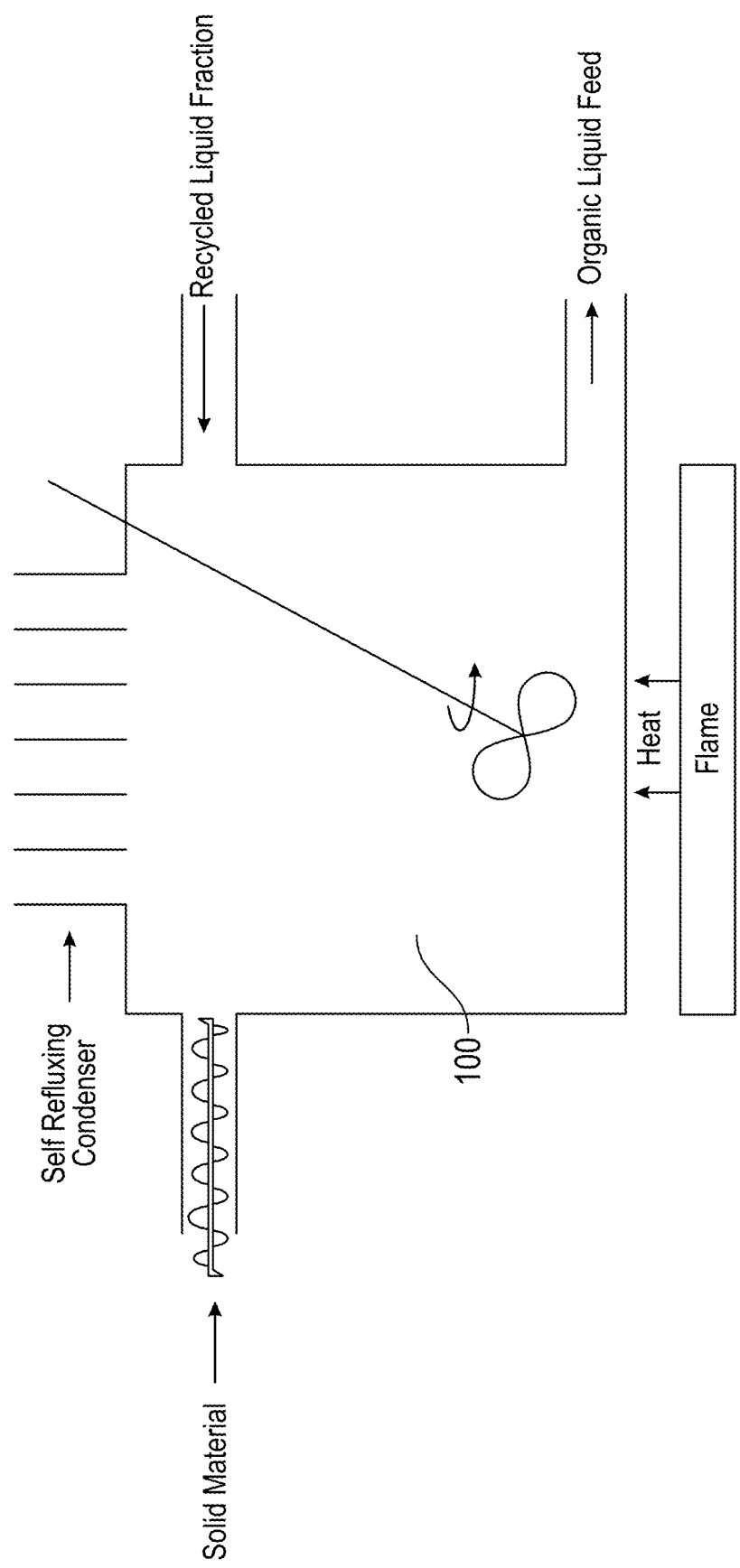
FIG. 3 is a simplified diagram of a liquifier which may be used to increase the liquid content of the feed entering the rotating kiln. In this embodiment, the contents of the liquifier are heated by the use of a flame near the bottom of the liquifier.

Advantageously, the a process is using an indirectly fired rotating kiln (1), represented on FIGS. 1 and 2, having preferably the following dimensions 8' by 20' containing a charge of 1100 metal plates (2) that are lifted by one or more narrow shelves (3) as the reactor rotates at a speed comprised between 0.5 and 10 rpm. The shelves are wide enough to hold two plates: one against the wall, and a second one against the first plate. The plates are flat pieces of metal of regular shapes. The heat (5) coming through the reactor wall heats the plates as they are dragged and lifted against the reactor wall by one or more narrow shelves. As the rotation continues, the plates fall off the shelves or off the plates below them, and flip as they fall, presenting the hot surface to the organic liquid feed jet (4) projected unto the plates (5) by a nozzle preferably spraying the organic liquid feed in a rectangular pattern.

The plates carry the heat from the reactor walls and provide a hot surface where the reactions take place. The plates are lifted and kept against the reactor walls by shelves (3). Depending on the thickness of the plates, the shelves can be designed to hold one, two or more rows of plates. As the kiln rotates, the plates fall off the shelves or off the plates below them, presenting the face that was against the reactor wall to the organic liquid spray.

As they slide over each other, the metal plates become a surface that protects the reactor walls from direct contact with the relatively cold organic liquid spray and from the resulting failure due to the thermal shock. Also, as they slide down the reactor, the plates scrape the reactor walls and each other clean of coke and avoid bridging of the depositing coke. The coke released is entrained out of the reactor with the organic vapours or is removed by the scoops, hopper and solids exit.

Figure 4:
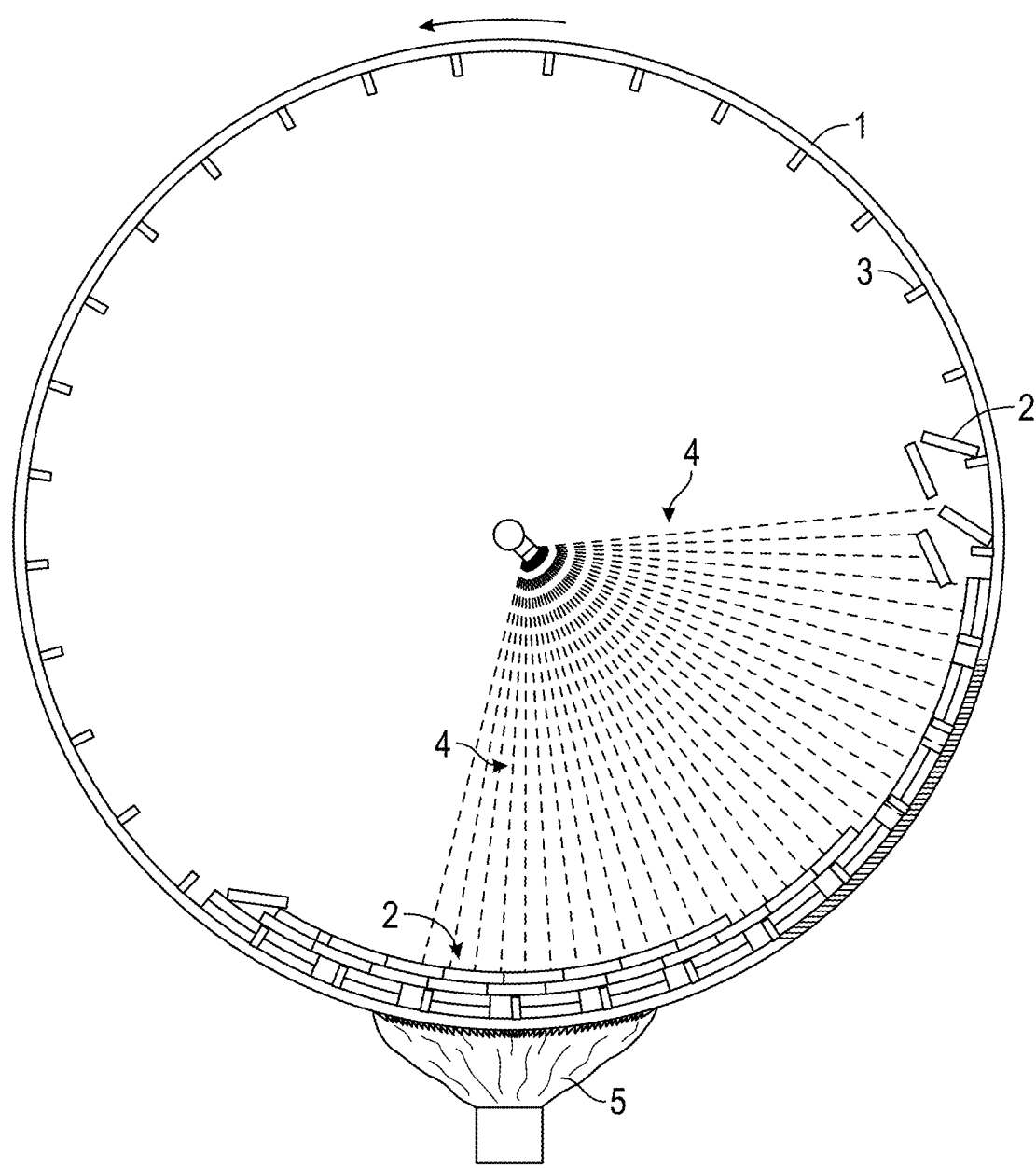
FIG. 4 represents a cross section, according to a plan perpendicular to the horizontal axis, of a reactor and the charge of metal plates and the shelves tacked on the kiln walls of a reactor according to a first embodiment of the present invention wherein the reactor cross section has 34 shelves. In this example, the shelves are spaced to allow for only two rows of plates per shelf, one layer against the reactor wall, the other against the first row.
Figure 5:
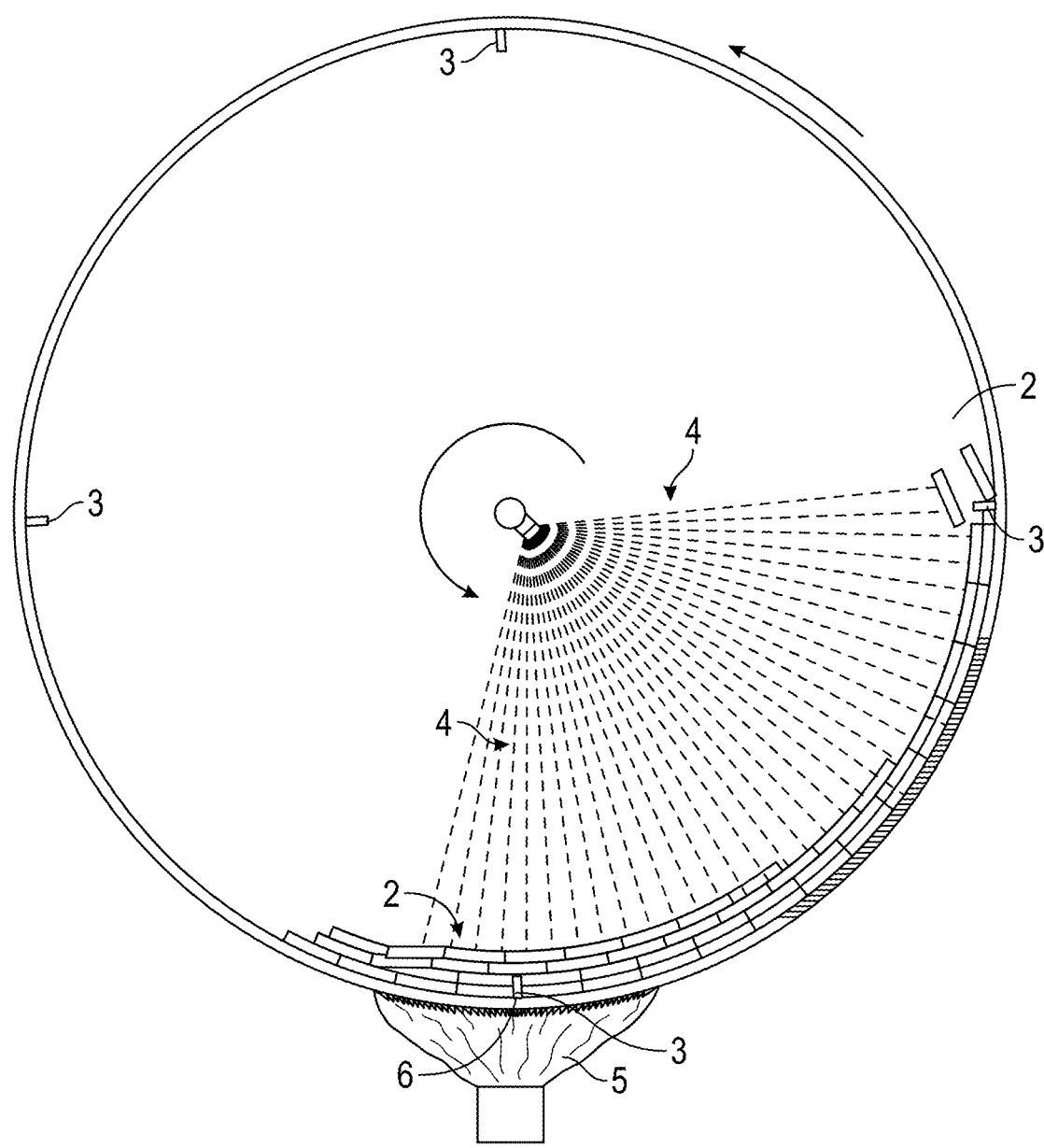
FIG. 5 represents a cross section, according to a plan perpendicular to the horizontal axis, of a reactor and the charge of metal plates and the shelves tacked on the kiln walls of a reactor according to a second embodiment of the present invention wherein the reactor cross section has only 4 shelves, each pushing two layers of enough plates to cover at least a quarter of the reactor wall.
Figure 6:
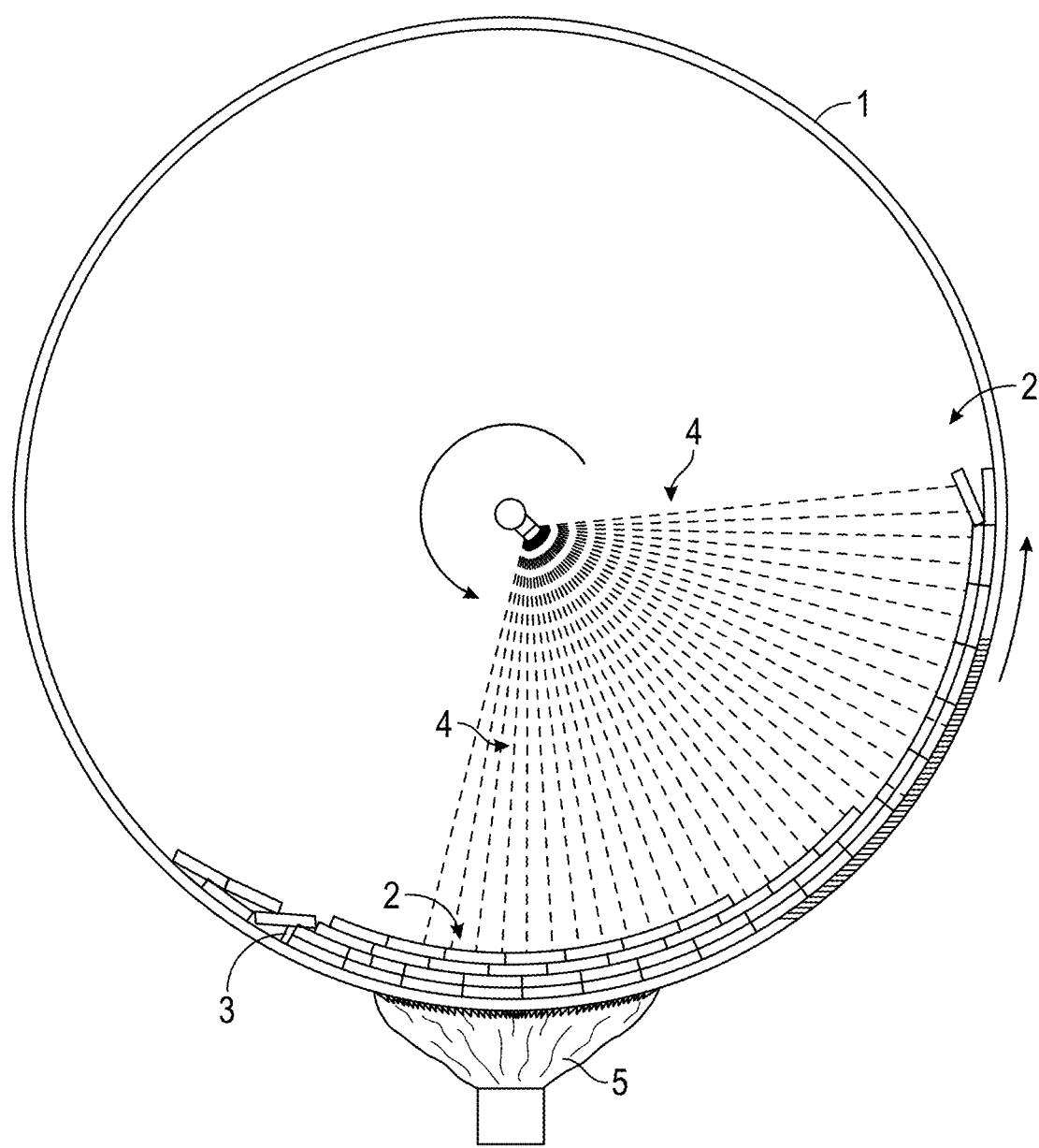
FIG. 6 represents a cross section, according to a plan perpendicular to the horizontal axis, of a reactor and the charge of metal plates and the shelves tacked on the kiln walls of a reactor according to a third embodiment of the present invention, as described in the "Preferred Mode" section of this application, wherein the reactor has only one shelf.
Figure 7:
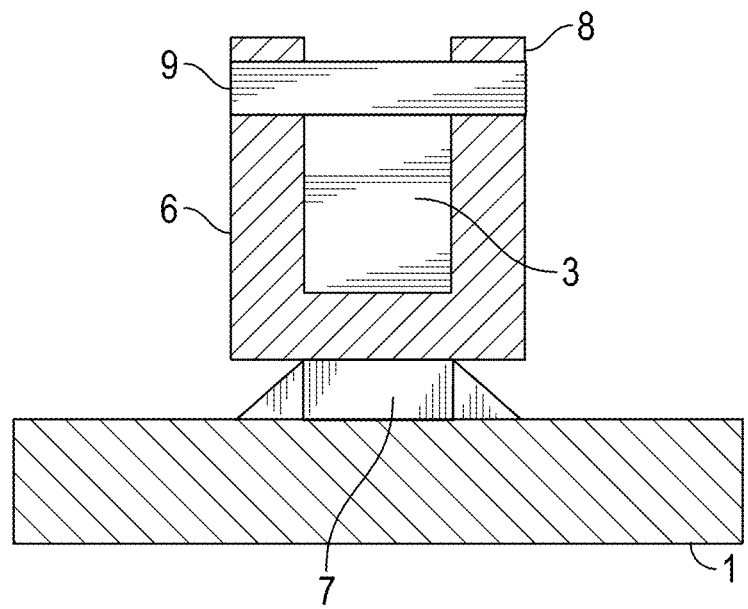
FIG. 7 represents a cross section of a bracket as present in the reactor represented in FIG. 2 with sections of shelves, seen from the top.
Figure 8:
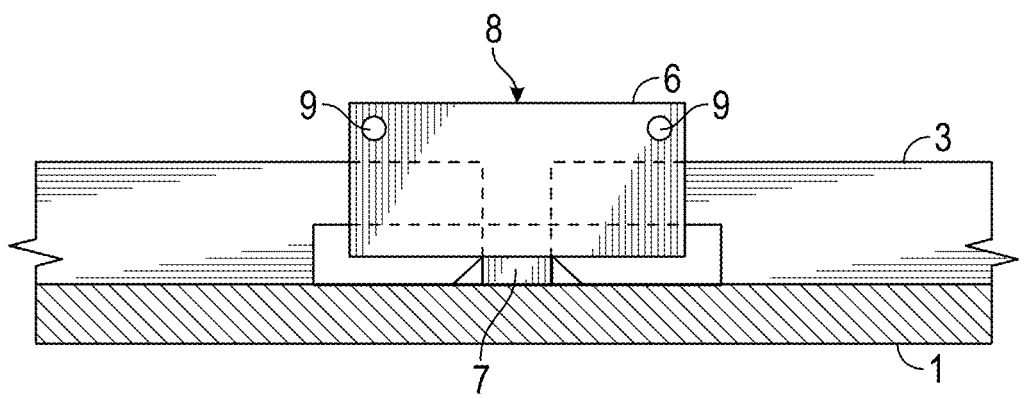
FIG. 8 represents the bracket of FIG. 4 shown from an end.
Figure 9:
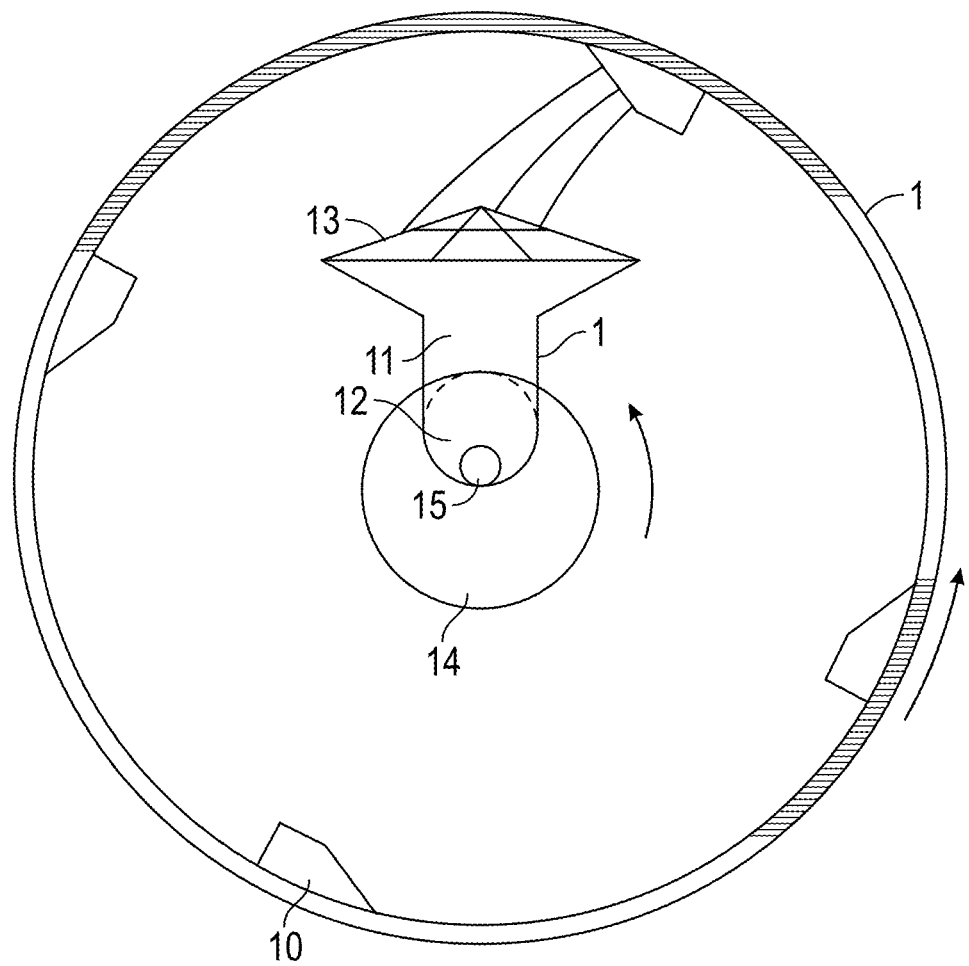
FIG. 9 illustrates an example of the exit end of the kiln represented in FIG. 1 with 4 scoops.

The shelves are attached to the reactor walls with clamps (6), represented on FIGS. 4 and 5, to reduce stress due to the differential thermal expansion between the reactor walls and the shelves. The clamps are spaced in such a way that, even at the hottest reactor temperature, the shelves are strong enough to support the hot plates on them. Depending on the spacing between the shelves, there may be only one double row of plates per shelf or several rows one on top of each other. Both the plates and shelves increase the heat transfer area from the heat source to the reaction site.

The clamps (6) are shaped like a T as represented in FIGS. 4 and 5. The base of the T (7) is welded to the rotating kiln walls. The cross bar or top of the T (8) is U shaped to receive the shelve (3) ends, leaving room for the thermal expansion of the shelves, both longitudinally and perpendicular to the reactor wall. Bolts (9) close off the U brackets and keep the shelves from falling out of the brackets. The branches of top of the T (6) are wide enough to allow for the thermal expansion of the shelves within them, while providing strength and support for the load of 1, 2 or more layers of the metal plates along the full length of the shelves in the reactor, and as many rows as the spacing between the shelves will accommodate.

Scoops (10) are attached to the kiln wall at the exit end of the kiln to remove heavier coke that may have deposited on the bottom of the kiln. The scoops are pipe sections with one end closed, and the other end cut on a slant, to allow any organic vapours to escape before the coke falls into the hopper (11). The scoops are sized small enough so that the metal plates cannot enter with the coke. As the reactor rotates, the scoops turn upside down and dump their load of coke into a hopper mounted on the solids exit tube (12). To ensure that none of the plates block the coke exit from the reactor, the hopper has a metal grid (13) that will deflect any plate towards the bottom of the kiln. The solids exit tube (12) has a screw conveyor (15) to push the coke out of the reactor. The solids exit tube can be above the vapour exit tube (14), within the vapour exit tube, below the vapour exit, or even at separate ends. There must be at least two exits from the kiln to ensure that the reactor exit is never obstructed. In normal operation, the coke will exit the reactor mostly through the vapour exit (14). The scoops are required when the feed to the kiln is interrupted and there is no vapour to carry the coke out, or when there is a surplus of coke, or the coke is wet with organic vapours.

The reactor is an indirectly fired rotating kiln, heated by the burner (5), and containing a charge of metal plates that carry the heat from the reactor walls and provide a hot surface where the reactions take place. The plates are lifted and kept against the reactor walls by one or more shelves, wide enough to hold two plates. As the kiln rotates, the plates fall off the shelves, presenting the face that was against the reactor wall to the organic liquid spray. The metal plates protect the reactor walls from thermal shock, and scrape the walls and each other clean of coke. The shelves are attached to the reactor walls with clamps to reduce stress due to differential thermal expansion between the reactor walls and the shelves. Both the plates and shelves increase the heat transfer area from the heat source to the reaction site.

In the test apparatus, MSW mixed with used oil or other oils are sprayed into a horizontal or slanted rotating kiln 10' in diameter and 8' long in order to thermally crack and vaporize the organic liquid feed or the chemicals within it. The kiln has 4" fins welded in continuous spirals, 8" apart, to the inside of the kiln walls. A 1" wide shelf is attached to the fins, and a charge of 4" equilateral triangular metal plates is added.

As the kiln rotates, the shelf pushes and raises the blades along the reactor wall. As they reach just past the 5' height, they flip as they fall at the top of their run, presenting their hot side to the organic liquid being sprayed on them.

Upon contact with the hot plates, the organic liquid is thermally cracked and/or vaporized. The coke formed is either entrained with the vapours out of the kiln or it deposits on the plates. The plates, sliding against the reactor wall or on each other, scrape the coke free, and it is entrained out of the reactor with the vapours. Most of the coke exits the reactor with the organic vapours, the residual coke is removed by the scoops, hopper and solids exit.

Four scoops are welded to the reactor wall at the exit end. They are made from 4" piping, 6" long, with one end plugged, and the other end cut on a slant. A hopper protected by a metal cage above it, receives the coke dumped by the scoops. The cage deflects any scooped up plate back into the reactor. The hopper receives the coke and drops it into the coke exit tube. A screw conveyor, on the bottom of the coke exit tube, carries the coke out of the reactor.

FIGS. 10, 12, 13 and 14 are illustrations of the apparatus adapted for different feedstocks.

Figure 10:
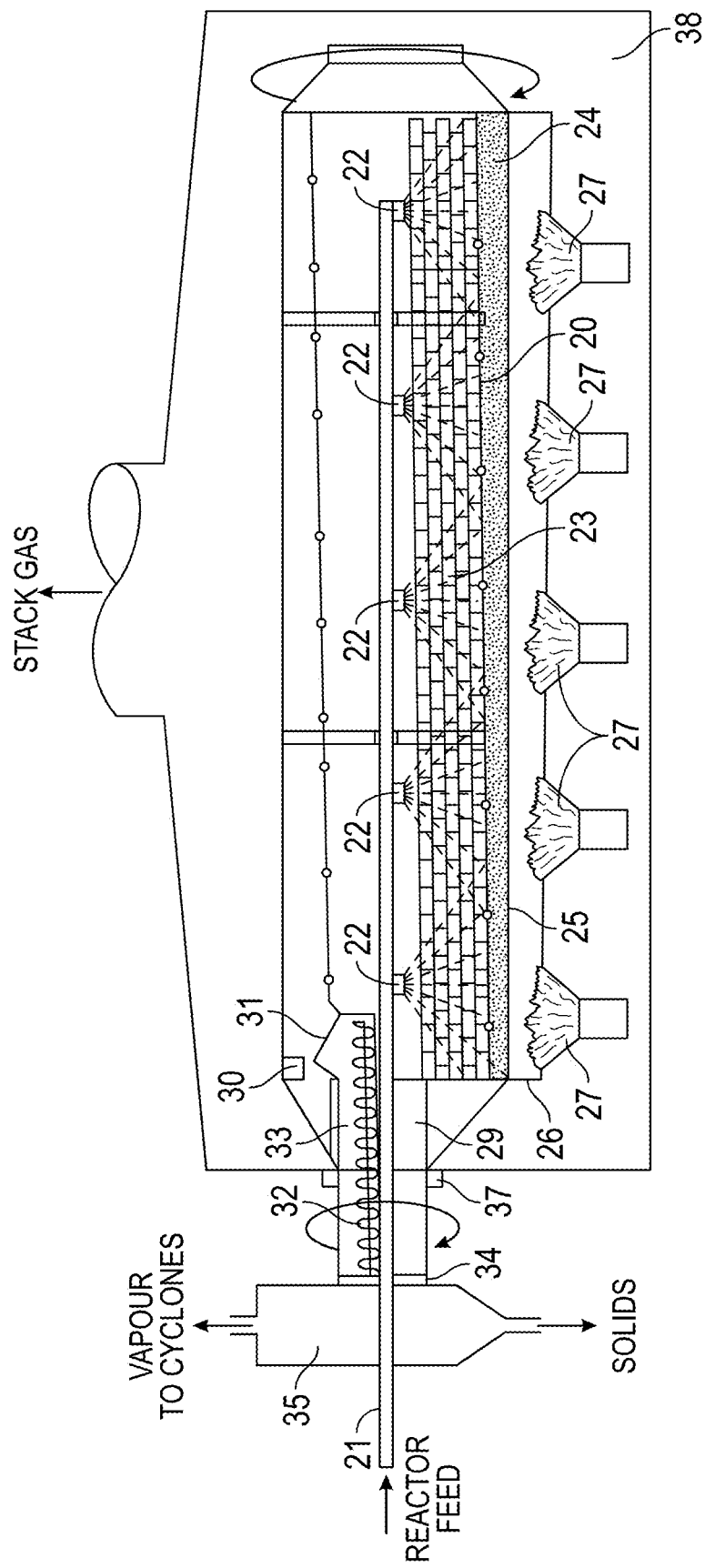
FIG. 10 is a cross section of a reactor, according to an embodiment of the invention, in the horizontal position and wherein the feeding of the material to be treated and the exit of the vapours and the solids produced are both on the left side of the reactor.

FIG. 10 shows a vertical cross section of a reactor in the horizontal position. The reactor actually has four shelves, but only two are shown here (20). The other two shelves would be on the section not shown. The feed enters the reactor in pipe (21), and is projected unto the hot plates (23) by spray nozzles (22). A possible feed for this reactor would be an organic liquid such as MSW mixed waste oils.

Figure 10A:
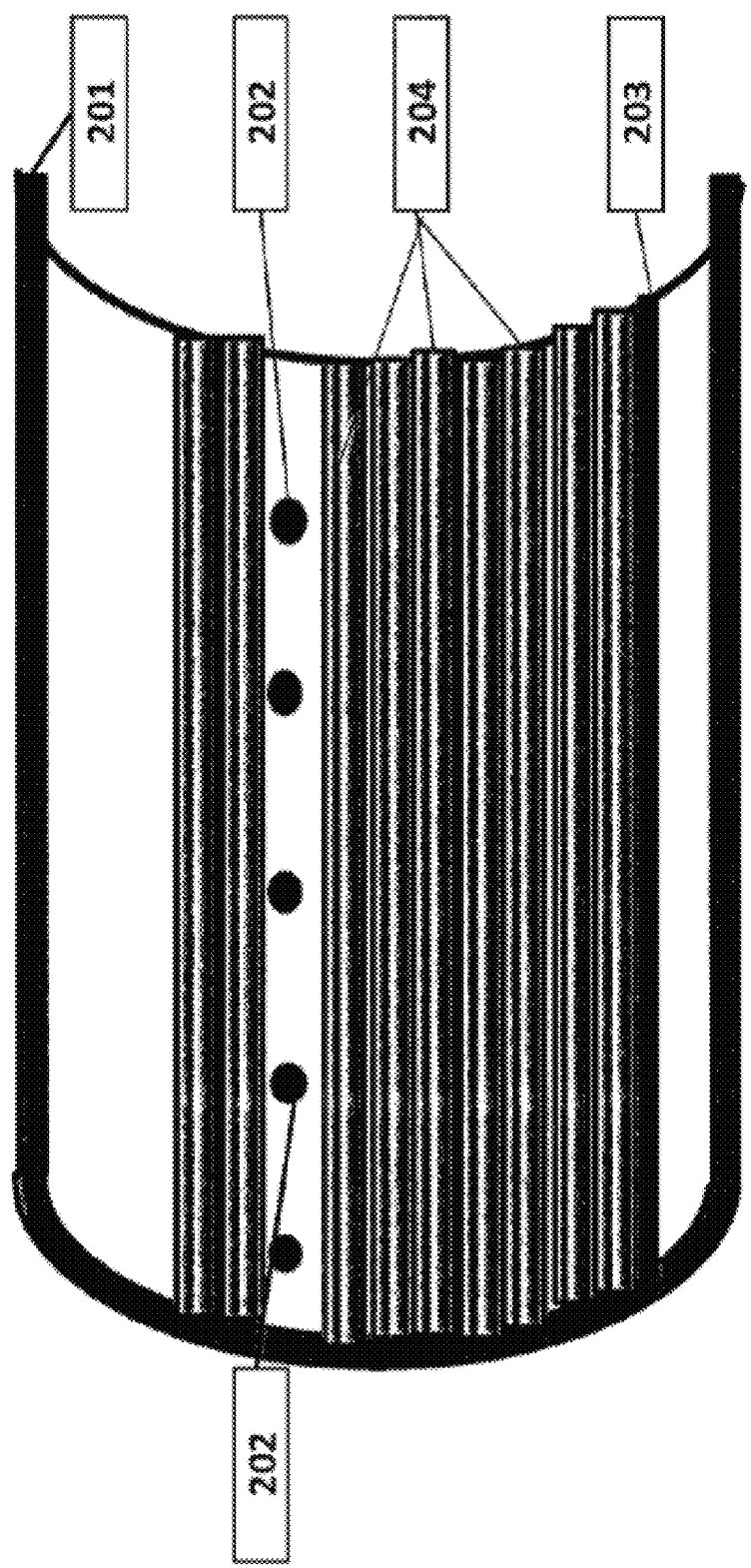
FIG. 10A is also a vertical cross section (201) of the same reactor as in FIG. 10 with the exception that two of the shelves (203) are replaced with a row of stoppers, dowels or protuberances (202) that support and lift the plates (204). The rows of stoppers serve the same functions as the shelves: they lift the plates, keeping them against the reactor wall.

FIG. 10A is also a vertical cross section (201) of the same reactor as in FIG. 10 with the exception that two of the shelves (203) are replaced with a row of stoppers, dowels or protuberances (202) that support and lift the plates (204). The rows of stoppers serve the same functions as the shelves: they lift the plates, keeping them against the reactor wall.

In a preferred embodiment of the invention, a sweep gas, such as steam or nitrogen, is injected into the reactor, either with the organic liquid feed in the reactor feed pipe (21) and the spray nozzles (22), or through a secondary feed line (not shown).

The plates are lifted from the plate bed (24) by the shelves (20). In this illustration, the reactor (25) is supported by two horizontal cylinders (26) and is heated externally with gas or naphtha burners (27). The reactor rotates inside a heating chamber, which is stationary (38). There are various options for the heating chamber. It could be a section of a hot stack, where the stack gas needs to be cooled before clean-up, for example. A seal (37) is shown around the rotating kiln and the stationary wall of the heating chamber. It is useful to keep the feed pipe in place with support rings (28), as illustrated on FIG. 11. The gas and entrained coke leave the reactor through the gas exit pipe (29). Accumulated solid coke is scooped up by shovels (30), is dumped into a hopper (31), and is carried out of the reactor with the help of a screw conveyor (32) inside the solids exit pipe (33). There is a seal (34) between the rotating reactor and the product exit box (35). The product exit box is stationary. A first separation of solids and vapours occurs in the product exit box (35).

Figure 11A:
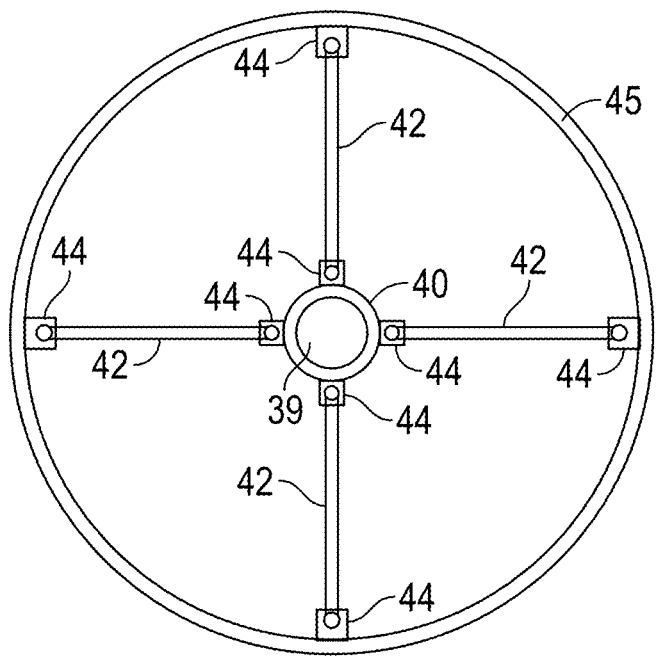
FIG. 11A is a cross view of a first embodiment of the center ring supports for the feed line inside a cylindrical reactor of the invention.
Figure 11B:
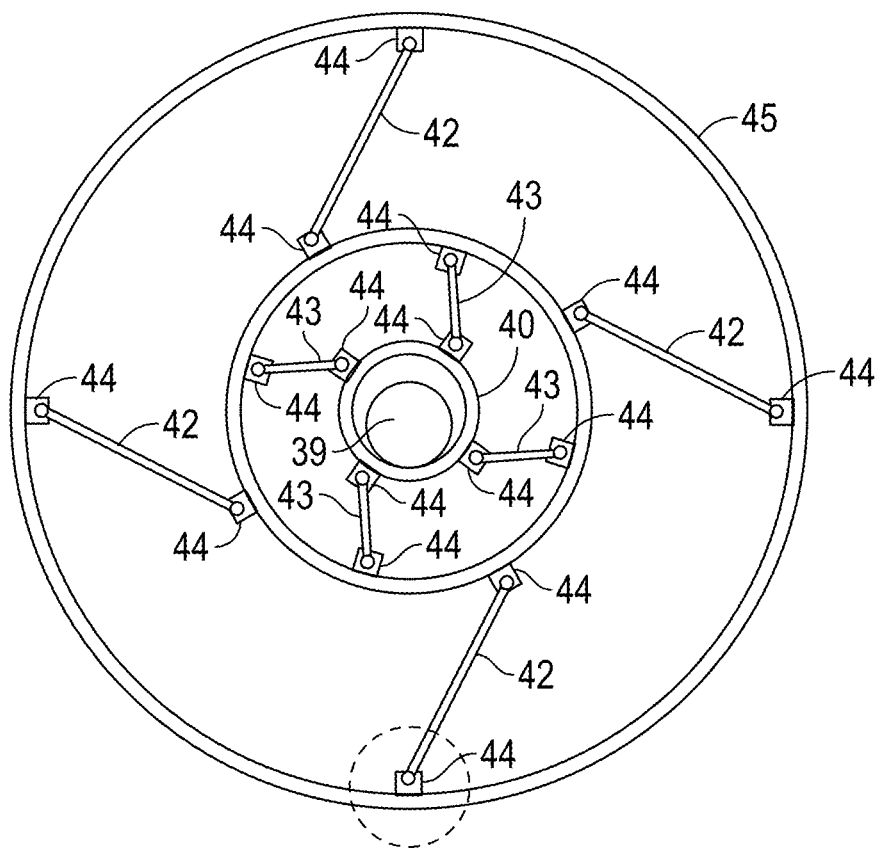
FIG. 11B is a cross view of a second embodiment of the center ring supports for the feed line inside a cylindrical reactor of the invention.
Figure 11C:
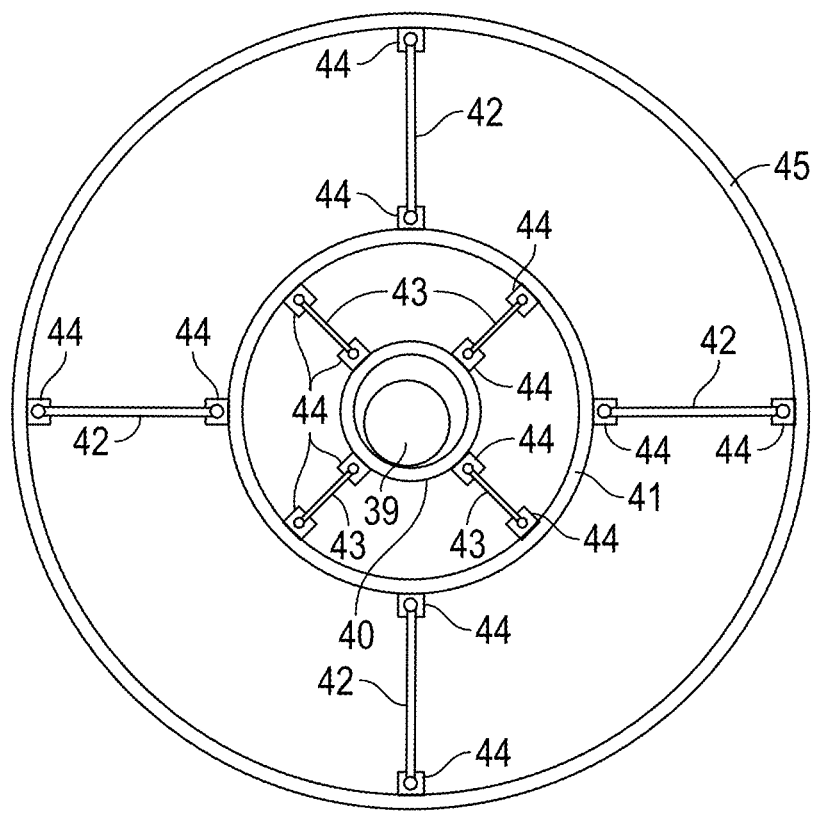
FIG. 11C is a cross view of a third embodiment of the center ring supports for the feed line inside a cylindrical reactor of the invention, when the reactor is heated.
Figure 11D:
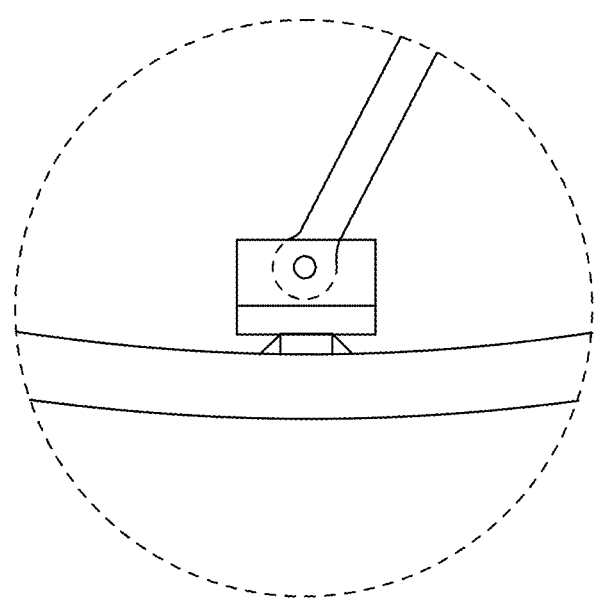
FIG. 11D is a detailed perspective view of the attachments means of the invention that allows the support beams to expand and rotate at their junction points with the reactor walls and rings, when the reactor is heated.

FIGS. 11A and 11B are two cases of center ring supports for the feed line (39), shown when the reactor is cool. FIG. 11C is the support rings in FIG. 11B when the reactor is hot. FIG. 11A is for a smaller reactor radius with only one centre ring (40). FIG. 11B is for a larger reactor radius, for which two centre rings (40) and (41) are required to avoid deforming the support legs (42). In FIGS. 11B and C there are two sets of support legs: The first (42) hold the larger centre ring (41) in place. The second set of support legs hold the smaller centre ring (40) in place. The smaller centre ring supports the reactor feed pipe (39). The support legs (42) and (43) are attached to the reactor wall (45) and/or centre rings with brackets (44) that permit and/or allow the support beams to expand and rotate at their junction points with the reactor walls and rings.

Figure 12:
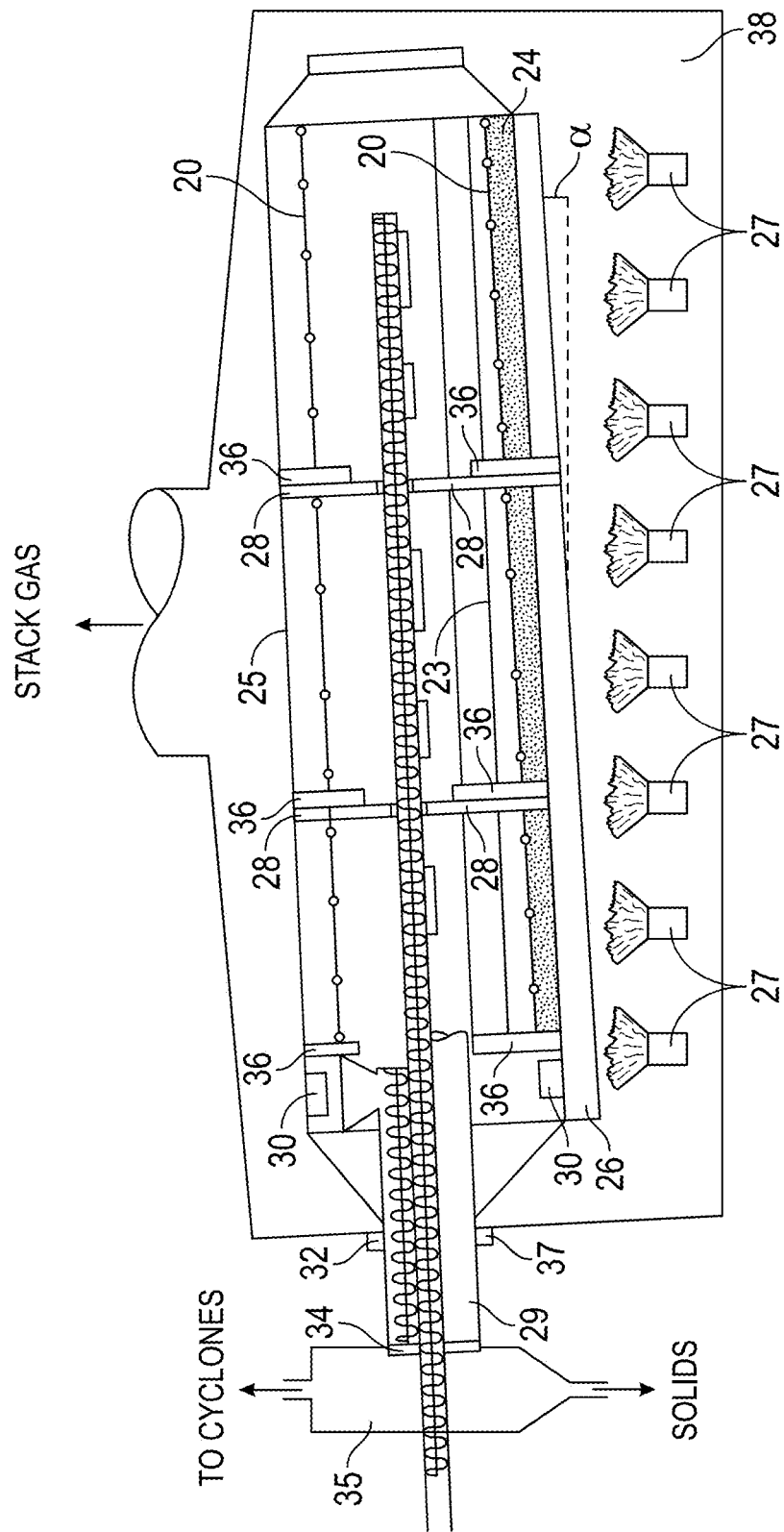
FIG. 12 is vertical cross section of reactor according to an embodiment of the invention in a slanted position.

FIG. 12 shows a vertical cross section of a reactor in the slanted position, about 5° from the horizontal in this illustration. This reactor would be used for feedstocks that contain solids such as sand. The reactor actually has four shelves, but only two are shown here (20). The other two shelves would be on the section not shown. The feed enters the reactor in pipe (21), it is pushed along the feed line with a screw conveyor and is projected unto the hot plates (23) by nozzles, holes and/or slits (22). The plates (23) are rectangular and are about as long as the reactor section where they are installed. The plates are lifted from the plate bed (24) by the shelves (20). In this illustration, the reactor (25) is supported by two slanted cylinders (26) and is heated externally with gas or naphtha burners (27). The reactor rotates inside a heating chamber, which is stationary (38). A seal (37) is shown around the rotating kiln and the stationary wall of the heating chamber. The gas and entrained coke leave the reactor through the gas exit pipe (29). The solids that are too heavy to be entrained out of the reactor by the gas, slide long the reactor floor, through the screen (36), and are scooped up by the scoops (30). Accumulated solids are scooped up, along with residual coke, by shovels (30), are dumped into a hopper (31), and are carried out of the reactor with the help of a screw conveyor (32) inside the solids exit pipe (33). There is a seal (34) between the rotating reactor and the product exit box (35). The product exit box is stationary. A first separation of solids and vapours occurs in the product exit box (35).

Figure 13A:
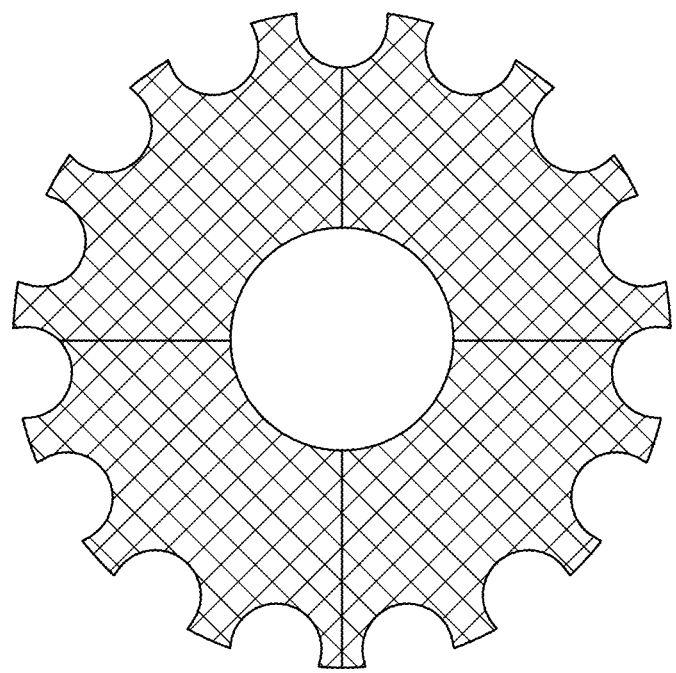
FIG. 13A is a front view of a screen made of wire mesh.
Figure 13B:
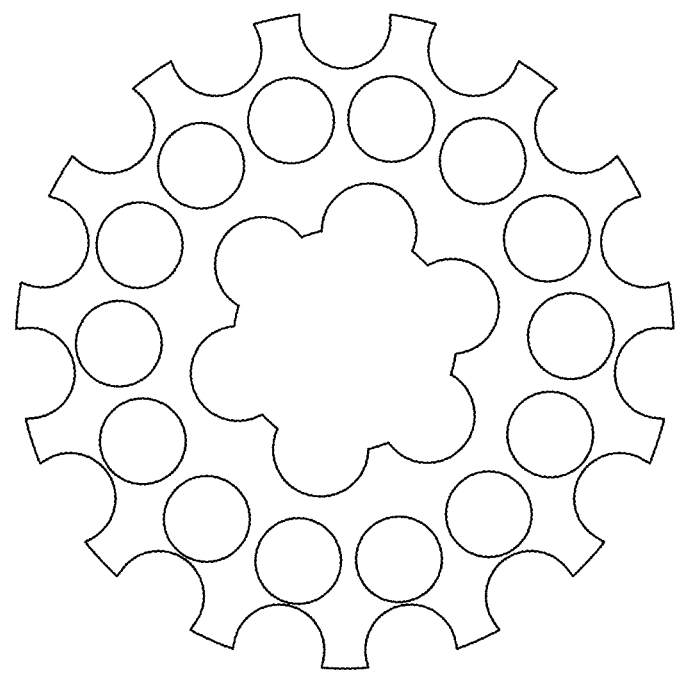
FIG. 13B is a front view of a screen made of a perforated disc.
Figure 14:
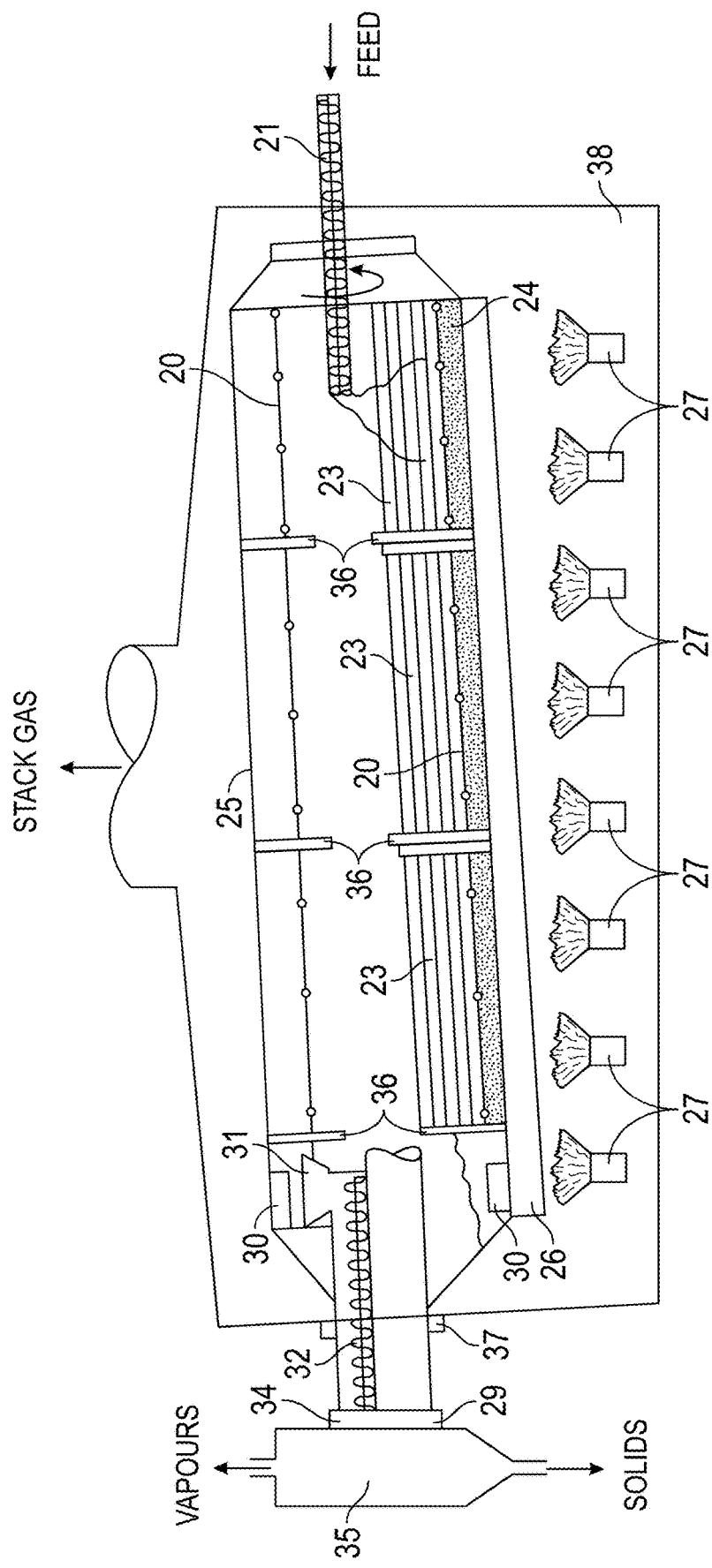
FIG. 14 is a vertical cross section of a reactor according to an embodiment of the invention in a slanted position wherein the feeding of the material to be treated and the exit of the thereby obtained vapours and solids are on opposite side of the reactor.
Figure 15A:
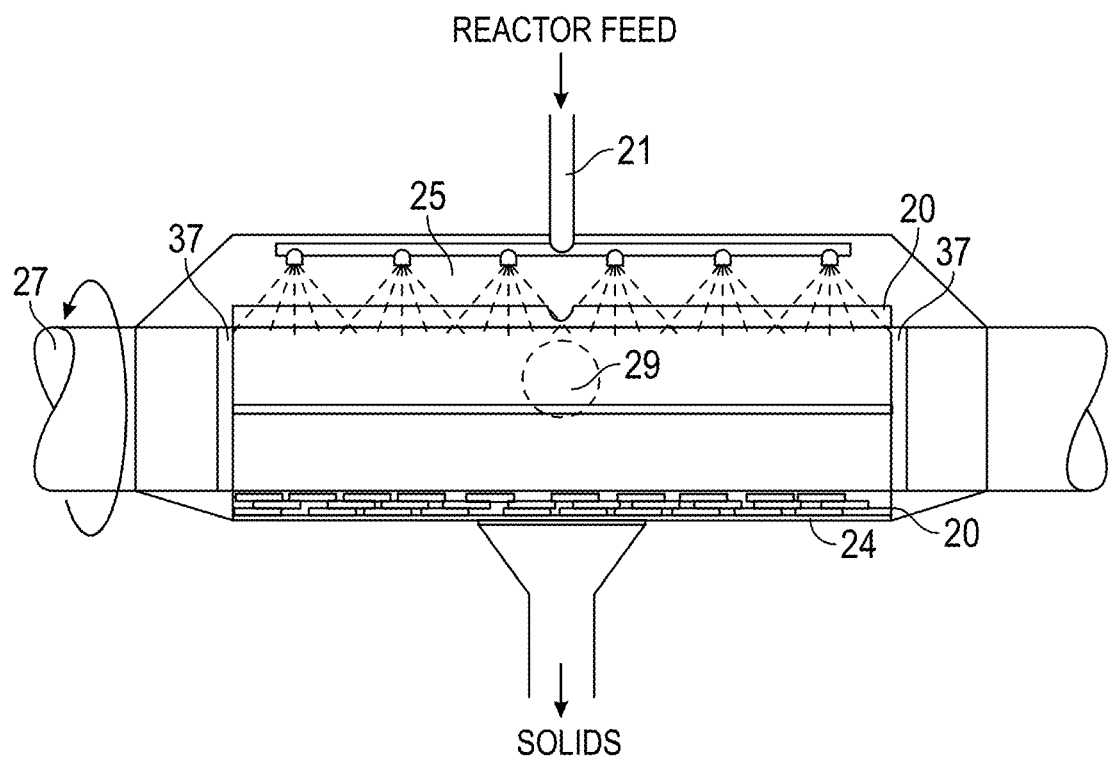
FIGS. 15A and 15B are a further alternate embodiment of the rotating reactor of the invention wherein heating is performed inside the reactor.
Figure 15B:
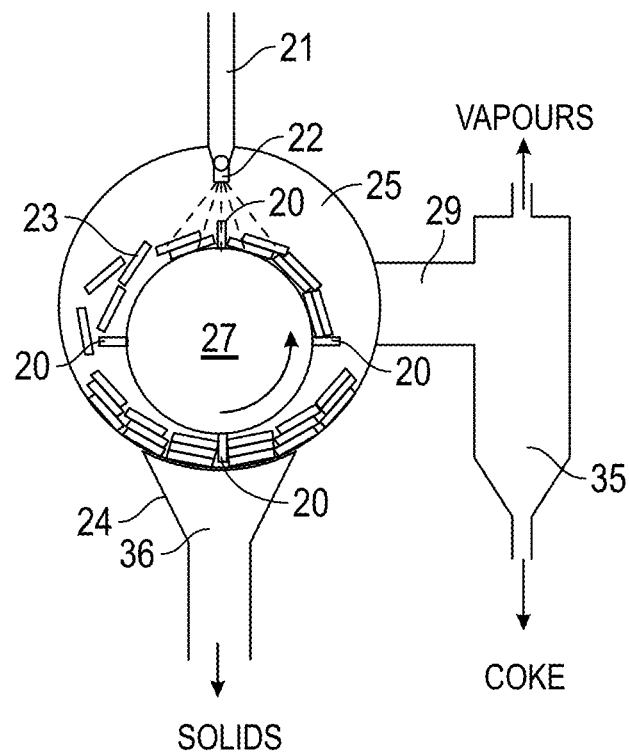

FIG. 13 shows two possible configurations for the screens (36) in FIGS. 12 and 14. FIG. 13A is a screen made of wire mesh. FIG. 13B is a screen made of a perforated disc. Both screens are tacked on to the reactor wall. Their outer circumferences are scalloped, allowing for different thermal expansions of the reactor walls and the screens with minimal stress on the reactor walls. Both configurations permit both the vapours and the solids to travel practically unimpeded from one end of the reactor to the other. The perforations are calculated so as to avoid movement of the plates from one section to the other. Also, the perforations must be too small for the ends of the plates to enter. The screens will be scraped clean by the plates, as the reactor turns.

FIG. 14 is a vertical cross section of a reactor in the slanted position, about 5° from the horizontal is illustrated here.

This reactor would be used for feedstocks that contain solids such as sand.

The reactor actually has four shelves, but only two are shown here (20). The other two shelves would be on the section not shown. The feed enters the reactor in pipe (21), it is pushed along the feed line with a screw conveyor and is projected unto the hot plates (23) through the end of the pipe or slits in the pipe (22).

The plates (23) are rectangular and are about as long as the reactor section where they are installed when the reactor is heated. The plates are lifted from the plate bed (24) by the shelves (20). In this illustration, the reactor (25) is supported by two slanted cylinders (26) and is heated externally with gas or naphtha burners (27). The reactor rotates inside a heating chamber, which is stationary (38). A seal (37) is shown around the rotating kiln and the stationary wall of the heating chamber. The gas and entrained coke leave the reactor through the gas exit pipe (29). The solids that are too heavy to be entrained out of the reactor by the gas, slide long the reactor floor, through the screens (36), and are scooped up by the scoops (30). Accumulated solids are scooped up, along with residual coke, by shovels (30), are dumped into a hopper (31), and are carried out of the reactor with the help of a screw conveyor (32) inside the solids exit pipe (33). There is a seal (34) between the rotating reactor and the product exit box (35).

The product exit box is stationary. A first separation of solids and vapours occurs in the product exit box (35).

Figure 16:
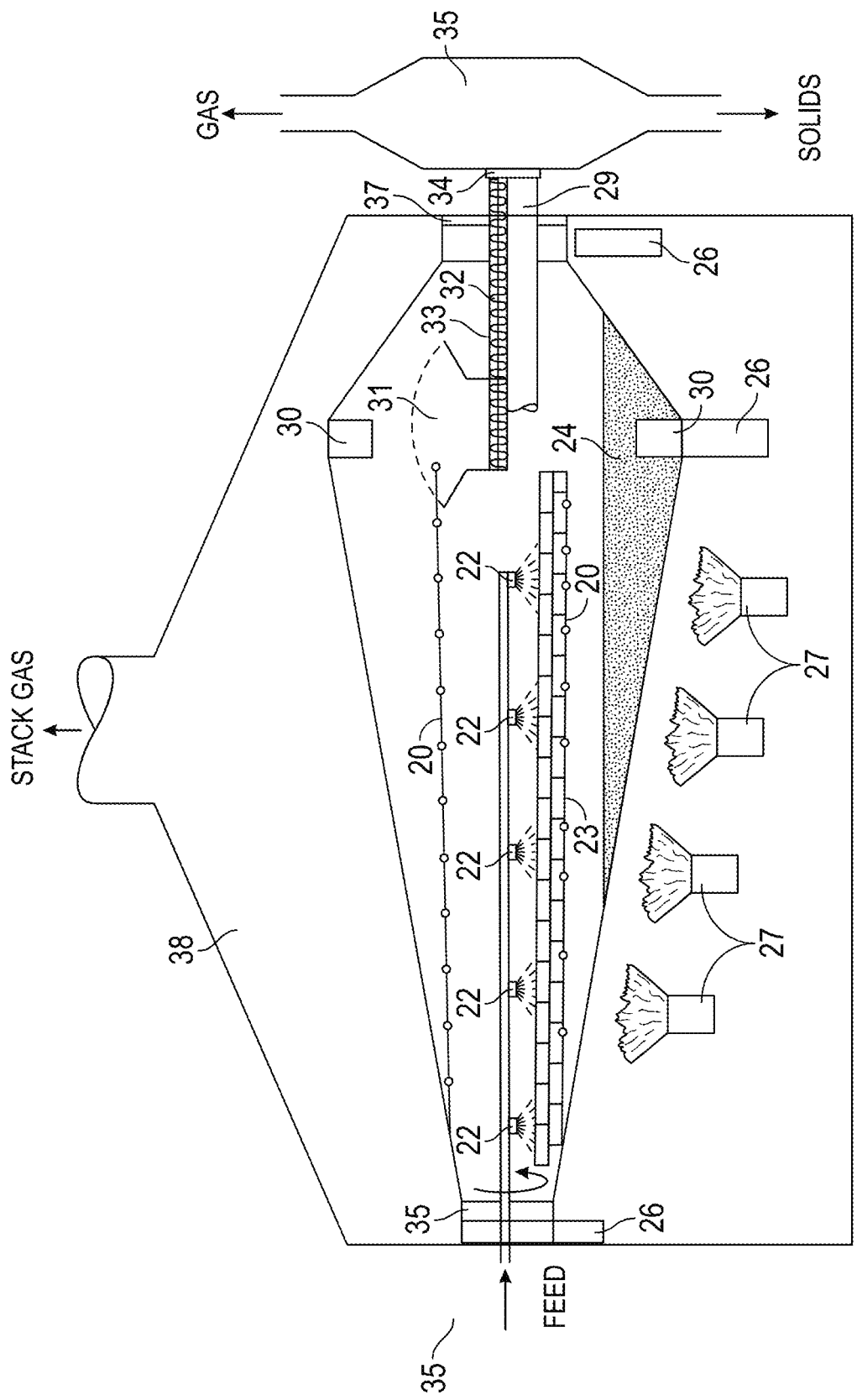
FIG. 16 is a vertical cross section of a reactor of the invention made up of two cones joined at the base.

FIG. 16 shows a vertical cross section of a reactor made up of two cones joined at the base.

This shape of reactor allows the plates to slide back towards the entrance and scrape the walls, other plates and the shelves clean of coke and other deposited solids.

Figure 17:
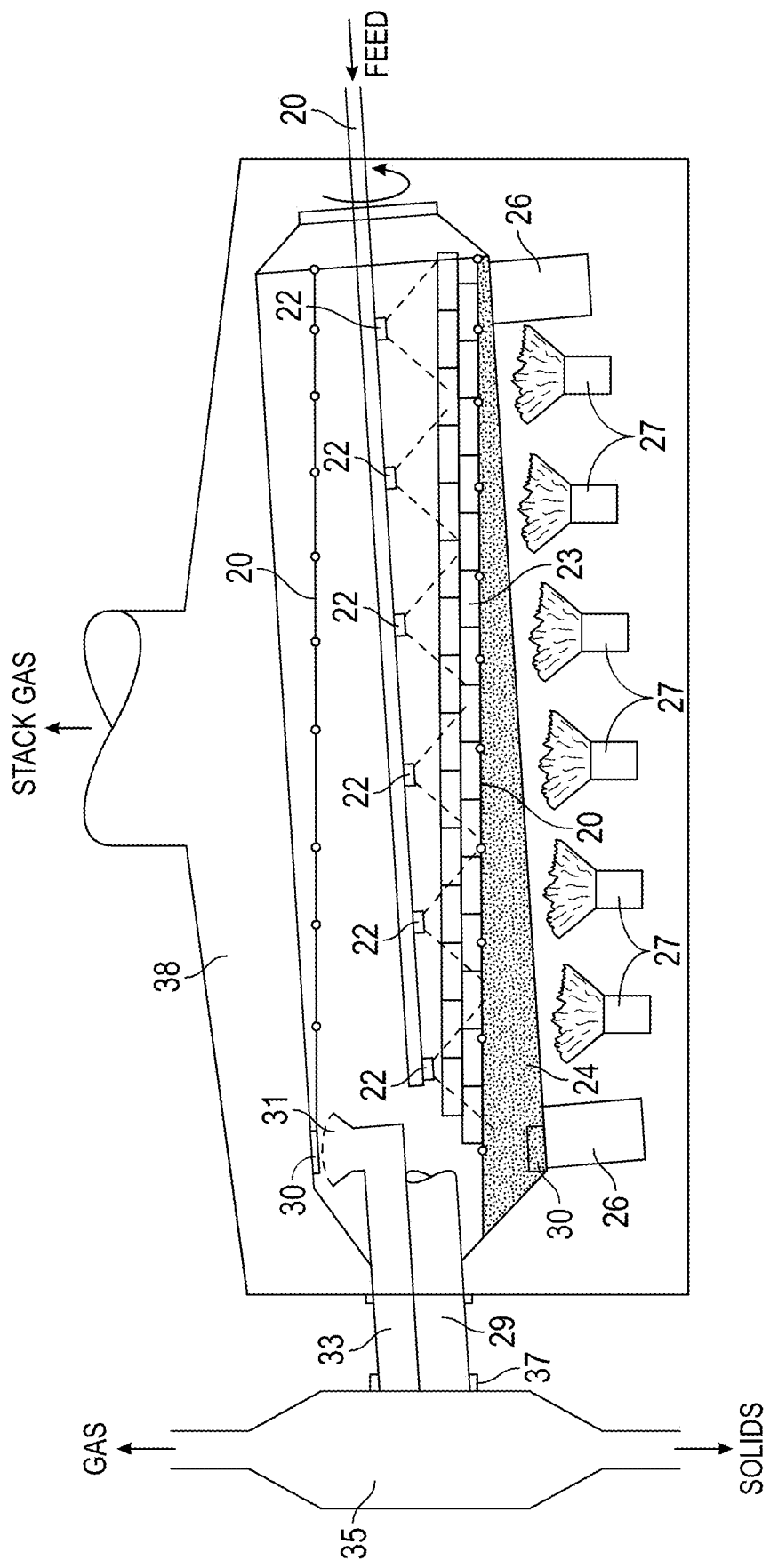
FIG. 17 is a vertical cross section of a reactor of the invention in a slanted position with a configuration particularly suited for treating dirtier feedstocks that may produce more solids or more cokes or contain sand/or contaminated soils.
Figure 18:
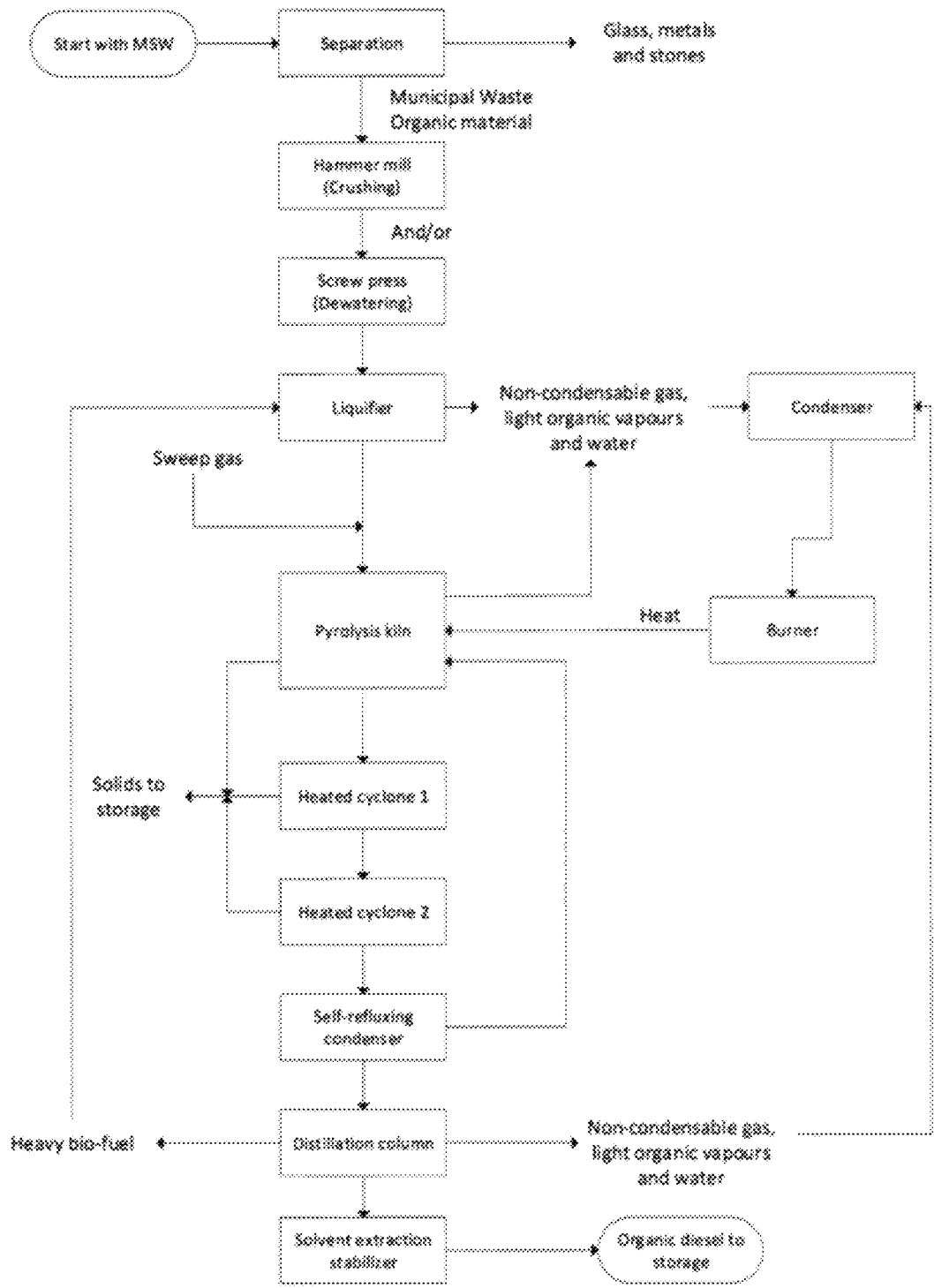
FIG. 18 is a simplified flow diagram illustrating a second embodiment of the process according to the present invention in which a screw press is used instead of a dryer and pulveriser, as present in the embodiment in FIG. 1.
Figure 19:
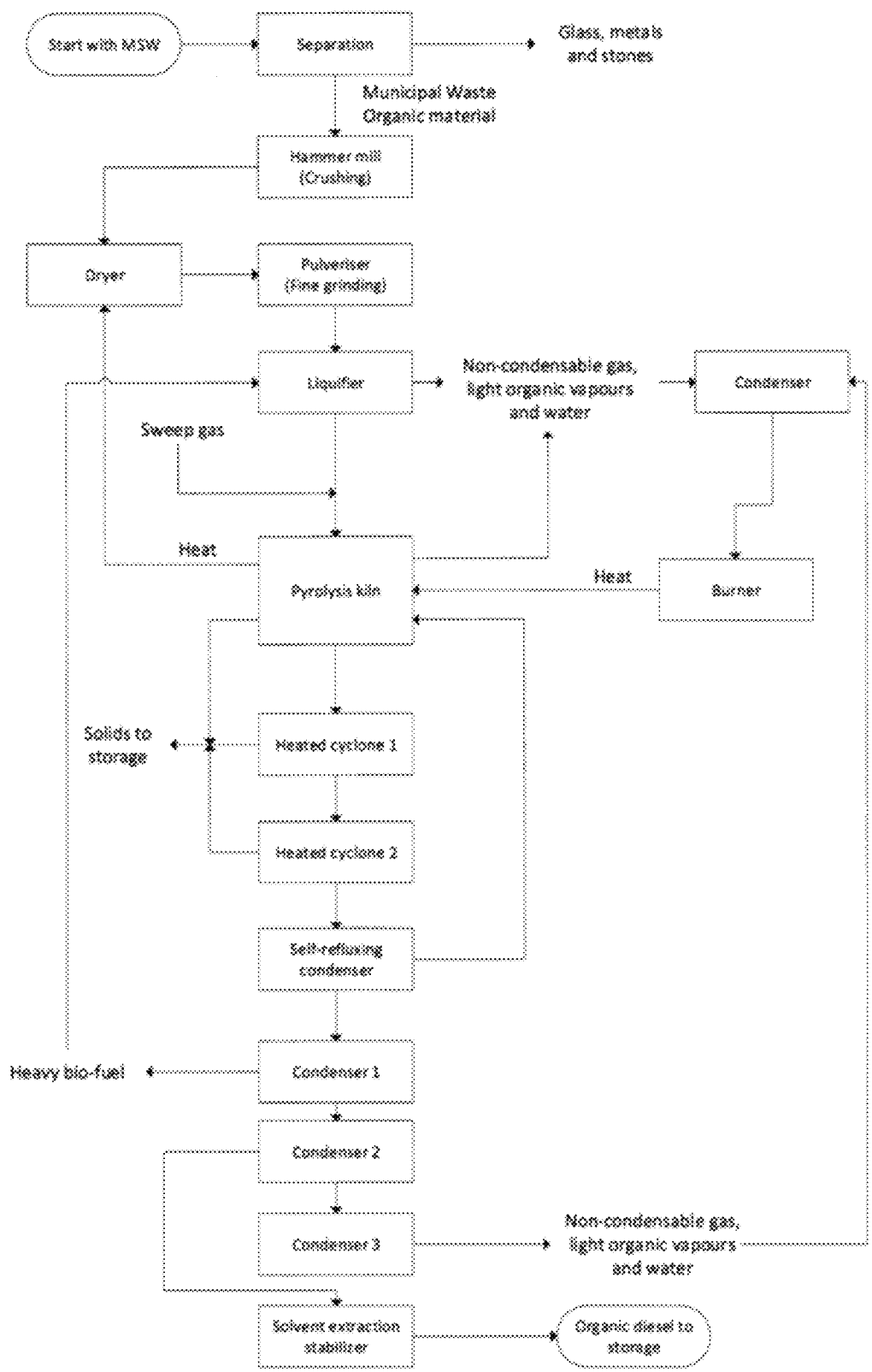
FIG. 19 is a simplified flow diagram illustrating a third embodiment of the process according to the present invention in which three condensers are used instead of a distillation column, as present in the embodiment in FIG. 1.
Figure 20:
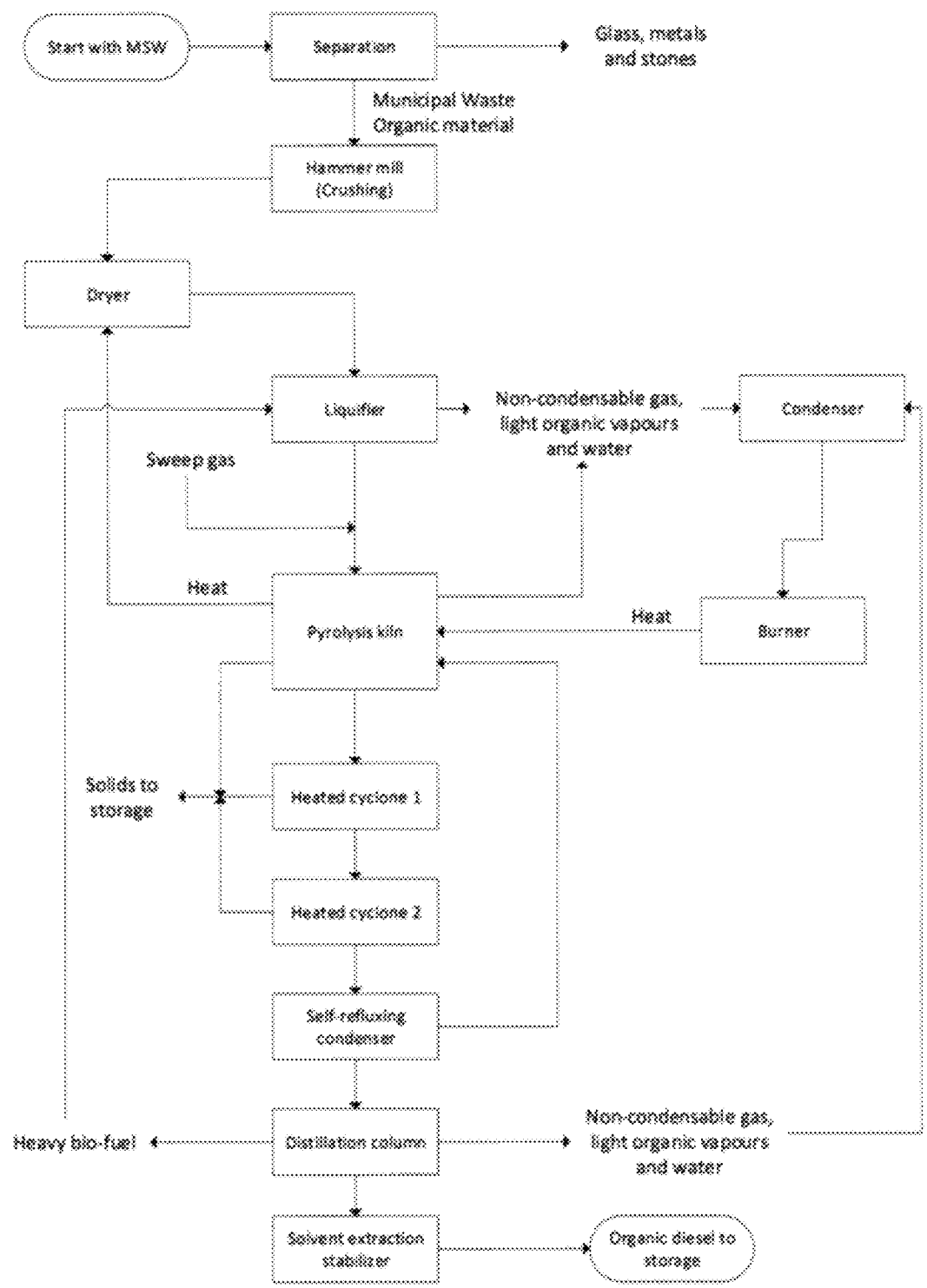
FIG. 20 is a simplified flow diagram illustrating a fourth embodiment of the process according to the present invention in which the pulverising step, as present in the embodiment in FIG. 1, is skipped.
Figure 21:
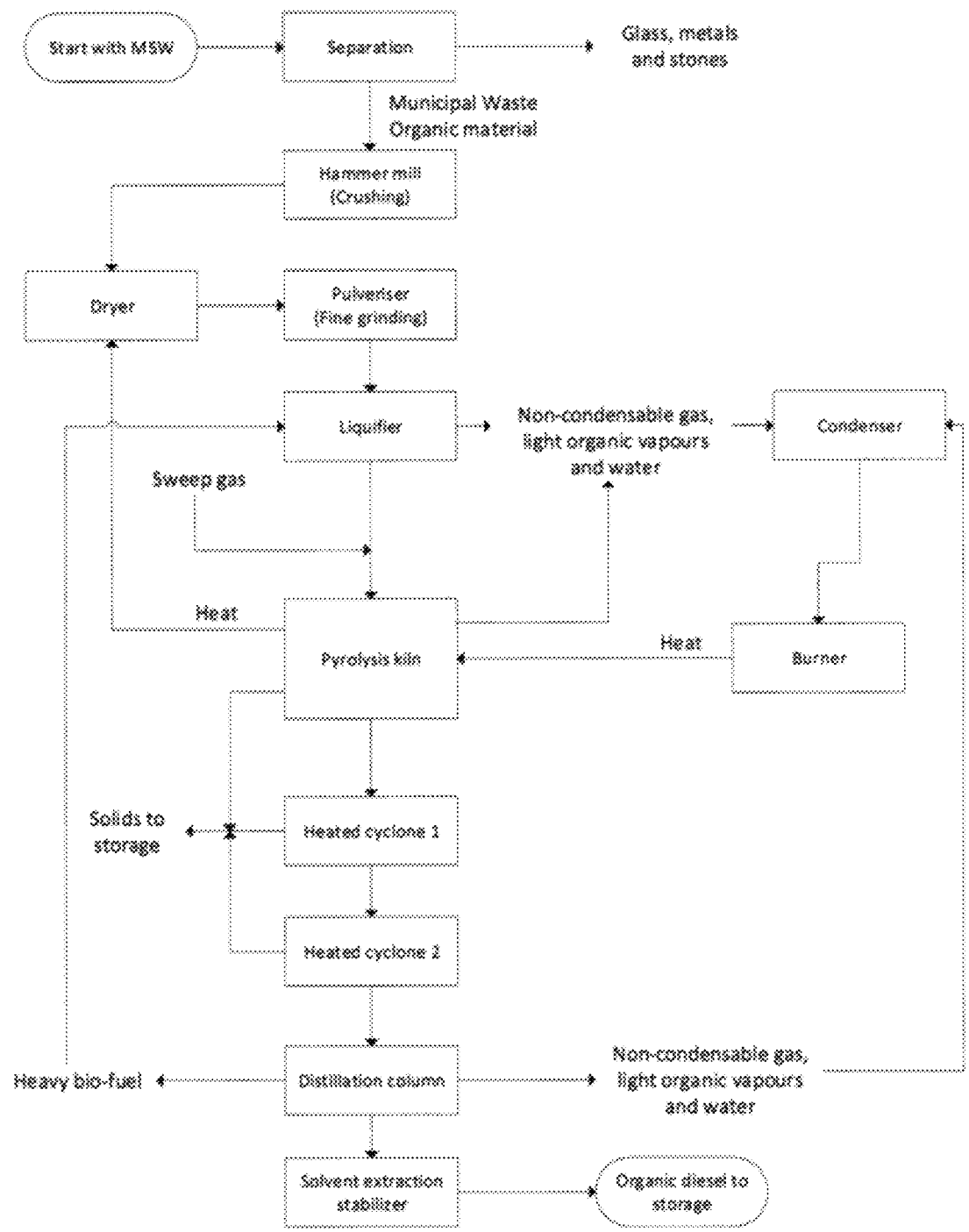
FIG. 21 is a simplified flow diagram illustrating a fifth embodiment of the process according to the present invention in which the self-refluxing condenser, as present in the embodiment in FIG. 1, is skipped.
Figure 22:
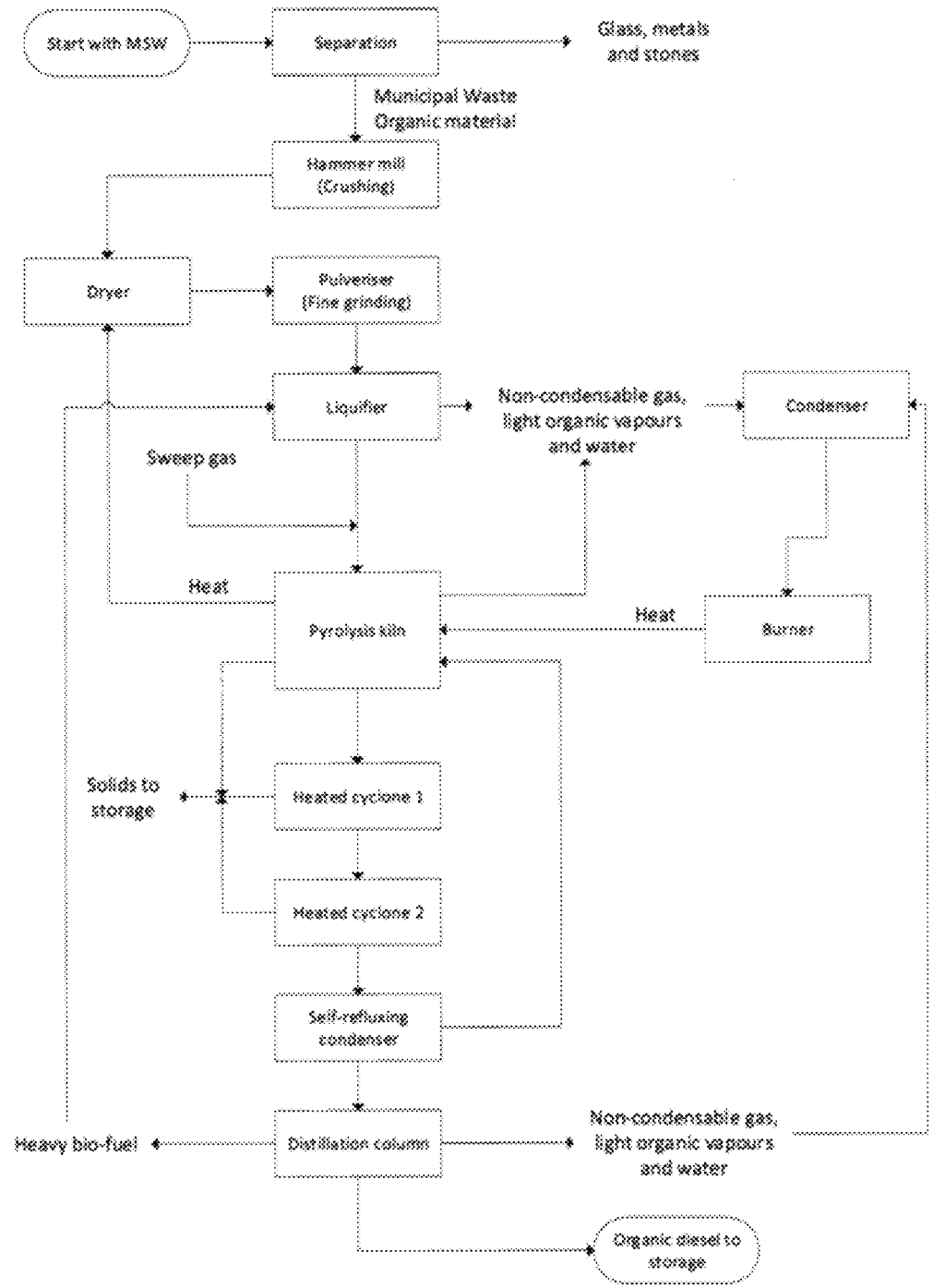
FIG. 22 is a simplified flow diagram illustrating a sixth embodiment of the process according to the present invention in which the stabilization step, as present in the embodiment in FIG. 1, is skipped.
Figure 23:
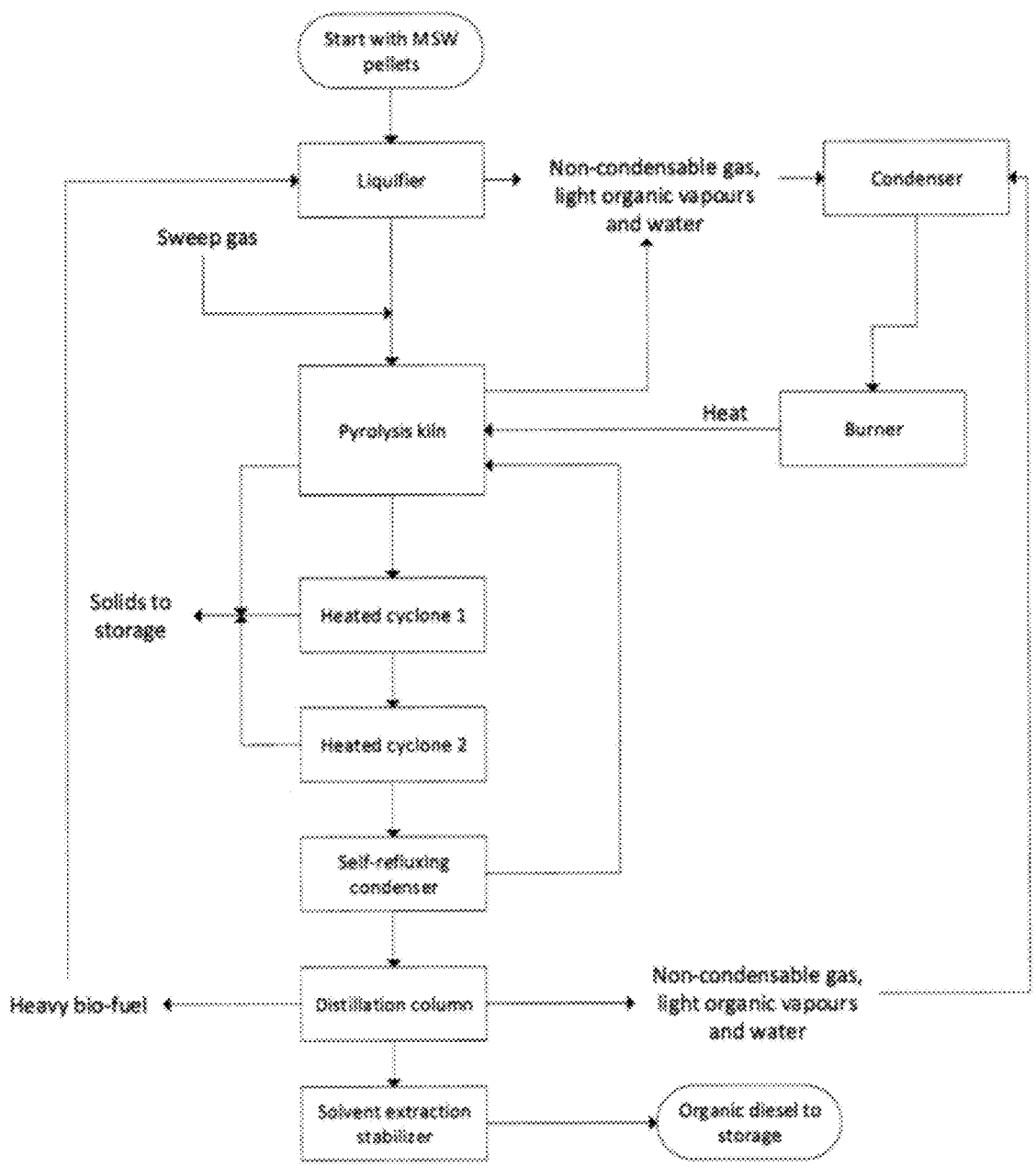
FIG. 23 is a simplified flow diagram illustrating a seventh embodiment of the process according to the present invention in which the starting material is already in the form of pellets, instead of raw MSW as present in the embodiment in FIG. 1.
Figure 24:
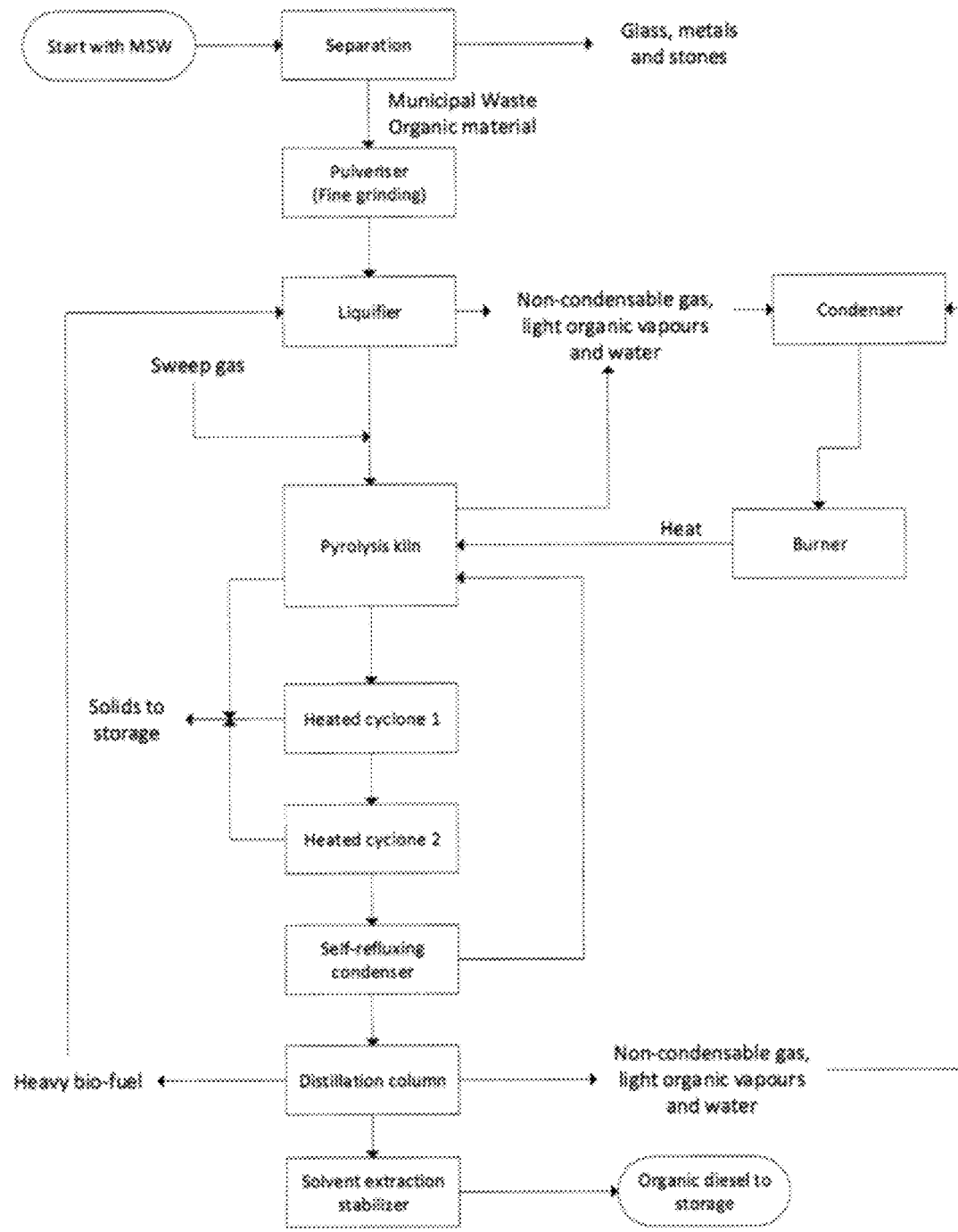
FIG. 24 is a simplified flow diagram illustrating an eighth embodiment of the process according to the present invention in which the starting material is finely grinded in a pulveriser directly after the separation step and before being fed into the liquifier.
Figure 25:
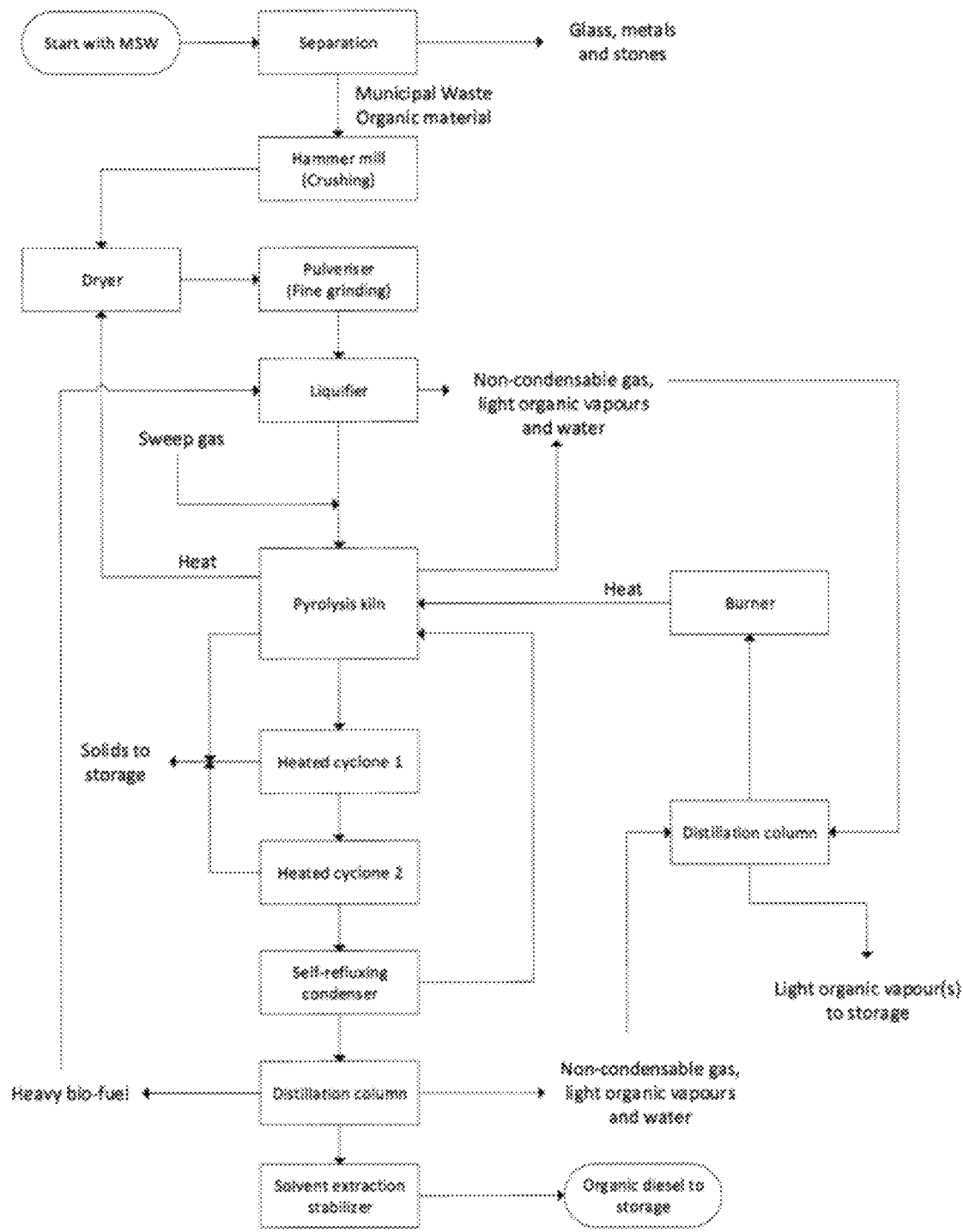
FIG. 25 is a simplified flow diagram illustrating a ninth embodiment of the process according to the present invention in which at least one of the light organic vapours produced during the pyrolysis process and recuperated in the first distillation column are recovered in a second distillation column and sent to storage.

FIG. 17 represents a vertical cross section of a reactor in the slanted position, about 5° from the horizontal is illustrated here. This reactor would be used for heavy oils feedstocks that may produce more coke or contain sand or contaminated soils.

Example 1—Treatment of Feed Material with High CCR

The feedstock is 20 tons per day of vacuum tower asphalt extender (VTAE), having a specific gravity of 0.95 and containing 6% wt. metals. The material is fed into the liquefaction vessel and brought to temperature of 300° C. No material exits through self-refluxing condenser at this stage.

The heated VTAE is pumped into the rotating drum, equipped with 12 sections delimited by punctured separators having four holes each, along with 5% wt. superheated steam. The shelves in the reactor consist of long rectangular shelves, similar to shelf 4 which can be viewed in FIG. 41. The product is sprayed onto the plates. As the system turns the 10% wt. solids formed during pyrolysis reactions and/or fed into the reactor keep accumulating, as the transfer of the solids between the sections is not moving to the shovels fast enough. This is because of the polarized properties of the solid materials, which causes them to stick to surfaces. After a while, the sprays hit the accumulated solids and do not crack immediately. This increases the quantity of solids in the reactor and the system does not work properly.

By eliminating the separators, and replacing the shelves with shelves consisting of a series of shelf is which can be viewed in FIG. 38, the 10% wt. solids are taken out through the use of the shovels, and the products obtained are 60% wt. diesel, 15% wt. heavy fuel, 4% wt. water, and 11% wt. gas and incondensable.

Example 2

The feedstock is a 40 ton mixture of recycled material obtained from MSW per day, such as plastics mixed with some other organic material. This feedstock is comprised of plastics mixed with dirt and cellulose, having a composition of about 72% wt. mixed plastics, 20% wt. cellulose, 4% wt. water and the balance being various other materials such as dirt and organics that could not be separated.

The mixture is shredded in an industrial shredding machine and then pulverized in a pulverizer machine to obtain particles having dimensions of an average of 3 mm. The pulverized material is then put in the liquifier, where it is brought to a temperature of 260 degrees Celsius. The water and some gases from some of the cracking of some plastics and/or other material exits through the self-refluxing condenser in the liquifier. Approximately 8% wt. of the material is taken in that step, most of it being water and gas and naphtha.

The rest of the mixture is pumped into the rotating drum, equipped with 12 sections delimited by punctured separators having four holes each, along with 4% wt. superheated steam. The shelves in the reactor consist of long rectangular shelves, similar to shelf 4 which can be viewed in FIG. 41. The product is sprayed onto the plates. As the system turns the 6% wt. solids formed during pyrolysis reactions and/or fed into the reactor keep accumulating, as the transfer of the solids between the sections is not moving to the shovels fast enough. This is because of the polarized properties of the solid materials, which causes them to stick to surfaces. After a while, the sprays hit the accumulated solids and do not crack immediately. This increases the quantity of solids in the reactor and the system does not work properly.

By eliminating the separators, and replacing the shelves with shelves consisting of a series of shelf is which can be viewed in FIG. 38, the 6% wt. solids are taken out through the use of the shovels, and the products obtained are 51% wt. diesel, 20% wt. heavy fuel, 4% wt. water, and 11% wt. gas and incondensable, the balance being what ever water and light products removed in the liquefaction vessel.

Advantages of the Process of the Invention

This process allows producing liquid fuels even from mainly organic material, and/or even from feeding material having a initial composition resulting during pyrolysis in a significant high amount of coke and/or solids.

This advantageous result is possible due to (a) specific preparatory treatment(s), particularly in the case wherein the feeding material contains important amount of solid materials and/or an important water content.

This advantageous result is also possible due to the specific internal configuration of rotating kilns and/or apparatus used for performing processes/pyrolysis.

This is a simple process that can treat a wide variety of waste oils and/or other organic material and make useful and environmentally friendly products.

This process is in energy equilibrium. When used lubricating oils are processed, the produced gas and naphtha are consumed on site, and there is little or no need to purchase fuel, or to use the more valuable wide range diesel or heavy oil products from the plant. There is also no naphtha to dispose of.

The sulphur and metals, released in the cracking reactions, are mostly attached to the coke when exiting the reactor. The coke is removed from the vapour oil stream as it leaves the reactor. Therefore the sulphur and metals are not present when the oil is condensed into liquid fuels. A rotating kiln under positive pressure is safer because there will be no oxygen ingress into the reactor, which, if left undetected, could result in an explosion. In the event of a leak, oily vapours would exit into the firebox and would burn in an environment designed to contain flames.

One of the safety features of this process is that there is no vessel containing large amounts of oil in this process. Residence times are low.

In summary some of the advantages of the new thermal processing apparatus include at least one of the followings:
- a steady and controllable reaction temperature;
- a specified product slate of consistent quality;
- a protection of the reactor wall from stress and failure due to thermal shock or hot spots;
- preventing coke from depositing and sticking on the reactor walls and internals;
- longer run times, shorter shut-downs, less maintenance cost;
- safer operation;
- no by-products to dispose of in industrial landfills;
- less need for the purchase of chemicals and disposal of spent chemicals;
- a steady and controllable reaction pressure, and
- minimizing of the thermal stress on the reactor walls and/or on the internals.

Advantages of the reactor operating under positive pressure:
- better control of pressure in the reactor;
- no air ingress into the reactor, combusting the flammable vapours within the reactor;
- less risk of an explosion;
- steadier flow of products out the reactor; and
- better control of cyclone operation.

Advantages of the use of a sweep gas, over the use of the new thermal apparatus alone:
- sweep gas injection stabilizes reactor operations. Both pressure and temperature are selected and kept in the range appropriate to a particular feedstock;
- the presence of sweep gas inside the reactor reduces the partial pressure of the organic reactor feed and/or the organic vapours, helping the vaporization of the lighter bio-oil and/or organic vapour components. This reduces the incidence of over-cracking, resulting in a more stable organic product slate;
- sweep gas helps in keeping the velocity of the vapours exiting the reactor, improving the separation of the solids from the reactor products;
- sweep gas injection effectively reduces organic vapours' residence time, thereby reducing the incidence of secondary reactions, and destabilization of the product gasoil and/or bio-oil; and
- sweep gas injection rates can compensate for variations in feedstock quantities.

Similarly, sweep gas injection allows the use of the same reactor to treat very different feedstocks from municipal waste to used lubricating oils to bunker. This, in turn, permits the treating of a wide variety of waste.

The injection of the sweep gas makes for safer reactor operations. In the event of a leak in the reactor or downstream equipment, the steam present acts as snuffing steam, reducing the risk of a fire from oil and/or bio-oil and/or combustible vapours above its auto-ignition temperature coming in contact with air. Nitrogen can also reduce the risk of a fire.

In the event of steam as sweep gas, injection of steam into the reactor can reduce or replace stripping steam injection in the product separation stage.

Sweep gas injected into the reactor feed line can change the flow patterns and prevent coking in the piping and plugging of either the feed line or feed nozzle. It reduces the viscosity of the organic liquid reactor feed, and contributes to the atomization of the organic liquid reactor feed droplets through the spray nozzles.

If introduced into the feed line at temperatures above that of the organic liquid feed into the reactor, it reduces the amount of heat that must be generated by the kiln.

Advantages of the Process:

Organic material thermal cracking process has many advantages over other organic material cracking or reuse processes:
- it is flexible and permits the treating of a wide variety of organic material;
- the sulphur and metals do not enter into the finished oil and/or bio-oil products;
- each liquid droplet entering the kiln takes the energy necessary to crack, but do not reach a temperature at which they will crack again;
- there is no liquid phase present in the kiln at any time during its operation, so the vapours produced are not wet, and thus do not readily pick up contaminants; and
- the vapours produced from pyrolysis do not travel through a thick film of solid and/or liquid, and thus do not readily pick up contaminants before exiting the kiln;
- there are no open vessels causing a bad odour; and
- the process is relatively quick and there are no long residence times.

In the cases wherein composition of the feeding material is about constant, the composition of the mixture exiting the rotating kiln may be about constant and/or easily managed.

Some embodiments of the invention may have only one of these advantages; some embodiments may several advantages and may have all of simultaneously.

The preliminary transformation of MSW in agglomerate allows preliminary transformation in remote area and efficient and efficient and economic transportation on the site wherein transformation plant is installed.

Although the present invention has been described with the aid of specific embodiments, it should be understood that several variations and modifications may be grafted onto the embodiments and that the present invention encompasses such modifications, usages or adaptations of the present invention that will become known or conventional within the field of activity to which the present invention pertains, and which may be applied to the essential elements mentioned above.

The invention claimed is:

1. A process for producing liquid fuels from a solid organic starting material comprising municipal solid waste and/or plastic waste with a reduced content in water, the process comprising:
- subjecting said solid organic starting material to a mechanical pre-treatment and a liquifying treatment to provide at least partially liquified organic material;
- submitting the thereby obtained at least partially liquified organic material to a pyrolysis treatment resulting in a solid and a gas fraction,
- mechanically separating the solid, allowing the recovering of the liquid fuels after condensation of the gas fraction.

2. A process for producing liquid fuels, according to claim 1, wherein said solid organic starting material contains at least 80 weight % of organic material.

3. A process for producing liquid fuels, according to claim 1, wherein the solid organic starting material is dewatered, before being submitted to pyrolysis, and the liquifying treatment is a mechanical, thermal and/or chemical treatment.

4. A process for producing liquid fuels, according to claim 3, wherein the organic starting material is mechanically, thermally and/or chemically liquified until the viscosity of the liquified organic material has, according to ASTM method ASTM D7945, reached a viscosity value that is inferior to 30 poises.

5. A process for producing liquid fuels, according to claim 1, wherein the pyrolysis treatment is being performed on a heated reaction support.

6. A process for producing liquid fuels, according to claim 1, wherein the pyrolysis is performed in a rotating kiln comprising:
   a. a rotating kiln;
   b. a heating system;
   c. at least one shelf on the reactor wall, the at least one shelf being either parallel to the center axis of the reactor, when the reactor is horizontal, or slanted with respect to the center axis when the reactor is slanted or not slanted;
   d. a charge of plates of consistent shapes;
   e. means for bringing the mixture to be thermally processed on the surface of at least part of the plates;
   f. means for removing the solids from the reactor;
   g. means for recovering the reaction and straight run products; and
   h. means for venting the gas, obtained by the thermal processing, outside the reactor zone.

7. A process for producing liquid fuels from solid organic starting material comprising municipal solid waste and/or plastic waste, said process includes:
   a) an optional preliminary step wherein water content of the starting material is reduced to a value lower than 55% wt. and/or wherein particulate size has been mechanically reduced to a size ranging from 3 mm to 0.1 mm;
   b) a thermal step wherein at least partial liquifying and at least partial dewatering of the starting material, eventually obtained in previous steps a) occurs, wherein starting material is heated under:
      a pressure that is ranging from 0,3 to 2 atmosphere, and at a temperature that is lower than 250 degrees Celsius;
   c) recovering of a liquid fraction from the at least partial liquifying resulting from step b), said liquid fraction may contain solid matters in suspension;
   d) a pyrolysis step wherein:
      the liquid fraction obtained in step b) or c), is flash cracked on a heated reaction's support that is in at least one mobile equipment or in at least one stationary equipment under positive pressure and/or in the presence of a sweep gas, and
      reaction and straight run products are recovered from the at least one mobile equipment or in at least one stationary equipment as solids and as a solid-gas mixture;
   e) a post treatment step wherein solid-gas mixture exiting the at least one mobile equipment or in at least one stationary equipment is submitted to a solid-gas separation by mechanical separation of the solids allowing the recovering of substantially clean gas portion and solids; and
   f) a condensation and/or fractionation step of the qas portion to obtain liquid fuel and gas.

8. A process according to claim 7, for producing liquid fuels, wherein:
   solids present in the starting material are broken into small pieces below 20 mm;
   agglomerates are made of at least 75% by weight of the starting material mixed with water;
   metals and rocks are sorted out from the agglomerate by gravity and/or by magnetic separation;
   the water content in the starting material is less than 87% wt.;
   the solid content of the agglomerates before entering a drying/liquefying step, has been increased to 15 to 30% wt.;
   the solid content is further increased, in a screw press, up to 50 to 60% wt. and, eventually raised up to 85% wt.; or
   dewatering is done with drum dryers or belt dryers to get to a lower water content.

9. Process according to claim 7, for producing liquid fuels, wherein in step c), water and lighter materials are recovered and pass through a self-refluxing condenser wherein the heavier portion of the lighter materials fall down in the bottom of the self refluxing condenser, allowing to:
   eliminate water and to recover lighter products which can be further separated into gas and liquid with low solid content and used in a previous or in a subsequent step.

10. A process according to claim 9, for producing liquid fuels, wherein in step b), the thermal step is performed in a vessel, at temperature to liquefy the most of the solid organic starting material.

11. A process according to claim 10, wherein the pyrolysis equipment is an indirectly fired rotating kiln comprising
   a. a heating system;
   b. at least one plate supporting device that is a shelf or series of stoppers or any device keeping the plates on parallel to the reactor wall;
   c. a charge of plates of consistent shapes;
   d. means for bringing the mixture of the liquefied and entrained solids resulting from step c) to be thermally processed on the surface of at least part of the plates at a temperature above 250° C. and a pressure between 2 psia and 29 psia;
   e.
   f. the pyrolysis is performed in the rotating kiln wherein a sweep gas is injected in the rotating kiln or in the feed stream entering the rotating kiln,
   g. guides for removing solids from the reactor in the post treatment step through entrainment with the exiting vapours, or mechanically through a separate solids exit, or both;
   h. means for recovering the reaction and straight run products; and
   i. the exit vapours are directed to a post-treatment module for performing a solid-gas separation on the solid-gas mixture exiting the central module, the transfer is done ensuring that the walls of the post-treatment modules are 10 degrees above the condensation point of the lower vapours and below the cracking point of the vapours.

12. A process according to claim 11, for producing liquid, wherein the transformation condition in the rotating kiln comprises:
   temperature range from 300 to 750 degrees Celsius;
   pressure lower than 2 atmospheres;
   residence times ranges from 2 seconds to 2 hours;
   speed rotation ranges ranging from 0,1 to 10 t/minutes; and
   wherein the ratio of the height of the shelves over the thickness of the plates is below 7/1.

13. A process according to claim 11, for producing liquid fuels, wherein in step i), the post treatment module is configured to perform the solid-gas separation, substantially without any condensation of the gas present in the solid gas-mixture exiting the central module;

solids are further separated in a self-refluxing condenser; or the vapours are condensed and separated either in a distillation column or multiple condensers.

14. A process according to claim 7, wherein the vapours exiting the gas-solids separating equipment is routed to a flash drum, said flash drum having a self-refluxing condenser mounted above it to scrub the reactor products and to remove residual solids.

15. A rotating kiln, comprising:
  a. a heating system;
  b. at least one plate supporting device that is a shelf or series of stoppers or any device keeping the plates on parallel to the reactor wall;
  c. a charge of plates of consistent shapes;
  d. means for bringing a mixture of liquefied and entrained solids to be thermally processed on the surface of at least part of the plates at a temperature above 250° C. and a pressure between 2 psia and 29 psia;
  e. a sweep gas is infected in the rotating kiln or in a feed stream entering the rotating kiln,
  f. guides for removing solids from the reactor in through entrainment with exiting vapours, or mechanically through a separate solids exit, or both;
  g. means for recovering the reaction and straight run products
  wherein the rotating kiln is obtained by modification of a rotating kiln
  in such a way to have the following features:
    the plate's width representing from 5 to 30% of the kiln's inner diameter;
    the plate thickness being at most 2 cm; and
    the plate's length ranging from 100 to 400%.

16. A rotating kiln according to claim 15 wherein the shelves have the shape of a single rectangle and/or a series of rectangles and/or a series of rectangles with guides directly below the shelves and/or a series of rectangle with guides attached to the shelves and/or a series of stoppers and/or a series of stoppers with guides directly below the shelves and/or a series of stoppers with guides attached to the shelves.

17. A rotating kiln according to claim 15, wherein the shelves are not attached paralleled to the central rotational axes when the central axis is inclined.

18. A rotating kiln according to claim 15, comprising:
  shelves with guides to push the plates upwards as the kiln rotates clockwise, as this rotation occurs, any solid particles which lay on the kiln's surface are pushed towards the kiln's exit, from one section to another, due to the existence of guides, which are part of the shelves or are located directly underneath the shelves;
  each shelf has at least one guide, wherein at least one shelf is without guide, the last section of the kiln comprising a mechanism that allows the solids to exit from the kiln, the shelf and the guide can be two different structural elements or be a single structural element configured for providing both functionalities;
  the shelves and guides must be attached on the wall of the rotating kiln;
  the angle of the guide, by reference to the horizontal, must be chosen such that it does not impede the falling and placement of the plates onto the kiln's inner surface;
  plates should not be too heavy, which could damage the kiln, while also optimising the area on which the fluid can pyrolyze on; and
  the centre of gravity of the plates was also taken into account, in order to make sure that the plates fall properly as the kiln rotates and do not significantly affect the integrity of those plates placed below.

19. A rotating kiln according to claim 15, wherein the rotating kiln is configured to be connectable to an extension with a transit line that is advantageously heatable and configured to bring solid-gas mixtures exiting the rotating kiln to a post-treatment module configured to at least partially separate gas present in the solid-gas mixture.

* * * * *